US012732595B1

(12) United States Patent
Beheshti et al.

(10) Patent No.: US 12,732,595 B1
(45) Date of Patent: Sep. 8, 2026

(54) DATA PRIORITIZATION FOR AUTONOMOUS VEHICLE COMMUNICATION BASED ON OBJECT CONTACT METRICS

(71) Applicant: Zoox, Inc., Foster City, CA (US)

(72) Inventors: Seyed Parsa Beheshti, Belmont, CA (US); Muhammad Umar Choudry, Seattle, WA (US); Ravi Gogna, San Jose, CA (US); Meredith James Goldman, Redwood City, CA (US); Paul Orecchio, Denver, CO (US); Amir Takhmar, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 155 days.

(21) Appl. No.: 18/392,408

(22) Filed: Dec. 21, 2023

(51) Int. Cl.
*H04N 7/18* (2006.01)
*G06V 20/58* (2022.01)

(52) U.S. Cl.
CPC ............. *H04N 7/181* (2013.01); *G06V 20/58* (2022.01)

(58) Field of Classification Search
None
See application file for complete search history.

(56) References Cited

U.S. PATENT DOCUMENTS 9,720,410 B2 8/2017 Fairfield et al.
10,423,934 B1 9/2019 Zanghi et al.
10,430,239 B2 10/2019 Tang et al.
10,877,479 B2 12/2020 Landy et al.
10,901,415 B1 1/2021 Herbach et al.
11,560,154 B1 1/2023 Gate et al.
12,269,509 B1 4/2025 Dickerson et al.
2010/0262336 A1 10/2010 Rivas et al.
(Continued)

FOREIGN PATENT DOCUMENTS

EP 4167163 A1 4/2023
JP 2020102159 A 7/2020
(Continued)

OTHER PUBLICATIONS

Non-Final Office Action dated Oct. 1, 2025 for U.S. Appl. No. 18/392,263.
(Continued)

*Primary Examiner* — James J Lee
*Assistant Examiner* — Tawri M Mcandrews
(74) *Attorney, Agent, or Firm* — EIP US LLP

(57) ABSTRACT

A method comprises (i) obtaining, by a first sensor of a plurality of sensors, first sensor data associated with one or objects in an environment in which one or more vehicles are located, (ii) obtaining, by a second sensor, second sensor data associated with one or more objects, (iii) determining contact metrics associated with the one or more objects associated with the first sensor data and the one or more objects associated with the second sensor data, (iv) determining one or more properties of one or more network connections to a remote system, (v) determining, based at least in part on the contact metrics and the one or more properties, a subset of sensor data to send to the system comprising at least some of the first sensor data and/or at least some of the second sensor data, and (vi) sending the subset of the sensor data to the system.

17 Claims, 17 Drawing Sheets

302

| Classification/ Object Type | Transmission Frequency (Good Connectivity) | Transmission Frequency (Reasonable Connectivity) | Transmission Frequency (Poor Connectivity) |
|---|---|---|---|
| Pedestrians | Send update 5 times per second | Send update 2 times per second | Send update once every second |
| Vehicles | Send update 10 times per second | Send update 5 times per second | Send update 2 times per second |
| Buildings, trees, etc. | Send update once every second | Send update once every 2 seconds | Send update once every 3 seconds |
| Cyclist | Send update 5 times per second | Send update 3 times per second | Send update 2 times per second |

(56) References Cited

U.S. PATENT DOCUMENTS

| | | | | |
|---|---|---|---|---|
| 2015/0134694 | A1 | 5/2015 | Burke et al. | |
| 2016/0148513 | A1 | 5/2016 | Beaurepaire | |
| 2017/0192423 | A1 | 7/2017 | Rust et al. | |
| 2017/0308082 | A1 | 10/2017 | Ullrich et al. | |
| 2018/0063013 | A1 | 3/2018 | Walkin | |
| 2018/0096427 | A1 | 4/2018 | Pierce et al. | |
| 2018/0293449 | A1 * | 10/2018 | Sathyanarayana | G07C 5/0866 |
| 2019/0196464 | A1 | 6/2019 | Lockwood et al. | |
| 2020/0057443 | A1 | 2/2020 | Silver et al. | |
| 2020/0136948 | A1 | 4/2020 | Akhouri et al. | |
| 2020/0201315 | A1 * | 6/2020 | Gogna | H04L 43/08 |
| 2021/0276577 | A1 | 9/2021 | Adams et al. | |
| 2022/0028185 | A1 | 1/2022 | Wang et al. | |
| 2022/0135026 | A1 | 5/2022 | Schleede et al. | |
| 2022/0137615 | A1 | 5/2022 | Eperjesi et al. | |
| 2022/0295334 | A1 * | 9/2022 | Sun | H04W 72/0453 |
| 2022/0355827 | A1 | 11/2022 | Hirano et al. | |
| 2023/0102518 | A1 | 3/2023 | Paul | |
| 2024/0420523 | A1 | 12/2024 | Trivedi et al. | |

FOREIGN PATENT DOCUMENTS

| | | | |
|---|---|---|---|
| KR | 10-2013-0007754 | A | 1/2013 |
| WO | 2009122925 | A1 | 10/2009 |

OTHER PUBLICATIONS

Non-Final Office Action dated Jan. 17, 2025 for U.S. Appl. No. 18/395,157.

Final Office Action dated Jul. 25, 2025 for U.S. Appl. No. 18/395,157.

Non-Final Office Action dated Sep. 10, 2025 for U.S. Appl. No. 18/544,894.

International Search Report and Written Opinion dated Mar. 18, 2025 for International Application No. PCT/US2024/059314.

United States final Office Action dated Mar. 5, 2026 for U.S. Appl. No. 18/544,894.

United States non-final Office Action dated Feb. 6, 2026 for U.S. Appl. No. 18/395,157.

United States Notice of Allowance dated Jun. 24, 2026 for U.S. Appl. No. 18/544,894.

Dai, Qikun, et al. "Model predictive decision-making considering lane-changing time under emergency collision avoidance for intelligent vehicles." IEEE Transactions on Industrial Electronics 71.9 (2023): 11250-11261. Dec. 25, 2023 (Year: 2023).

Lyu, Nengchao, et al. "Vehicle trajectory prediction and cut-in collision warning model in a connected vehicle environment." IEEE Transactions on Intelligent Transportation Systems 23.2 (2020): 966-981. Sep. 24, 2020 (Year: 2020).

Funke, Joseph, et al. "Collision avoidance and stabilization for autonomous vehicles in emergency scenarios." IEEE Transactions on Control Systems Technology 25.4 (2016): 1204-1216. Oct. 6, 2016 (Year: 2016).

Lee, Kibeom, and Dongsuk Kum. "Collision avoidance/mitigation system: Motion planning of autonomous vehicle via predictive occupancy map." IEEE Access 7 (2019): 52846-52857. Apr. 1, 2019 (Year: 2019).

Strickland, Mark, Georgios Fainekos, and Heni Ben Amor. "Deep predictive models for collision risk assessment in autonomous driving." 2018 IEEE International Conference on Robotics and Automation (ICRA). May 21, 2018, IEEE, 2018. (Year: 2018).

Althoff, Matthias, Olaf Stursberg, and Martin Buss. "Model-based probabilistic collision detection in autonomous driving." IEEE Transactions on Intelligent Transportation Systems 10.2 (2009): 299-310. Jun. 2, 2009 (Year: 2009).

Aufrere, Romuald, et al. "Perception for collision avoidance and autonomous driving." Mechatronics 13.10 (2003): 1149-1161. Dec. 1, 2003 (Year: 2003).

United States Final Office Action dated Apr. 22, 2026 for U.S. Appl. No. 18/392,263.

* cited by examiner

| Object # | Classification/ Object Type | Location | Distance | Size | Speed | Priority Level | Predicted Future Trajectory |
|---|---|---|---|---|---|---|---|
| 1 | Pedestrian | [x, y, z] | 10m | 0.3 x 1.8m | 1.5 m/s | 3 | t1 = [x1, y1, z1]<br>t2 = [x2, y2, z2] |
| 2 | Vehicle | [x, y, z] | 3m | 4.5m x 2m | 7 m/s | 2 | t1 = [x1, y1, z1]<br>t2 = [x2, y2, z2] |
| 3 | Vehicle | [x, y, z] | 1m | 4.8m x 2.1m | 7 m/s | 1 | t1 = [x1, y1, z1]<br>t2 = [x2, y2, z2] |
| 4 | Building | [x, y, z] | 8m | 15m x 10m | 0 m/s | 3 | t1 = [x, y, z]<br>t2 = [x, y, z] |
| 5 | Traffic Light | [x, y, z] | 15m | 0.3 x 1.8m | 0 m/s | 2 | t1 = [x, y, z]<br>t2 = [x, y, z] |
| 6 | Pedestrian | [x, y, z] | 12m | 0.3 x 1.8m | 0 m/s | 3 | t1 = [x, y, z]<br>t2 = [x, y, z] |
| 7 | Pedestrian | [x, y, z] | 8m | 0.3 x 1.8m | 1.1 m/s | 3 | t1 = [x1, y1, z1]<br>t2 = [x2, y2, z2] |

| Classification/ Object Type | Transmission Frequency (Good Connectivity) | Transmission Frequency (Reasonable Connectivity) | Transmission Frequency (Poor Connectivity) |
|---|---|---|---|
| Pedestrians | Send update 5 times per second | Send update 2 times per second | Send update once every second |
| Vehicles | Send update 10 times per second | Send update 5 times per second | Send update 2 times per second |
| Buildings, trees, etc. | Send update once every second | Send update once every 2 seconds | Send update once every 3 seconds |
| Cyclist | Send update 5 times per second | Send update 3 times per second | Send update 2 times per second |

FIG. 3

| Object # | Classification/ Object Type | Location | Distance | Size | Speed | Priority Level | Predicted Future Trajectory |
|---|---|---|---|---|---|---|---|
| 1 | Pedestrian | [x, y, z] | 10m | 0.3 x 1.8m | 0 m/s | 3 | t1 = [x, y, z]<br>t2 = [x, y, z] |
| 2 | Pedestrian | [x, y, z] | 10m | 0.3 x 1.8m | 0 m/s | 3 | t1 = [x, y, z]<br>t2 = [x, y, z] |
| 3 | Pedestrian | [x, y, z] | 10m | 0.3 x 1.8m | 0 m/s | 3 | t1 = [x, y, z]<br>t2 = [x, y, z] |
| 5 | Traffic Light | [x, y, z] | 15m | 0.3 x 1.8m | 0 m/s | 2 | t1 = [x, y, z]<br>t2 = [x, y, z] |
| 6 | Vehicle | [x, y, z] | 3m | 4.5m x 2m | 7 m/s | 2 | t1 = [x1, y1, z1]<br>t2 = [x2, y2, z2] |
| 7 | Vehicle | [x, y, z] | 1m | 4.8m x 2.1m | 7 m/s | 1 | t1 = [x1, y1, z1]<br>t2 = [x2, y2, z2] |
| Group 1 (Objects 1, 2, 3) | Pedestrian Crowd, N = 3 | [x, y, z] | 10m | 1.5 x 1.8m | 0 m/s | 3 | t1 = [x, y, z]<br>t2 = [x, y, z] |

| Sensor # | Collision Metric | | | | | | | | | | Aggregated Collision Metric |
|---|---|---|---|---|---|---|---|---|---|---|---|
| | Object 1 | Object 2 | Object 3 | Object 4 | Object 5 | Object 6 | Object 7 | Object 8 | Object 9 | Object 10 | |
| 1 | 0.5 | 0.1 | | | | | | | | | 0.3 |
| 2 | | | 0.7 | 0.2 | | | | | | | 0.45 |
| 3 | | | | | 0.1 | 0.1 | 0.15 | | | | 0.12 |
| 4 | | | | | | | | 0.30 | 0.1 | 0.05 | 0.15 |

DATA PRIORITIZATION FOR AUTONOMOUS VEHICLE COMMUNICATION BASED ON OBJECT CONTACT METRICS

BACKGROUND

Autonomous and partially autonomous vehicles are increasingly being tested and used not only for convenience, but also to improve road safety. Autonomous vehicles may have a combination of different sensors that can be used to detect nearby objects to help the vehicle navigate through the environment.

BRIEF DESCRIPTION OF DRAWINGS

The detailed description is described with reference to the accompanying figures. The use of the same reference numbers in different figures indicates similar or identical components or features.

FIG. 2 is a table of perception data generated by a vehicle according to an example;

FIG. 3 is a table identifying different transmission frequencies/rates based on different network conditions, according to an example;

FIG. 11 is a table of perception data generated by a vehicle according to another example;

DETAILED DESCRIPTION

Figure 1:
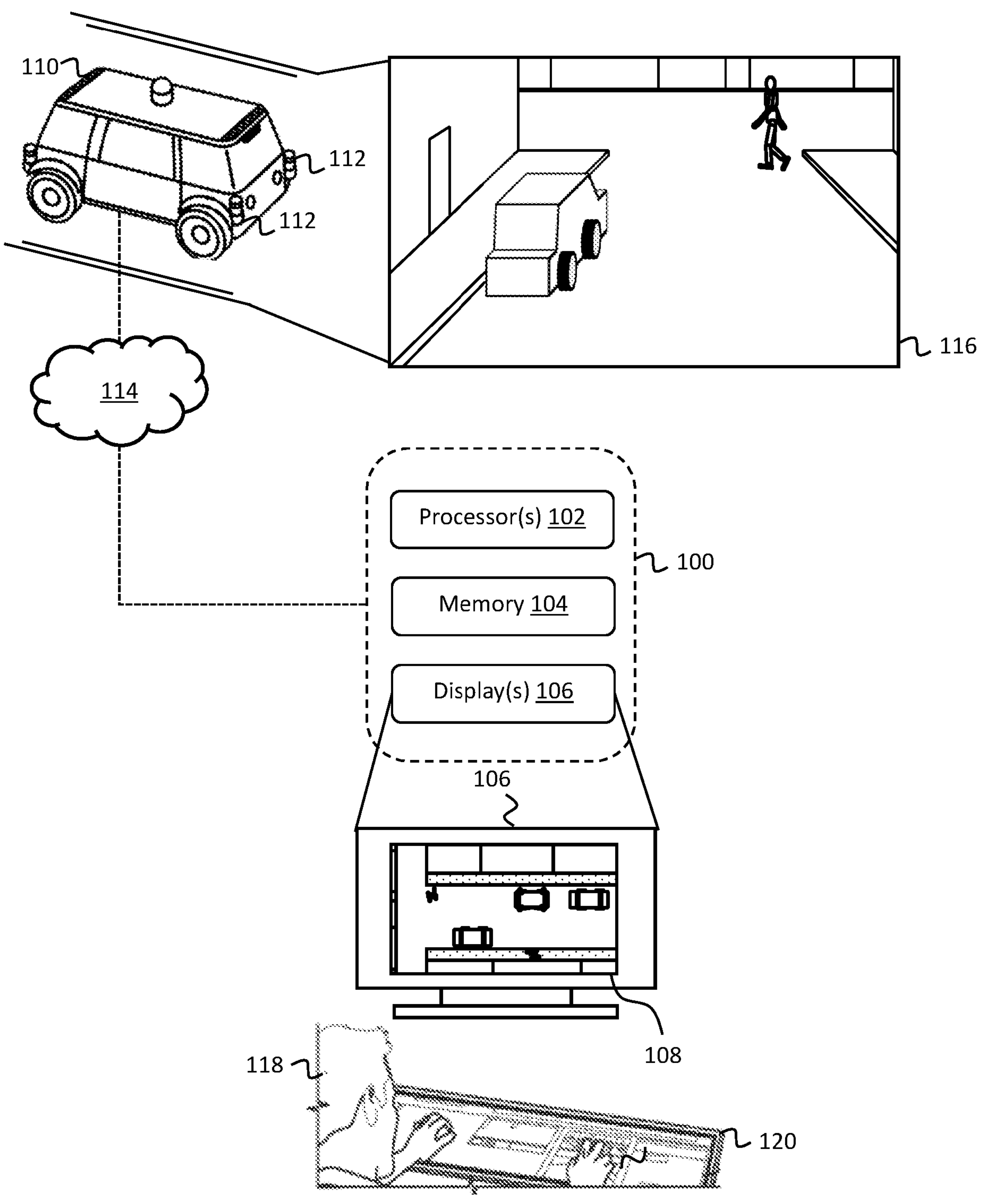
FIG. 1 is a pictorial diagram of system, including a vehicle and remote system for monitoring the vehicle, according to an example.

This application relates to vehicles, systems, methods and computer-readable media for improving the ability of a human operator (also known as a teleoperator) to understand the environment in which an autonomous vehicle is located when connectivity between a vehicle and the operator is limited. Typically, vehicles send data, such as perception data generated by the vehicle, to the operator. When connectivity is good (such as when bandwidth is high), all or a high proportion of data can be transmitted to and be received by the operator. When connectivity is poor (such as when there is limited bandwidth available), some data packets may be dropped or lost. The present disclosure relates to selecting a subset of data to transmit to the operator, so that the operator can still monitor the vehicle when connectivity is degraded.

A human operator may monitor an autonomous vehicle and/or provide an instruction, such as a driving instruction, to the autonomous vehicle at certain times. A vehicle may request that an operator provide it with instructions in certain scenarios, such as when the vehicle is unsure how to proceed next. The operator may be located remote from the vehicle, and can therefore monitor and/or control the vehicle from a remote system. To enable the operator to monitor/control the vehicle, the operator may be presented with data from the vehicle. For example, the vehicle may have one or more sensors (such as one or more lidars, infra-red sensors, etc.) which capture sensor data which is processed by the vehicle to generate perception data. Perception data may be associated with one or more objects in the environment and may be used by the vehicle, such as a planning component of the vehicle, to navigate in the environment. The perception data may therefore be transmitted from the vehicle to the remote system. The perception data, which may be known more generally as data, may be indicative of how the vehicle perceives the environment, and may be based on the sensor data.

In examples, the perception data may be generated by a perception component of the vehicle. The perception component can detect objects in the environment surrounding the vehicle by fusing, which is to say using software to combine, sensor data from one or more sensors. The perception component may determine one or more characteristics for each of the detected objects. For example, a characteristic may be a classification (or object type), a location, a size, a speed, a contact metric (such as a probability of the object contacting or colliding with the vehicle), etc. The perception component may therefore classify the objects. Example classifications may include, vehicle, pedestrian, building, road surface, cyclist, tree, traffic light, etc. The perception data may comprise one or more characteristics associated with each object.

The perception data may additionally comprise prediction data, where the prediction data is generated by a prediction component of the vehicle. The prediction component may generate probability data, such as one or more probability maps or one or more future trajectories representing prediction probabilities of possible future locations of one or more objects in the environment. Prediction data may be used to determine a contact metric for the object.

The remote system can receive the perception data from the vehicle, and display on one or more displays, a representation of the perception data (and therefore a representation of the objects in the environment) so that the operator can see the environment around the vehicle. The representation of the perception data may be shown to the operator as a view, in examples. In examples, the representation of the perception data may be a model, such as a 2D or 3D rendered graphical model, of the environment. The model may therefore depict one or more objects in the environment. The system may generate the model based on the perception data.

For safety reasons, it may be useful for the vehicle to transmit as much data as possible to the system so that the operator is provided with the most complete and accurate representation of the environment, especially if the operator then provides navigation instructions to the vehicle.

As mentioned, when the network connection between the vehicle and system is degraded, limited bandwidth may be available. In such scenarios, it may not be possible to transmit the desired amount of perception data from vehicle to the system. This in turn can impact an operator's ability to provide remote vehicle guidance. For example, if bandwidth is limited and the vehicle attempts to transmit too much data to the system, there may be a delay. However, selecting to send no data, or too little data to the system may mean that the operator may not have sufficient information to safely control the vehicle. One aspect of the present disclosure therefore relates to determining the most useful/critical perception data (i.e., a subset of the perception data) and sending the subset of the perception data to the system in scenarios where bandwidth is more limited than under normal conditions. For example, the subset of perception data can be selectively determined depending on current network conditions to maximize safety. A second aspect, discussed further below, relates to prioritizing video data from different video cameras and/or transmitting a subset of video data to the remote system.

As an example, the subset of the perception data may relate to a subset of objects of the detected objects, such as those objects closest to the vehicle, such as within a particular distance or radius of the vehicle. As another example, the subset of objects may relate to objects all having the same classification. For example, it may be more useful for the operator to see where the vehicles are, or where the vehicles and pedestrians are in the environment, than other objects. As another example, the subset of objects may relate to objects having a contact metric above a contact metric threshold. For example, it may be more useful for the operator to see objects that are most or more likely to contact or collide with the vehicle. As another example, the subset of the perception data may relate to all of the objects detected by the vehicle, but may comprise only a subset of the characteristics associated with each object. For example, only positional/location data and classification data for each object may be transmitted to the system, whereas the detected size, velocity and probability data for those objects may not be transmitted to the system.

Accordingly, in examples described herein, there is provided an autonomous vehicle, comprising: (i) one or more sensors configured to obtain sensor data associated with an environment in which the vehicle is located, (ii) a network interface for communicating with a system remote from the vehicle via a network, and (iii) at least one processor. The at least one processor can be configured to: based at least in part on the sensor data, generate perception data associated with one or more objects in the environment. As mentioned, the perception data may be used by a planning component of the vehicle to navigate in the environment. The at least one processor can further be configured to: determine a property of a network connection between the vehicle and the system; determine, based at least in part on the property of the network connection, a subset of the perception data; and cause the network interface to transmit, from the vehicle to the system, the subset of the perception data.

An aspect of the present disclosure therefore relates to determining a subset of the perception data for transmitting to the remote system based on the property of the network connection. The subset of the perception data may be further determined based on other criteria, such as based on one or more characteristics associated with the one or more objects. By sending a subset of the perception data, fewer network resources are used, which is particularly useful when the network connection is poor.

The system may be used by an operator to monitor and/or control the vehicle. The system may be communicatively coupled to the vehicle, such as via one or more wired and/or wireless networks. The system may receive the perception data or the subset of the perception data from the vehicle, and output on a display of the system, a graphical representation of an environment around the vehicle based on the perception data or the subset of the perception data. The system may also receive video data from one or more video cameras on the vehicle and output on the display one or more video feeds/streams.

In examples, the one or more processors may be further configured to receive, from the system via the network interface, a driving or navigation instruction. The vehicle may implement the instruction based on one or more checks, such as whether the instruction may result in an unsafe act.

In examples, the processor may be configured to cause the network interface to transmit, from the vehicle to the system, the subset of the perception data and not transmit a second subset of the perception data, the subset and the second subset comprising different perception data. Accordingly, some of the generated perception data is not transmitted to the system, and may never be transmitted to the system in some cases. In examples, the second subset of the perception data may still be used or may still be usable by the planning component of the vehicle for navigation purposes, even though it is not transmitted to the system.

The subset of the perception data may be transmitted via one or more packets of data.

The property of the network connection may be an amount of available bandwidth, a speed or reliability of the network connection, a latency of the network connection, a stability of the network connection, a number of packets dropped, a quality of the network connection, a distance between the vehicle and the system/operator, a network or communication capability of the vehicle (for example, whether the vehicle has a particular network interface, such as a 5G or 6G antenna), a current vehicle processing load (e.g., whether a processor of the vehicle is degraded or overburdened). Determining a property of a network connection between the vehicle and the system may therefore comprise determining the network interface of the vehicle (or the model of the vehicle, if the vehicle model is related to the network interface of the vehicle), for example, or alternatively or additionally determining any of the other properties mentioned above.

In examples, a property of a network connection between the vehicle and the system may be determined via a network interface of the vehicle. As an example, one or more packets of data may be transmitted between the vehicle and the system to determine a property of the network connection.

In examples, a property of a network connection between the vehicle and the system may be based on a location of the vehicle itself. For example, certain areas/locations may be associated with poor or less than optimal network conditions. For example, certain e.g., remote areas of a town may have fewer cellular towers than other areas of the town. As such, map data and/or location data may be associated with a property of a network connection. For example, the vehicle may determine a property of a network connection between the vehicle and the system based on a location of the vehicle. In some cases, a location of the vehicle may therefore infer a property of the network connection.

As an example, the subset of the perception data may be transmitted to the system when the property is below a threshold property. For example, the subset of the perception data may be transmitted to the system when the determined bandwidth is below a threshold bandwidth.

As mentioned, in examples, perception data may comprise one or more characteristics associated with each object of the one or more objects. A characteristic may be a classification or object type, a location (such as a GPS or other coordinate), a distance between the vehicle and the object, a size of the object (such as width, height, length, etc.), a speed, a velocity, a priority or criticality level, prediction data, an indication of whether the object is stationary or non-stationary, a contact metric, etc.

In examples, generating the perception data may comprise fusing, or otherwise combining, the sensor data. In examples, the perception data includes representations of the one or more objects.

In examples, the subset of the perception data may change depending on what action the vehicle is performing.

In examples, the perception data may be associated with a plurality of objects in the environment and comprise a plurality of characteristics associated with each object, and the subset of the perception data may comprise perception data associated with one of: (i) a subset of objects from the plurality of objects and at least some of the characteristics of the plurality of characteristics associated with each object of the subset of objects, or (ii) at least some of the objects of the plurality of objects and a subset of characteristics from the plurality of characteristics associated with each object.

As an example, some of the characteristics associated with each object may be "dropped" (i.e., not sent to the system) when the property of the network connection is below a threshold (such as bandwidth is low). Alternatively, all of the characteristics for each object may be sent to the system, but only for a subset of the objects. The system may therefore receive perception data associated with a subset of the plurality of objects. Alternatively, a subset of characteristics may be sent for a subset of objects. The subset of characteristics may be different for each object in the subset. For example, the subset of characteristics may depend on at least one characteristic, such as the classification of the object.

In examples, the perception data may be associated with a plurality of objects in the environment and the subset of the perception data comprises perception data associated with a subset of objects from the plurality of objects. The at least one processor may be further configured to determine the subset of objects from the plurality of objects based on at least one of: (a) characteristic associated with each object of the subset of objects, (b) a location of each object of the subset of objects relative to the vehicle, (c) each object of the subset of objects being used by the planning component of the vehicle to determine to perform an action, or (d) contact metrics associated with the subset of objects.

A "location of each object of the subset of objects relative to the vehicle" may be a current location of the object, or a potential or predicted future location of the object. For example, a prediction component of the vehicle may generate probability data, such as one or more probability maps or one or more future trajectories/paths representing prediction probabilities of possible future locations of one or more objects in the environment. The predicted location or locations for an object may be at one or more times in the future, such as in 0.5 seconds, or 1 second from the current time.

For example, each object of the subset of objects may: (i) have a particular characteristic, or a common characteristic (such as all have the same object classification, all be stationary or non-stationary, all be moving at a particular speed, all be moving towards the vehicle, all have a particular size, etc.) or (ii) be located (currently, or predicted to be) within a predetermined distance of the vehicle (such as within a particular radius, such as within 10 m or within 20 m of the vehicle), or (iii) be located (currently, or predicted to be) along (such as within a particular/predetermined distance) of a trajectory or route that the vehicle will follow, or (iv) be located (currently, or predicted to be) within a particular region/area of interest (the region/area may be provided to the vehicle by an operator, and therefore be received from the system), or (v) be located (currently, or predicted to be) within a predetermined distance of a particular location (the location and/or predetermined distance may be provided to the vehicle by an operator, and therefore be received from the system), or (vi) be relevant to safe operation of the vehicle in the future.

In examples, objects that are not included in the subset of objects may have a particular characteristic, such as all may be stationary, or all may have a low speed/velocity, such as a speed/velocity below a threshold. "Dropping" data associated with stationary or low speed/velocity objects may be useful because the locations of those objects may not have changed since the last time perception data associated that object had been transmitted to the system. Earlier transmitted data can therefore be used by the system to display locations of those objects to the operator, even though updated data may not have been received (in other words, the subset of the perception data does not include perception data associated with those objects).

As noted above, in examples, the objects in the subset of objects may be used by the planning component of the vehicle to determine to perform an action. The objects may therefore be located in areas where the vehicle may, or could navigate, or may have some other characteristic that influences the vehicle's behavior. The objects in the subset are therefore all objects that have influenced actions taken by the vehicle (such as in the past or in similar conditions) or will influence actions taken by the vehicle. The actions may include driving actions for the vehicle, such as steering, acceleration, braking or signaling actions. Example techniques for aggregating costs associated with one or more heat maps to control a vehicle in an environment are discussed in US patent publication No. 2023/0097121, titled "Optimization Based Planning System", which is incorporated in its entirety herein and for all purposes.

As noted above, in examples, the objects in the subset of objects may be determined based on contact metrics associated with the subset of objects. As an example, the objects may have a contact metric above a threshold. For example, objects having a contact metric above the threshold may be considered as more likely to collide with or contact the vehicle in the future.

In examples, each object of the subset of objects may be located within a predetermined distance of the vehicle, and the at least one processor is further configured to: determine the predetermined distance based at least in part on the property of the network connection. For example, the predetermined distance may be smaller if the network connection is poorer. For example, as the amount of available bandwidth decreases, the predetermined distance, such as the radius, decreases in size. In this case perception data associated with objects not within the predetermined distance (i.e., those located further away) may not be transmitted to the system. In other examples, the distance may not be determined based on the property of the network connection.

In examples, each object of the subset of objects may be located along a trajectory/path or route that the vehicle will follow. For example, the objects may be within a certain distance of a trajectory. Perception data associated with objects that are not along the trajectory (i.e., those located in another area) is not transmitted to the system.

In another example, each object of the subset of objects may be located within a particular area or within a predetermined distance of a particular location, and the at least one processor is further configured to: receive, from the system, data indicative of the particular area or the particular location. For example, an operator may provide a user input indicative of a particular area or location and the subset of perception data only comprises perception data for objects within that area, or within the predetermined distance of the location. In other examples, the area or the location may be determined by the vehicle itself. In examples, the at least one processor is further configured to: receive, from the system, data indicative of the predetermined distance. In other examples, the at least one processor is further configured to: determine the predetermined distance based at least in part on the property of the network connection. Perception data associated with objects that are not within the area or not within the predetermined distance of the location is not transmitted to the system.

The particular area may be or comprise an area or location where the vehicle has had difficulties in the past. For example, the software running on the vehicle may have had difficulties planning a route or causing the vehicle to move.

In another example, the characteristic may be a priority of the object, and the at least one processor is further configured to determine the subset of objects from the plurality of objects based on the subset of objects having a particular priority. For example, each object may be associated with a priority, and perception data is sent for objects having a particular priority (or having one or more particular priorities). As an example, an emergency vehicle may be detected within the environment, and the subset of the perception data comprises perception data associated with the emergency vehicle. As another example, an object may be associated with a higher priority if the object is more likely to affect the behavior of the vehicle. For example, a predicted future location of an object may mean that the object is more relevant, and perception data associated with that object may be transmitted preferentially or instead of perception data associated with other objects.

Perception data associated with objects that do not have the particular priority is not transmitted to the system. The most critical data may therefore be transmitted to the system.

In examples, the characteristic may be a classification of the object. In examples, the characteristic may be a behavior of the object, such as whether the object is behaving as would be expected, such as expected for that particular classification of object. As an example, the behavior may indicate whether the object, such as a vehicle, is driving unusually or dangerously, or whether the vehicle is driving conservatively. In examples, the characteristic or classification may be based on whether the vehicle, such as software of the vehicle, has had difficulties predicting or handling the object.

In examples, a group of objects may be detected in the environment. For example, a group of pedestrians may be located at an intersection. Rather than transmitting perception data for each object in the group, the perception data for objects within the group may be "combined" into perception data for a grouped object, where the perception data for the grouped object is smaller in size than for the perception data for each individual object within the group. Accordingly, bandwidth may be saved, so that perception data does not need to be sent for each object.

Accordingly, in examples, the perception data may be associated with a plurality of objects in the environment and comprise one or more characteristics associated with each object of the plurality of objects. The subset of the perception data may comprise perception data for a grouped object, and the at least one processor may be further configured to generate the perception data for the grouped object, where the grouped object represents a group of two or more objects, the two or more objects being associated with a particular characteristic. The perception data for the grouped object may comprise one or more characteristics associated with the grouped object. The perception data for the grouped object may represent a single object, rather than each object in the group.

In examples, each of the two or more objects in the group may have the same classification, such as "pedestrian" or "bicycle". The one or more characteristics associated with the group of two or more objects, may be a location and/or determined size (such as a width and/or length) of the group. The two or more objects may be located within a predetermined distance of each other. A group of pedestrians may be known as a pedestrian crowd or cloud in examples. These aggregated objects may be determined to move in a similar fashion (and can therefore be represented as a common object) and/or their movement may not be sufficiently relevant for an operator's ability to provide a command to vehicle (and therefore details of individual object movement may be irrelevant).

In examples, the one or more characteristics associated with the group of two or more objects, include a number of objects within the group. The system may therefore be able to display representations of the objects on the one or more displays based on the number of objects.

In some scenarios, the network connection may be so poor that it would be considered unsafe or dangerous for an operator to remotely control the vehicle. For example, the amount of available bandwidth may be such that little or no perception data may be transmitted to the system. In such cases, the vehicle may consider that remote vehicle guidance should not be performed. The vehicle may therefore send data to the system (if data transmission is still possible) to inform the operator that remote vehicle guidance should not take place, or the vehicle may cease sending perception data. Accordingly, in examples, the at least one processor may be configured to determine the property of the network connection at a first time and the at least one processor may further be configured to: (i) determine a property of a network connection between the vehicle and the system remote from the vehicle at a second time and (ii) determine, that the property of the network connection at the second time is below a threshold, wherein when the property of the network connection is below the threshold, remote vehicle guidance performed by the system should not occur. In examples, the at least one processor may be further configured to at least one of: (i) cease transmitting perception data to the system, or (ii) cause the network interface to transmit, from the vehicle to the system, data indicative of the property of the network connection being below the threshold or data indicating that remote vehicle guidance should not occur.

In examples, there is further provided a method comprising: (i) obtaining, by a vehicle, sensor data associated with an environment in which the vehicle is located, (ii) based at least in part on the sensor data, generating, by the vehicle, perception data associated with one or more objects in the environment, (iii) determining a property of a network connection between the vehicle and a system remote from the vehicle, (iv) determining, by the vehicle, based at least in part on the property of the network connection, a subset of the perception data, and (v) transmitting, from the vehicle to the system, the subset of the perception data.

In examples, the vehicle may determine the property or the system or some other entity may determine the property. For example, the system may determine the property of the network connection and send data indicative of the property to the vehicle.

In examples, based on the property of the network connection (such as the amount of available bandwidth), the vehicle may vary the rate/frequency at which perception data, or perception data for certain objects (such as objects with a particular classification) is transmitted to the system. For example, perception data associated with one or more particular characteristics may be transmitted more frequently than perception data associated with other characteristics. Accordingly, the method may further comprise, determining, based at least in part on the property of the network connection, a frequency at which to transmit data from the vehicle to the system. As such, transmitting, from the vehicle to the system, the subset of the perception data may comprise transmitting, from the vehicle to the system, the subset of the perception data based at least in part on the frequency.

In examples, the subset of the perception data corresponds to perception data of a particular type (such as a particular classification), and the frequency is further determined based on the particular type. For example, the subset of the perception data may be associated with a subset of objects, each object being of a particular object type. For example, perception data associated with vehicles may be transmitted more frequently than perception data associated with static objects, such as buildings.

In examples, the subset of the perception data is a subset over a time period excluding some of the perception data over the time period.

In examples, the method may further comprise determining, based on the determined property, a second subset of the perception data and transmitting, from the vehicle to the system, the second subset of the perception data based at least in part on the frequency. For example, the second subset may be transmitted at a time after the other subset, where the time difference between transmitting the second subset and the other subset is based on the frequency.

In examples, the frequency may be based on a characteristic of the particular object, such as a speed or velocity. For example, if an object is stationary, or moving relatively slowly, then it follows that the location of the object is not varying over a time period (or may indicate that it is varying relatively little). As such, a frequency at which a subset of perception data may be transmitted may be based on a speed or velocity of one or more objects (such as one or more objects that are associated with the subset of the perception data). If the object is stationary, the frequency may be reduced, and if the object is moving, the frequency may be increased.

In examples, the frequency may be based on how likely a particular object may affect the behavior of the vehicle (such as a contact metric of the object). For example, a current or predicted future location of an object may mean that the object is more relevant, and perception data associated with that object may be transmitted at a higher frequency than other objects.

As mentioned previously, in examples, the perception data may be associated with a plurality of objects in the environment and comprise a plurality of characteristics associated with each object. The subset of the perception data may comprise perception data associated with one of: (i) a subset of objects from the plurality of objects and at least some of the characteristics of the plurality of characteristics associated with each object of the subset of objects or (ii) at least some of the objects of the plurality of objects and a subset of characteristics from the plurality of characteristics associated with each object.

In examples, the plurality of characteristics associated with each object may comprise at least one of a determined size or a classification associated with the object, the determined size being determined based on the sensor data. The subset of characteristics may not include at least one of: (i) the determined size associated with each object, or (ii) the classification associated with each object. Accordingly, certain characteristics, such as size or classification data may be "dropped" (i.e., not sent to the system).

Because the system may not receive the actual, determined size of one or more objects, the system may determine a default, average or predetermined size. The default, average or predetermined size may be based on the classification of object, assuming classification data is received by the system. For example, a vehicle or a particular type of vehicle may be associated with an average size, rather than requiring the vehicle to transmit to the system the actual size determined by the one or more sensors of the vehicle. The size determined by the vehicle may be one or more physical dimensions of the object, such as a width and/or height and/or length. As another example, the system may use a previously received size for that same object or for a similar object. For example, at an earlier moment in time, perception data may have been received for that object that did include the size. Similarly, if the subset of the perception data does not include a classification for an object, the system may use a previously received classification for that same object or for a similar object.

In examples, the perception data may comprise data indicative of a potential future path or potential future location of the one or more objects and the subset of the perception data does not include the data indicative of the potential future path or location of the particular object. The data indicative of the potential future path or location may therefore be "dropped".

In examples, the potential future path or location may be known as prediction data, and may be associated with a certain time in the future. When the vehicle has good connectivity, the perception data may comprise the potential future path or location data. However, if the connection degrades, the vehicle may no longer transmit prediction data.

In examples, if the network connection is such that data associated with a particular object, such as location data, is not transmitted or received by the system, earlier received prediction data may be used by the system to display an estimated location of the object at a later time. In examples, the method may further comprise: prior to transmitting the subset of the perception data, transmitting, from the vehicle to the system, second perception data, the second perception data comprising perception data associated with a particular object and including data indicative of a potential future path or location of the particular object. The method may further comprise receiving, by the system at a first time, the second perception data, and after transmitting the subset of the perception data: (i) receiving, by the system at a second time, after the first time, the subset of the perception data, (ii) determining that the subset of the perception data received at the second time does not include perception data associated with the particular object, and (iii) in response to determining that the subset of the perception data received at the second time does not include perception data associated with the particular object, displaying, on a display of the system, a representation of the particular object based on a location determined from the data indicative of the potential future path or location of the particular object received at the first time. An estimated location of the particular object can therefore be determined by the system if some or all of the perception data associated with a particular object is missing, where the estimated location is based on prediction data that has previously been received by the system.

As mentioned, in examples, the perception data is associated with a plurality of objects in the environment and the subset of the perception data comprises perception data associated with a subset of objects from the plurality of objects. The method may further comprise determining the subset of objects from the plurality of objects based on at least one of: (a) a characteristic associated with each object of the subset of objects, (b) a location of each object of the subset of objects relative to the vehicle, (c) each object of the subset of objects being used by a planning component of the vehicle to determine to perform an action, wherein the perception data is used by the planning component of the vehicle to navigate in the environment, or (d) contact metrics associated with the subset of objects.

As mentioned, in examples, each object of the subset of objects is located one of: (i) within a predetermined distance of the vehicle, (ii) along a trajectory or route that the vehicle will follow, or (iii) within a particular area or within a predetermined distance of a particular location. In some examples of either (i) or (iii), the method may further comprise: determining the predetermined distance based at least in part on the property of the network connection. In some examples of (iii), the method may further comprise: receiving, by the vehicle from the system, data indicative of the particular area or the particular location. In some examples, the area may be determined by the vehicle itself. For example, the area may be defined by one or more objects that are nearest the vehicle. For example, an area (or "bubble") around (or in front of) the vehicle, may be defined by the nearest objects around the vehicle. Accordingly, rather than defining the area as being within a predetermined distance of the vehicle, the distance may vary at different points around the vehicle, and the distance may be bound or set by the objects that are nearest the vehicle. For example, other objects that are beyond the nearest objects may be less significant at this particular moment in time, so may be ignored.

As mentioned, in examples, the characteristic may be a priority of the object, and the method may further comprise determining the subset of objects from the plurality of objects based on the subset of objects having a particular priority.

As mentioned, in examples, the perception data is associated with a plurality of objects in the environment and comprises one or more characteristics associated with each object of the plurality of objects and the subset of the perception data comprises perception data for a grouped object. The method may further comprise: generating the perception data for the grouped object, the grouped object representing a group of two or more objects, the two or more objects being associated with a particular characteristic. The perception data for the grouped object may comprise one or more characteristics associated with the grouped object. In examples, the perception data for the grouped object comprises data indicative of a number of objects in the group of two or more objects.

As mentioned, in examples, determining the property of the network connection comprises determining the property of the network connection at a first time. The method may further comprise: determining a property of a network connection between the vehicle and the system remote from the vehicle at a second time, determining, that the property of the network connection at the second time, is below a threshold, wherein when the property of the network connection is below the threshold, remote vehicle guidance performed by the system should not occur. In examples, the method may comprise: transmitting, from the vehicle to the system, data indicative of the property of the network connection being below the threshold or data indicating that remote vehicle guidance should not occur.

In examples, the sensor data captured by the vehicle may comprise video data. In examples, data transmitted to the system comprises an image, or a video of a particular object, and the video or image of the particular object is transmitted to the system, rather than the full view of the video data. An operator may then view an image of an object or a video of the object on a display where the object is located. For example, the image or video may be overlayed onto a bounding box for display. This may be repeated for any objects of interest, such as objects within a particular area or having a particular location or characteristic, as discussed above. In another example, if the vehicle has multiple cameras, a video or part of a video may be sent only for cameras that are pointing at or include areas or objects of interest.

In examples, there is further provided one or more non-transitory computer-readable media storing instructions that, when executed by one or more processors of a vehicle, cause the vehicle to perform operations comprising: (a) obtaining sensor data associated with an environment in which the vehicle is located, (b) based at least in part on the sensor data, generating perception data associated with one or more objects in the environment, (c) determining a property of a network connection between the vehicle and a system remote from the vehicle, (d) determining, based at least in part on the property of the network connection, a subset of the perception data, and (e) transmitting, from the vehicle to the system, the subset of the perception data.

In examples, there is further provided a method comprising: obtaining, by a vehicle, sensor data associated with an environment in which the vehicle is located, the sensor data being associated with one or more objects in the environment; determining a property of a network connection between the vehicle and a system remote from the vehicle; determining, by the vehicle, based at least in part on the property of the network connection, a subset of the sensor data; and transmitting, from the vehicle to the system, the subset of the sensor data.

As briefly mentioned above, a second aspect of the disclosure relates to prioritizing sensor data obtained by one or more sensors (such as a video cameras) over sensor data obtained by one or more other sensors (such as one or more other video cameras). This may be useful when the network connection between the vehicle and remote system is degraded, such as when limited bandwidth may be available. It will be appreciated that features discussed earlier in respect of the first aspect may be combined with features relating to the second aspect, and vice versa.

As an example, a vehicle may have several video cameras, each obtaining sensor data (such as video data). Collectively, sensor data from each of the video cameras may be referred to as total sensor data. Sensor data captured by a first video camera may be determined to be more significant than sensor data captured by a second video camera. Accordingly, when the network connection is degraded (which may be indicated via one or more determined properties of the network connection), the vehicle may determine to send to the remote system the sensor data captured by the first video camera, but not the second video camera. In this example it may be said that a subset of the total sensor data captured by the sensors is transmitted to the remote system.

In other examples, sensor data from both (or all) video cameras may be sent, but the quality of the sensor data may be varied based on the importance of the sensor data. For example, the sensor data captured by the second video camera may be sent with a lower bit rate, resolution and/or frame rate compared to the sensor data captured by the first video camera. As for the previous example it may be said that a subset of the sensor data captured by the sensors is transmitted to the remote system.

In examples, sensor data from all the sensors (such as all the video cameras) may be sent to the system, but the order in which the sensor data from each sensor is transmitted is based on how significant the sensor data is. For example, the sensor data from a first sensor may be transmitted prior to sensor data from a second sensor.

In examples, at least some of the sensor data from at least some of the sensors may be sent to the system, but the order in which the sensor data from each sensor is transmitted is based on how significant the sensor data is.

In a particular example, the vehicle can divide the available bandwidth between each sensor based on the "importance" of the sensor data from each sensor, and accordingly set a transmission bit rate and a Quality of Service (QoS) parameter for the sensor data from each sensor.

The "importance" of the sensor data from each sensor can be determined based on the objects that are associated with each sensor. For example, sensors (such as video cameras) that are viewing objects that are more likely to contact the vehicle may be considered as more significant than sensors that are viewing objects that are less likely to contact the vehicle.

As briefly mentioned earlier, the probability of whether an object may contact the vehicle may be known as, or associated with, a contact metric. In examples, a contact metric may be determined for objects around the vehicle, and the contact metrics associated with the objects within a field of view of each sensor may be aggregated (such as added or averaged). An aggregated contact metric may therefore be determined for each sensor, and the importance of each sensor (and the sensor data obtained by each sensor) can be determined based on the aggregated contact metric. For example, if a vehicle comprises first and second sensors, and the second sensor is associated with a higher aggregated contact metric than the first sensor, the sensor data obtained by the second sensor may be deemed more significant than the sensor data obtained by the first sensor. The sensor data obtained by the second sensor may therefore be sent prior to the sensor data obtained by the first sensor, and/or may be sent with a higher bit rate, resolution and/or frame rate compared to the sensor data obtained by the first sensor, and/or a higher proportion of the sensor data obtained by the second sensor may be sent compared to the sensor data obtained by the first sensor or, in some cases, the sensor data obtained by the first sensor may not be transmitted at all.

Accordingly, in examples described herein, there is provided an autonomous vehicle, comprising: (i) a plurality of sensors configured to obtain sensor data associated with an environment in which the vehicle is located, (ii) one or more network interfaces configured to communicate with a system remote from the vehicle, and (iii) one or more processors coupled to the plurality of sensors and the one or more network interfaces. In examples, the one or more processors are configured to: (a) receive, from the plurality of sensors, sensor data associated with plurality of objects in the environment, (b) determine potential future paths or locations of the plurality of objects, (c) determine, based at least in part on (i) the potential future paths or locations of the plurality of objects, and (ii) an action of the vehicle, contact metrics for the plurality of objects, where a contact metric is associated with a probability of contact between the vehicle and the object, (d) determine, based at least in part on the contact metrics for the plurality of objects and fields of views of the plurality of sensors, a first sensor of the plurality of sensors that views one or more objects that are unlikely to contact the vehicle, € determine one or more properties of one or more network connections to the remote system, and (f) determine, based at least in part on the one or more properties, to preclude from data sent to the remote system, the sensor data associated with the first sensor.

Accordingly, in examples, the sensor data obtained by the first sensor may be not considered significant (or may be considered less significant than other sensor data) because the objects within the field of the view of the first sensor are unlikely to contact the vehicle (for example, the objects may have a low probability of colliding with or contacting the vehicle). The sensor data may therefore be "dropped" (i.e., not sent to the remote system). Sensor data associated with one or more other sensors, such as a second sensor, may be transmitted to the remote system. For example, objects within the field of view of the second sensor data may be more likely to contact the vehicle (for example, the objects may have a high or higher probability of colliding with or contacting the vehicle than the objects within the field of view of the first sensor).

As mentioned, in other cases, sensor data from first and second sensors may be transmitted, but a subset of the total sensor data (i.e. sensor data from the first and second sensors, as explained above, and any other sensors) is sent. For example, the subset of sensor data may comprise at least some of the sensor data obtained by the first sensor and/or at least some of the second sensor data obtained by the second sensor. Accordingly, in an example, rather than determining not to send any of the sensor data associated with the first sensor, the processors may instead be configured to: determine, based at least in part on the one or more properties, to preclude from data sent to the remote system, at least some of the sensor data associated with a first sensor.

In other cases, all the sensor data may be transmitted (rather than a subset) and instead, the order in which the sensor data is transmitted is based on the contact metrics of the objects within the fields of view of each sensor.

In examples, the plurality of sensors may be video cameras, configured to obtain video data. The sensor data obtained by the plurality of sensors may therefore be video data.

As mentioned previously, a property of a network connection may be an amount of available bandwidth, a speed or reliability of the network connection, a latency of the network connection, a stability of the network connection, a number of packets dropped, a quality of the network connection, a distance between the vehicle and the system/operator, a network or communication capability of the vehicle (for example, whether the vehicle has a particular network interface, such as a 5G or 6G antenna), a current vehicle processing load (e.g., whether a processor of the vehicle is degraded or overburdened). In examples, the sensor data may be precluded from being sent to the remote system depending upon the network connection. For example, if the bandwidth is low (such as lower than a threshold bandwidth).

In examples, each sensor may obtain sensor data, where the sensor data obtained by a sensor is associated with (and/or received from) the sensor.

In examples, objects viewed by a sensor are within a field of view of the sensor. In examples, each sensor of the plurality of sensors has at least one object within its field of view. In examples, a field of view of a sensor may be defined as an area or region that the sensor observes or gathers data from. In examples, an object may be within a field of view of two or more sensors.

In examples, a contact metric may be determined for each object.

A contact metric may be expressed as a value within a range, such as a value between 0 and 1, or 0 and 100, or as a percentage. A higher value or percentage may be associated with a higher probability of the object contacting the vehicle, and vice versa.

In examples, “unlikely to contact the vehicle” may mean that the probability of the objects within the field of view of the sensor contacting the vehicle is low or below a threshold probability. In examples, “unlikely to contact the vehicle” may mean that objects within the field of view of the sensor are least or less likely to contact the vehicle when compared to objects within the field of view of the other sensors of the plurality of sensors. In examples, “unlikely to contact the vehicle” may mean that the aggregated contact metric associated with the sensor data is below a threshold.

In examples, a potential future path or location may be determined for each object. In examples, determining potential future paths or locations of the plurality of objects may be based on perception data, such as perception data generated by the vehicle. As discussed above, perception data may be generated based on sensor data obtained from sensors. The sensors used to obtain sensor data for generating perception data may not be video cameras. For example, the sensors used to obtain sensor data for generating perception data may be lidar sensors. The perception data may therefore be used to determine (or may indicate) contact metrics for each of the objects within the environment. For example, perception data may indicate an object’s location and velocity, so that a potential future path or location can be determined. In examples, the vehicle may comprise a plurality of perception sensors in addition to the plurality of video cameras.

In examples, the action of the vehicle may be a future path or location of the vehicle, such as a trajectory or route that the vehicle will follow. The action may be an instruction, such as stop, brake, drive forwards or backwards, turn left or right, etc. The contact metrics for the objects can therefore be determined by knowing at least one future path or location of each object and at least one future path or location of the vehicle.

In examples, to determine a first sensor of the plurality of sensors that views one or more objects that are unlikely to contact the vehicle, the one or more processors may be configured to: (A) determine, based at least in part on the contact metrics for the plurality of objects and fields of views of the plurality of sensors, aggregated contact metrics associated with the plurality of sensors, and (B) determine the first sensor of the plurality of sensors based at least in part on the aggregated contact metrics associated with the plurality of sensors.

An aggregated contact metric may be determined for each sensor of the plurality of sensors. An aggregated contact metric for each sensor may be based on the contact metrics of the objects within a field of view of the sensor. An aggregated contact metric for a sensor may be, for example, based on an average, weighted average or sum of the contact metrics associated with the objects within the field of view of the sensor. For example, if a sensor views five objects, and each object has a contact metric associated with it (the contact metric representing the probability of that object colliding with or contacting the vehicle) the aggregated contact metric for that sensor may be an average or sum of the five contact metrics. In another example, the aggregated contact metric for a sensor may be the maximum of the contact metrics associated with the objects.

The first sensor may be determined from amongst the plurality of sensors based on the aggregated contact metrics of all the sensors. For example, the first sensor may be the sensor associated with the lowest aggregated contact metric (indicative of the objects within the field of view of the first sensor being unlikely or less likely to contact the vehicle when compared to objects within the field of views of the other sensors).

In examples, determining the first sensor of the plurality of sensors based at least in part on the aggregated contact metrics associated with the plurality of sensors may comprise ranking the sensors from most significant to least significant based on the aggregated contact metrics associated with each sensor.

In examples, to determine aggregated contact metrics associated with the plurality of sensors, the one or more processors may be configured to, for each sensor of the plurality of sensors: determine one or more objects that are within a field of view of the sensor, and determine an aggregated contact metric associated with the sensor based on the contact metrics associated with the one or more objects within the field of view of the sensor. In examples, an object may be determined to be within a field of view of the sensor if a location of the object is within an area or region that the sensor observes or gathers data from. A location of an object may be determined based on perception data.

In examples, the aggregated contact metric associated with the sensor is a sum of the contact metrics associated with the one or more objects within the field of view of the sensor. In other examples, the aggregated contact metric associated with the sensor is an average of the contact metrics associated with the one or more objects within the field of view of the sensor.

In examples, the one or more processors may further be configured to cause the one or more network interfaces to send the data to the remote system, the data comprising at least some sensor data associated with a second sensor of the plurality of sensors, the second sensor viewing one or more objects that are more likely to contact the vehicle than the one or more objects viewed by the first sensor are to contact the vehicle.

In an example, an aggregated contact metric associated with the second sensor is higher than the aggregated contact metric for the first sensor (thereby indicating that the objects viewed by the second sensor are more likely to contact the vehicle than the objects viewed by the first sensor).

In examples, sensor data obtained by the first sensor may be known as first sensor data. Sensor data obtained by the second sensor may be known as second sensor data.

In examples, the data sent to the remote system may further comprise at least some sensor data associated with a third sensor of the plurality of sensors, the third sensor viewing one or more objects that are more likely to contact the vehicle than the one or more objects viewed by the second sensor are to contact the vehicle, and the one or more processors are further configured to at least one of: (i) determine a transmission bit rate for the sensor data associated with the second sensor and determine a transmission bit rate for the sensor data associated with the third sensor, the transmission bit rate for the sensor data associated with the third sensor being higher than the transmission bit rate for the sensor data associated with the second sensor, or (ii) cause the one or more network interfaces to send the sensor data associated with the third sensor before the sensor data associated with the second sensor.

Sensor data obtained by the third sensor may be known as third sensor data. The transmission bit rate for the sensor data associated with the third sensor may be higher because the objects viewed by the third sensor are more likely to contact the vehicle. The transmission bit rates may therefore be based on the aggregated contact metrics of the sensors.

In examples, the one or more processors may be configured to cause the one or more network interfaces to send the sensor data to the remote system based on the determined transmission bit rates.

In examples, the transmission bit rate(s) may be determined based on the one or more properties of the one or more network connections. For example, if the property is a bandwidth, a higher bandwidth may mean that transmission bit rate(s) are higher, and vice versa.

In examples, sending the sensor data associated with the third sensor before the sensor data associated with the second sensor may mean that the sensor data associated with the third sensor is prioritized over the sensor data associated with the second sensor.

In examples, causing the one or more network interfaces to send the sensor data associated with the third sensor before the sensor data associated with the second sensor may comprise causing the one or more network interfaces to send the sensor data associated with the third sensor and the sensor data associated with the second sensor based on a Quality of Service (QoS) scheme.

In examples, the resolution/quality/frame rate of the sensor data may be varied. For example, the sensor data associated with the third sensor may be sent with a higher quality, resolution and/or frame rate than the sensor data associated with the second sensor.

In examples, there is further provided a method comprising: (i) obtaining, by a first sensor of a plurality of sensors, first sensor data associated with one or more objects in an environment in which one or more vehicles are located, (ii) obtaining, by a second sensor of the plurality of sensors, second sensor data associated with one or more objects in the environment, (iii) determining contact metrics associated with the one or more objects associated with the first sensor data, (iv) determining contact metrics associated with the one or more objects associated with the second sensor data, (v) determining one or more properties of one or more network connections to a remote system, (vi) determining, based at least in part on the contact metrics and the one or more properties, a subset of sensor data to send to the remote system, the subset of sensor data comprising at least some of the first sensor data and/or at least some of the second sensor data, and (vii) sending the subset of the sensor data to the remote system.

Accordingly, at least some sensor data from each sensor of the plurality of sensors may be transmitted to the remote system. For example, the first sensor data captured by the first sensor may be sent with a lower bit rate, resolution and/or frame rate compared to the second sensor data captured by the second sensor. In examples, the amount of sensor data transmitted for each sensor may be based at least in part on the contact metrics. For example, the contact metrics may indicate that the objects within a field of view of the first sensor are less likely to contact the vehicle than the objects with a field of view of the second sensor, and it may therefore be determined that a higher proportion of the second sensor data should be sent to the system when compared to the first sensor data. In examples, the amount of sensor data transmitted for each sensor may be based at least in part on the contact metrics and the one or more properties.

In examples, the order in which the sensor data from each sensor is transmitted to the remote system may be based at least in part on the contact metrics. For example, the contact metrics may indicate that the objects within a field of view of the first sensor are less likely to contact the vehicle than the objects with a field of view of the second sensor, and therefore that the second sensor data should be sent prior to the first sensor data.

In examples, the contact metrics may be determined based on perception data. For example, the perception data may indicate or be used to determine a future path or location of each object. In examples, the contact metrics may be determined based on an action of the vehicle.

In examples, when the contact metrics are determined for each object, it may not be known at that time which sensor (and therefore the sensor data) the object is associated with. For example, the contact metrics may be determined based on perception data that is separate from the first and second sensor data.

In examples, the objects associated with the first sensor data are within a field of view of the first sensor and the objects associated with the second sensor data are within a field of view of the second sensor.

In examples, obtaining sensor data may mean capturing and/or storing sensor data.

In examples, there may be additional sensors (that is, additional to the plurality of sensors) that do not obtain sensor data at any particular instance in time.

In examples, the plurality of sensors may be associated with a particular vehicle of the one or more vehicles (for example, the particular vehicle comprises the plurality of sensors).

In other examples, at least one sensor of the plurality of sensors may be associated with a first vehicle of the one or more vehicles, and the other sensors of the plurality of sensors may be associated with a second vehicle of the one or more vehicles. For example, the first and second vehicles may be located near to each other, and therefore share one or more network connections. For example, the first and second vehicles may share bandwidth and it may be useful for the vehicles to determine which sensors are most significant, so that the most significant sensor data can be transmitted to the system. The vehicles can therefore optimize use of the one or more network connections to prioritize which data is sent to the remote system. In such cases, a contact metric for an object may be based on the vehicle on which the sensor viewing the object is located. For example, a contact metric may be determined for each object within the field of view of the first sensor (which may be located on a first vehicle), and the contact metric is associated with a probability of contact between the first vehicle and the object.

In examples, the remote system may be associated with a plurality of operators, each monitoring at least one vehicle of the one or more vehicles. For example, the first vehicle may be monitored by a first operator and the second vehicle may be monitored by a second operator.

In examples, the subset of the sensor data may not include the first sensor data associated with the first sensor and may comprise at least some of the second sensor data associated with the second sensor. As such, sensor data associated with the first sensor may not be sent to the remote system. In an example, the method may comprise determining not to send the first sensor data to the remote system based at least in part on the contact metrics and the one or more properties.

In examples, determining, based at least in part on the contact metrics and the one or more properties, a subset of sensor data to send to remote system, may comprise determining, based at least in part on the contact metrics and fields of views of the first and second sensors: that the first sensor views one or more objects that are unlikely to contact a vehicle of the one or more vehicles and that the second sensor views one or more objects that are more likely to contact a vehicle of the one or more vehicles, and determining, based at least in part on the one or more properties, to: preclude from the subset of the sensor data sent to the remote system, the first sensor data, and include in the subset of the sensor data, at least some of the second sensor data.

As such, in examples, the objects within the field of view of the first sensor may be less likely to contact the vehicle when compared to the objects within the field of view of the second sensor.

In examples, the first sensor data is associated with one or more first objects, and the second sensor data is associated with one or more second objects. In examples, the one or more first objects and the one or more second objects form a plurality of objects in the environment. In examples, the method may comprise determining, for each object of the plurality of objects, which sensor the object is viewed by (for example, which sensor the object is within a field of view of). For example, based on perception data, each object represented in the perception data may be associated with one or more sensors based on whether the object is located within a field of view of the sensor. Once each object is associated with at least one sensor, aggregated contact metrics for each sensor can be determined based on the contact metrics associated with the objects within the field of view of the sensor. It will be appreciated that some objects represented in the perception data may not be within a field of view of any sensor. For example, perception sensors may gather data from a location that is not within a field of view of any of the video cameras.

As mentioned, in examples, the subset of the sensor data may comprise at least some of the first sensor data and at least some of the second sensor data. In an example, the subset of the sensor data may comprise at least some sensor data from each sensor of the plurality of sensors.

In an example, determining, based at least in part on the contact metrics and the one or more properties, a subset of sensor data to send to the remote system comprises determining, based at least in part on the contact metrics and fields of views of the first and second sensors: that the first sensor views one or more objects that are unlikely to contact a vehicle of the one or more vehicles, and that the second sensor views one or more objects that are more likely to contact a vehicle of the one or more vehicles, and determining, based at least in part on the one or more properties, to: include in the subset of the sensor data, at least some of the second sensor data and include in the subset of the sensor data, a subset of the first sensor data.

In examples, the amount of sensor data associated with the second sensor that is sent may be greater than the subset of the sensor data associated with the first sensor.

In examples, sending the subset of the sensor data to the remote system, may comprise at least one of: (i) determining a first transmission bit rate for the first sensor data, determining a second transmission bit rate for the second sensor data, the second transmission bit rate being higher than the first transmission bit rate, and sending the subset of the sensor data based on the first and second transmission bit rates, or (ii) sending the second sensor data before sending the first sensor data.

In examples, at least one of: (i) the first and second transmission bit rates are determined based on the one or more properties of the one or more network connections, or (ii) the first transmission bit rate is determined based on the contact metrics associated with the one or more objects that are within a field of view of the first sensor and the second transmission bit rate may be determined based on the contact metrics associated with the one or more objects that are within a field of view of the second sensor. As an example, a higher bandwidth (a property of a network connection) may mean that the bit rate(s) can be higher, or vice versa. As another example, a higher contact metric may mean that the bit rate should be higher, or vice versa.

In examples, the method may further comprise: determining a first aggregated contact metric associated with the first sensor, and determining a second aggregated contact metric associated with the second sensor, wherein determining a subset of the sensor data to send to the remote system comprises determining the subset of the sensor data based on the first and second aggregated contact metrics. In examples, the first aggregated contact metric associated with the first sensor may be determined based on the contact metrics associated with the one or more objects associated with the first sensor data. Similarly, in examples, the second aggregated contact metric associated with the second sensor may be determined based on the contact metrics associated with the one or more objects associated with the second sensor data. The subset of the sensor data may then be determined based on the aggregated contact metrics. For example, the lowest priority data (i.e., the sensor data associated with the sensor having the lowest aggregated contact metric) may not be transmitted or may be transmitted at a lower bit rate, resolution and/or frame rate, etc. than higher priority sensor data.

In examples, determining the first aggregated contact metric may comprise: (i) determining one or more objects that are within a field of view of the first sensor, and (ii) determining the first aggregated contact metric based on the contact metrics associated with the one or more objects within the field of view of the first sensor, and determining the second aggregated contact metric may comprise: (i) determining one or more objects that are within a field of view of the second sensor, and (ii) determining the second aggregated contact metric based on the contact metrics associated with the one or more objects within the field of view of the second sensor. In examples, perception data may be used to determine the one or more objects that are within a field of view of the first/second sensor.

In examples, a plurality of data networks may be available for sending data to the remote system, and sending the subset of the sensor data to the remote system may comprise: sending at least some of the first sensor data to the remote system via a first data network, and sending at least some of the second sensor data to the remote system via a second data network, wherein the first and second data networks are selected based at least in part on the contact metrics. Selecting a particular network to send the data may be useful when the data networks vary in capability. For example, one data network may be more reliable than another network, so it may be useful to transmit the most significant data via the more reliable network. As mentioned, the contact metrics can determine how significant the sensor data associated with each sensor may be.

In examples, the method may comprise: determining one or more properties of the first network connection and one or more properties of the second network connection. The method may further comprise: (i) determining to send at least some of the first sensor data to the remote system via the first data network based on the one or more determined properties of the first network connection and the contact metrics associated with the one or more objects associated with the first sensor data, and (ii) determining to send at least some of the second sensor data to the remote system via the second data network based on the one or more determined properties of the second network connection and the contact metrics associated with the one or more objects associated with the second sensor data.

In examples, the one or more vehicles comprise a first vehicle and a second vehicle, and the first vehicle may comprise at least the first sensor of the plurality of sensors and the second vehicle may comprise at least the second sensor of the plurality of sensors. Alternatively, the one or more vehicles may comprise a single vehicle, the vehicle comprising the plurality of sensors. In examples, determining a subset of the sensor data to send to the remote system, may comprise: transmitting data between the first and second vehicles to determine the subset of the sensor data to send to the remote system. For example, each vehicle may determine an aggregated contact metric associated with each of its sensors, and at least one of the first and second vehicles may share the aggregated contact metrics with the other vehicle, so that the most significant sensor data can be determined, and then prioritized over the other sensor data.

As mentioned, in examples, the first and second sensors may be video cameras, and the first sensor data may be first video data, and the second sensor data may be second video data.

In examples, there is further provided one or more non-transitory computer-readable media storing instructions that, when executed by one or more processors of a system comprising one or more vehicles, cause the one or more vehicles to perform operations comprising: obtaining, by a first sensor of a plurality of sensors, first sensor data associated with one or more objects in an environment in which the one or more vehicles are located; obtaining, by a second sensor of the plurality of sensors, second sensor data associated with one or more objects in the environment; determining contact metrics associated with the one or more objects associated with the first sensor data; determining contact metrics associated with the one or more objects associated with the second sensor data; determining one or more properties of one or more network connections to a remote system; determining, based at least in part on the contact metrics and the one or more properties, a subset of sensor data to send to the remote system, the subset of sensor data comprising at least some of the first sensor data and/or at least some of the second sensor data; and sending the subset of the sensor data to the remote system.

More detailed examples, as well as method(s) and computer-readable media of the present disclosure will now be presented, with reference to the accompanying figures.

FIG. 1 depicts an example implementation of the present disclosures. As shown, an autonomous vehicle 110 is located within an environment. In this example, the vehicle 110 is navigating throughout the environment at a particular speed, but in other examples, the vehicle 110 may be stationary. The vehicle 110 comprises one or more processors (shown in FIG. 17) and one or more non-transitory computer readable media (shown in FIG. 17) having instructions stored thereon which, when executed by the one or more processors, cause the one or more processors to perform particular operations, which will be discussed in more detail below. It will be appreciated than any reference to a vehicle performing an operation/action will be understood to be performed by one or more processors of the vehicle.

The vehicle 110 further comprises one or more sensors 112 that capture sensor data associated with the environment and the vehicle 110 stores (at least temporarily) the sensor data. The sensors 112 may include ultrasonic sensors to acoustically detect objects in the surroundings, lidar sensors, radar sensors, infra-red sensors, etc. In an example, the vehicle may generate perception data based on the sensor data captured by the one or more sensors 112.

FIG. 1 depicts a view 116 of the environment within which there may be one or more moving (i.e., non-stationary) objects, such as one or more pedestrians, vehicles or cyclists, as well as one or more stationary objects, such as one or more parked or stopped vehicles, buildings, signs, etc.

As briefly mentioned, sensor data captured by the one or more sensors 112, may be processed by the vehicle 110 (such as by a perception component of the vehicle 110) to generate perception data. For example, the data from the one or more sensors 112 may be fused to create perception data that represents one or more objects in the environment around the vehicle. The perception data may be used by a planning component of the vehicle 110 (discussed in more detail with reference to FIG. 17) which determines instructions for controlling operation of the vehicle 110 based at least in part on the perception data. In examples, the sensors 112 that obtain sensor data that is used to generate perception data may be known as perception sensors. In examples, there may be one or more further sensors, such as one or more video cameras. In some cases, video data obtained by video cameras are not used to generate perception data. In other cases, video data obtained by video cameras may be used to generate perception data.

A remote system 100 may be communicatively coupled to the vehicle 110 via one or more networks 114. Data can be transmitted to the remote system 100 via the network 114. Accordingly, the vehicle 110 may comprise one or more network interfaces (shown in FIG. 17) to enable data, such as perception data and/or sensor data, to be transmitted to the remote system 100. Video data may also be transmitted to the remote system 100. In this example, the network interface comprises a wireless antenna for sending the data to the remote system 100. In this example, the wireless antenna is compatible with a mobile telecommunications network, such as a 4G or 5G wireless network.

A human operator 118 may monitor and/or control the vehicle 110 via the system 100. For example, the operator 118 may provide instructions, such as driving or navigation instructions to the vehicle to remotely guide the vehicle informed by data received from the vehicle 110. The remote system 100 may be used for monitoring one or more vehicles. For example, a single operator or multiple operators may monitor a plurality of vehicles. In examples, the remote system 100 may comprise one or more workstations or terminals, each operated by an operator. The workstations/terminals may be co-located, or may be remote from each other (and remote from the one or more vehicles).

The system 100 comprises one or more processors 102 and one or more non-transitory computer readable media 104 having instructions stored thereon which, when executed by the one or more processors 102, cause the one or more processors 102 to perform particular operations, which will be discussed in more detail below. Each workstation/terminal may comprise at least one processor and at least one computer readable media. It will be appreciated than any reference to the remote system performing an action/operation will be understood to be performed by one or more processors of the system.

In examples, there may be one or more vehicles within the environment. For example, there may be two or more vehicles in the environment. In examples, the vehicles may transmit data between each other. In examples, each vehicle transmits data to the remote system 100.

Figure 17:
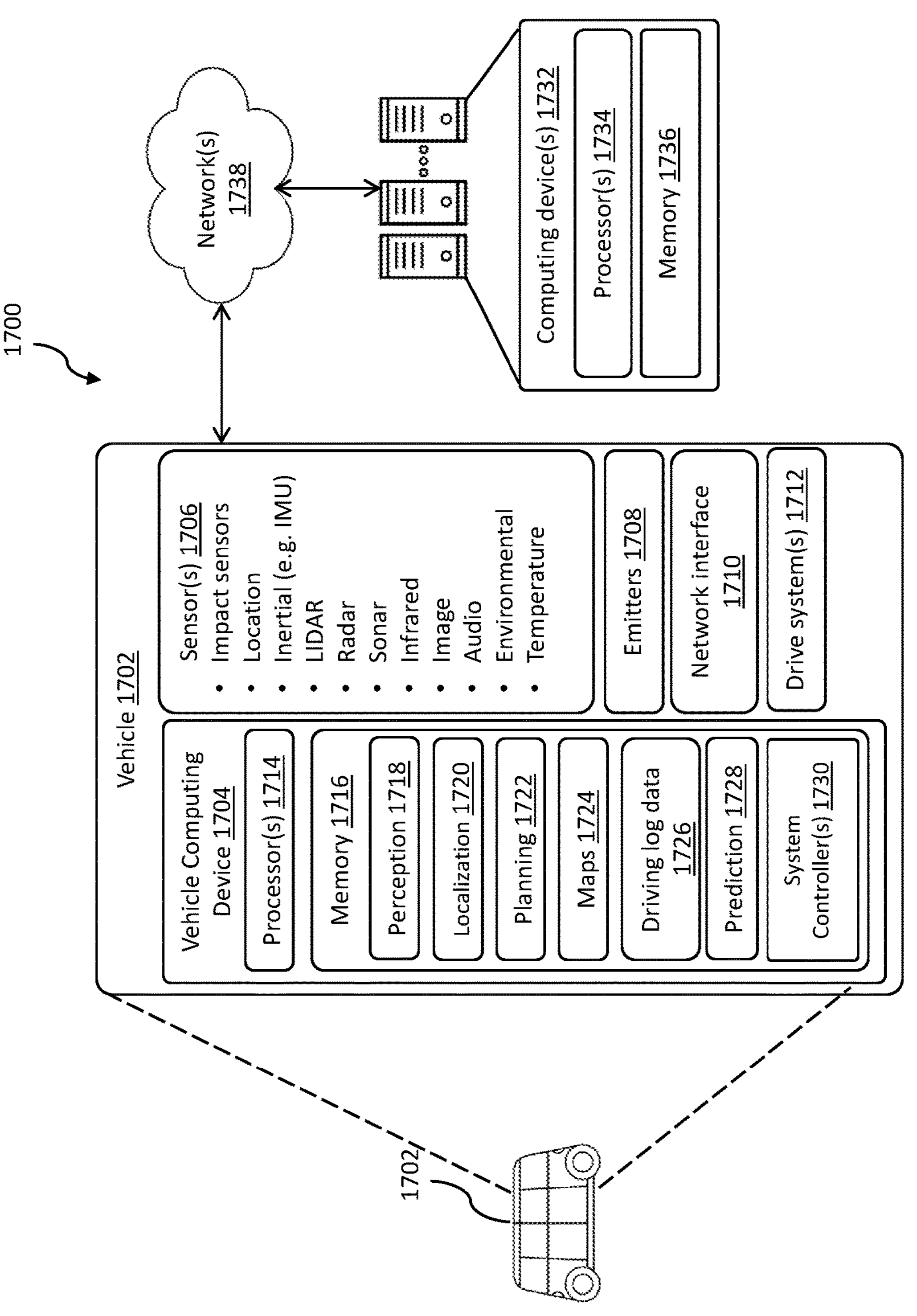
FIG. 17 is a block diagram of an example vehicle system.

The vehicle 110 may also determine or store prediction data, where the prediction data is generated by a prediction component of the vehicle 110 (discussed in more detail in FIG. 17). The prediction data can be sent or otherwise transmitted to the remote system 100 via the network 114. For example, the prediction data may be transmitted to the system 100 as part of the perception data.

Once the system 100 receives the perception data, the system 100 can use the perception data to generate a model, such as a graphical model, of the environment.

In some cases, the sensor data captured by the one or more sensors 112 may be transmitted to the remote system 100, rather than or in addition to the perception data generated by the vehicle. The system 100 may itself process the sensor data to generate the perception data and/or the model of the environment, in some cases in the same way or in a similar way as the vehicle would generate the perception data.

The system 100 may further comprise at least one display 106 (also known as a computer monitor) for displaying information to the operator 118. The system 100 may further comprise one or more input devices 120 to receive user input from the operator 118. For example, the user input may cause an instruction to be transmitted to the vehicle 110 via the network 114 which causes the vehicle 110 to perform an action, such as follow a particular navigation path through the environment. In an example, the one or more displays 106 are themselves input devices 120. For example, the one or more displays 106 may comprise a touch screen display 106 which can accept user input. Each workstation/terminal may comprise at least one display and at least one input device.

The information displayed or otherwise output on the one or more displays 106 can include a representation 108 of the perception data. For example, the model of the environment may be displayed, where the model is generated based on the perception data. FIG. 1 depicts one of the one or more displays 106 displaying a representation 108 of the perception data received from the vehicle 110.

Although FIG. 1 shows the representation 108 of the perception data as a 2D representation of the environment, it will be appreciated that the representation 108 of the perception data may be a 3D representation of the environment. The one or more displays 106 may additionally or alternatively display video data from one or more video cameras on the vehicle(s).

While the one or more displays 106 are displaying the representation 108 of the perception data, the operator 118 may provide a user input, such as via the one or more user input devices 120. For example, the user may designate a navigation path within the representation 108 of the perception data, and data indicative of the navigation path may be transmitted from the system 100 to the vehicle 110. The vehicle 110 may then follow the navigation path or may adjust the navigation path based on further perception data generated by the vehicle 110.

As discussed, the vehicle 110 may determine a property of a network connection between the vehicle and the system. For example, the vehicle 110 may determine an amount of available bandwidth using one or more existing techniques. For example, the vehicle 110 may transmit one or more data packets to the system 100 and based on the number of packets dropped or a timing between receiving one or more acknowledgement packets from the system 100, the vehicle may determine at least one property of the network connection. The property may be indicative of network conditions for the network connection. In some examples, one or more network connections may be available between the vehicle 110 and the system 100. The vehicle 110 may determine one or more properties of one or more network connections between the vehicle and the system.

Under "normal" or "good" network conditions, such as when the bandwidth is above a threshold, the vehicle 110 may transmit much of the perception data to the system 100 or at least a default or desired amount of the perception data. However, under "poor" or degraded network conditions (relative to the normal or good network conditions), such as when the bandwidth is below the threshold, the vehicle 110 may determine to transmit less of the perception data (i.e., a subset of the perception data). The subset of the perception data comprises less perception data (i.e., the perception data has a smaller data size) than it would otherwise comprise under normal, better or good network conditions.

Accordingly, based on the determined property of the network connection, the vehicle 110 may determine a subset of the perception data for transmitting to the remote system 100. The vehicle 110 may determine the subset of the perception data via one or more techniques which will be described in further detail below. Once the subset of the perception data has been determined, the vehicle 110 can transmit to the system 100 the subset of the perception data. Upon receiving the subset of the perception data, the system 100 can display on the one or more displays 106, a representation of the subset of the perception data for viewing by the operator 118. In some cases, the system 100 can also display on the one or more displays 106 earlier received perception data (such as an earlier received subset) at the same time to augment the most recently received subset of the perception data.

In examples, the system 100 may display on the one or more displays 106 an indication that some perception data may be missing (i.e., may not have been transmitted by the vehicle). For example, a notification or other identifier may be displayed to alert the operator that some perception data may be missing. The vehicle 110 may transmit to the system 100 data indicating that only a subset of perception data is being transmitted, or the system 100 may itself be able to infer that only a subset of perception data has been received (such as by determining that one or more characteristics are not included). In examples, the way in which the representation of the subset of the perception data is displayed may itself indicate that some perception data may be missing. For example, if the subset of the perception data relates to objects within a particular area or location, other areas or locations may be displayed differently, such as greyed out. Earlier received perception data that is also being represented/displayed, or other areas on a displayed map, may therefore be displayed slightly greyed out (i.e., displayed with a lower hue or brightness or contrast). The representation of the subset of the perception data may therefore be more visible or noticeable, and therefore indicate that some perception data is missing. Additionally or alternatively, objects associated or represented in the subset of the perception data may be displayed to highlight the objects, such as having a particular coloured outline, or increased brightness, hue or contrast.

In examples, the vehicle 110 may transmit perception data and the subset of the perception data to the system 100 based on "topics". For example, one or more processors of the vehicle may collate one or more data packets for one topic, and one or more processors of the vehicle may collate one or more data packets for another topic. A topic may be based on a classification of objects. For example, there may be a "vehicle" topic and a "pedestrian" topic, and so data associated with the different classifications may be determined and transmitted separately.

FIG. 2 depicts an example of perception data 202 that may be determined or generated by the vehicle 110 based on sensor data from the one or more sensors 112. In the table of FIG. 2, each row is associated with a different object in the environment, and each column corresponds to a characteristic associated with the objects. In this example, the characteristics include: an object number (or other unique identifier associated with the object), a classification or object type, a location of the object in the environment, a distance between the object and the vehicle 110, a size of the object, a speed or velocity, a priority or priority level, or predicted future trajectory or location. It will be understood that in other examples there may be fewer or greater numbers of objects and/or fewer or greater numbers of characteristics associated with each object. In examples, the objects are associated with a different number of characteristics depending on the object. For example, only certain objects or types of object may be associated with a speed or velocity, such as objects that typically are capable of moving, such as vehicles, pedestrians, etc.

In some examples (not shown in FIG. 2), objects may be associated with a contact metric. A contact metric is based on a probability of a collision or contact between the vehicle and the object.

In FIG. 2, the entire table represents the entire perception data 202 determined or generated by the vehicle 110 for a particular time period. Under normal network conditions (such as when the vehicle 110 determines that a property of the network connection is above a threshold), a default amount or level of the perception data 202 may be transmitted to the system 100. For example, all of the perception data 202 may be transmitted by the vehicle 110 to the system 100.

In contrast, box 204 represents an example subset of the perception data which may be determined based on the current network conditions. For example, the vehicle 110 may determine that a property of the network connection has fallen below a threshold, and accordingly, determine a subset of the perception data to be transmitted to the system 100. In this case, box 204 represents a subset of the perception data, where the subset of the perception data comprises perception data associated with all the objects detected by the vehicle 110, but a subset of the characteristics associated with each object. It will be understood that the subset of characteristics shown in FIG. 2 are merely exemplary, and a different subset of characteristics may be determined. In examples, the subset of the perception data comprises the same subset of characteristics, such as object number, classification, location and distance, as shown in FIG. 2. The subset of characteristics may depend on the network conditions (i.e., the property of the network connection), for example. In other examples, the subset of characteristics may be different for each object. The subset of characteristics may depend on one or more characteristics associated with the object, such as the classification, for example. For example, perception data associated with vehicles may include a particular subset of characteristics, whereas perception data associated with pedestrians may include a different subset of characteristics. As another example, perception data associated with objects having a particular priority level may include a particular subset of characteristics, whereas perception data associated with objects having a different priority level may include a different subset of characteristics. In some cases, the subset of characteristics depends on both the network conditions and one or more characteristics of the object (such as the classification of the object). As mentioned, once the subset of the perception data has been determined, the vehicle 110 can send the subset of the perception data to the system 100 via the network 114, thereby reducing the burden on the network and network connection.

Box 206 represents another example subset of the perception data which may be determined based on the current network conditions. In this case, box 206 represents a subset of the perception data, where the subset of the perception data comprises perception data associated with a subset of the objects and all of the characteristics associated with each object. It will be understood that the subset of objects shown in FIG. 2 are merely exemplary, and a different subset of objects may be determined. In examples, the subset of objects may all be located within a predetermined distance of the vehicle 110, such as within 15 m of the vehicle 110. In other examples, the subset of objects may all be associated with the same characteristic, such as that they all have the same classification. In other examples, the subset of objects may all have a contact metric above a certain threshold contact metric. As mentioned, once the subset of the perception data has been determined, the vehicle 110 can send the subset of the perception data to the system 100 via the network 114.

Box 208 represents another example subset of the perception data which may be determined based on the current network conditions. In this case, box 208 represents a subset of the perception data, where the subset of the perception data comprises perception data associated with a subset of the objects and a subset of the characteristics associated with each object. It will be understood that the subset of objects and the subset of characteristics shown in FIG. 2 are merely exemplary, and a different subset of objects and/or a different subset of characteristics may be determined. In examples, the subset of objects may all be located along a route or trajectory that will be followed by the vehicle 110, such as located within a predetermined distance of the trajectory or route, such as within 15 m of the trajectory or route. In other examples, the subset of objects may all be associated with the same characteristic, such as all have the same classification. In examples, the subset of the perception data comprises the same subset of characteristics, such as object number, classification and location, as shown in FIG. 2, but in other examples, the subset of characteristics may be different for each object in the subset. The subset of characteristics may depend on the classification, for example. As mentioned, once the subset of the perception data has been determined, the vehicle 110 can send the subset of the perception data to the system 100 via the network 114.

As discussed, in some cases, certain characteristics may be dropped, and therefore not included in the subset of the perception data. In examples, the size data may not be included, as shown in boxes 204 and 206. In some cases, size data may not be included only for some objects in the subset of the perception data, and size data may be included for other objects. In examples, upon receipt of the subset of the perception data, the system 100 may determine that size data is not included for one or more objects. In such cases, the system may use standard, default or average sizes, when displaying a representation of the subset of the perception data on the one or more displays 106.

In other examples, a classification of an object or vehicle may be "dropped" and not included in the subset of the perception data.

Box 210 represents another example subset of the perception data which may be determined based on the current network conditions. In this case, box 210 represents a subset of the perception data, where the subset of the perception data comprises perception data associated with a subset of the objects and at least a subset of the characteristics associated with each object. In this example, the subset of objects (which includes only one object in this example) is determined based on a characteristic associated with each object of the subset of objects. In this case, the characteristic is a priority of the object, and the vehicle determines the subset of objects from the plurality of objects based on the subset of objects having a particular priority. For example, each object in this particular subset of objects has the same priority level (such as priority level 1, indicating that the object has the highest priority). The subset of perception data therefore comprises perception data for objects having a particular priority. In this example, the vehicle in the subset of box 210 is an emergency vehicle. As mentioned, once the subset of the perception data has been determined, the vehicle 110 can send the subset of the perception data to the system 100 via the network 114. In some examples, objects may be assigned priorities based on their contact metrics.

As briefly mentioned above, based on the property of the network connection (such as the amount of available bandwidth), the vehicle 110 may vary the rate/frequency at which perception data, or perception data for certain objects (such as objects with a particular classification) is transmitted to the system 100. For example, when the network conditions are poor, perception data associated with one or more particular characteristics may be transmitted less frequently than when the network conditions are good or better and at a different rate/frequency to perception data associated with other characteristics.

Accordingly, the vehicle 110 may determine, based on the property of the network connection, a frequency or rate at which to transmit the subset of the perception data from the vehicle to the system. Once this frequency or rate has been determined, the subset of the perception data may be transmitted based on that frequency or rate. For example, this may include waiting a predetermined period of time after transmitting an earlier subset of the perception data. Future subsets of the perception data may also be transmitted based on the frequency or rate (or an updated frequency or rate, if the network conditions have changed).

In examples, the subset of the perception data corresponds to perception data of a particular type (such as a particular classification), and the frequency is further determined based on the particular type. For example, the subset of the perception data may be associated with a subset of objects, each object being of a particular object type. For example, perception data associated with vehicles may be transmitted more frequently than perception data associated with pedestrians, regardless of the network conditions.

To illustrate, FIG. 3 depicts an example of how transmission rates/frequencies may vary for different object classifications during different network conditions. For example, each row in table 302 represents objects of different classifications, such as pedestrians, vehicles, buildings, cyclists, etc. Each column in table 302 represents different transmission frequencies/rates under different network conditions.

For example, as shown in FIG. 3, for each classification, the transmission frequency/rate decreases as the network conditions worsen. It will be appreciated that the transmission frequencies/rates are merely exemplary, and different frequencies/rates are possible. Similarly, while FIG. 3 depicts transmission frequencies/rates for three different network conditions, but it will be appreciated that in other examples there may be transmission frequencies/rates associated with one or more different network conditions. For example, the table may indicate frequencies/rates for a single network condition, such as when the property of the network connection is below a threshold. Above that threshold, the transmission frequencies/rates may be more dynamic. In examples, such as depending on the classification and/or priority, the transmission frequency/rate may not be different for each different network condition. For example, the transmission frequency/rate associated with high priority vehicles (such as emergency vehicles) may be constant regardless of the network condition, or be the same for at least two different network conditions.

As discussed earlier, a subset of perception data (like those illustrated in FIG. 2) can be determined based on a property of the network connection between the vehicle 110 and the system 100, and the perception data making up the subset of perception data can relate to a subset of objects detected by the vehicle, where the subset of objects can be determined based on one or more different criteria, such where the object is located, whether the object has a particular characteristic, whether the object is used for determining how the vehicle behaves (such as whether the vehicle needs to perform an action) or whether the object has a certain contact metric. Additionally or alternatively, different characteristics can be omitted from the subset of the subset of the perception data. For example, different characteristics can be omitted from the subset of the perception data depending upon one or more different criteria, such as the property of the network connection or one or more characteristics, such as the classification of the object. For example, as network conditions worsen, the same characteristics may be omitted from the subset of perception data, or different characteristics may be omitted based on the classification of the object. For example, size data may be omitted for one object classification (such as cyclist) whereas it is included in the subset of the perception data for another object classification (such as vehicle).

FIGS. 4-10 depict various ways in which the subset of perception data may be determined.

Figure 4:
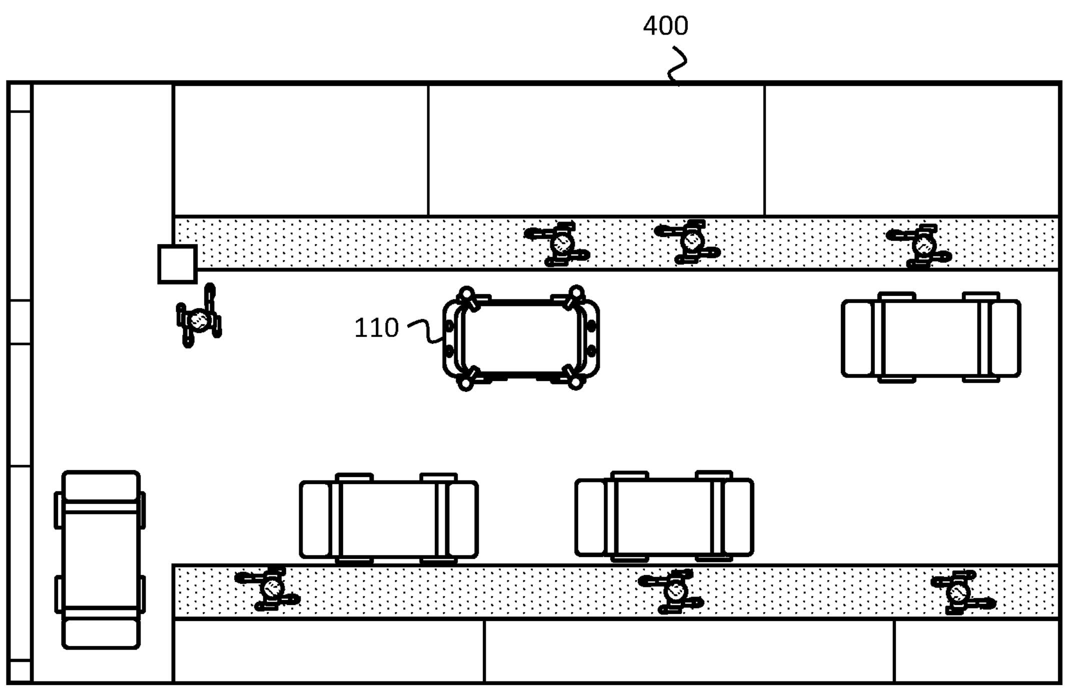
FIG. 4 depicts a top-down view of an environment around the vehicle, according to an example.

FIG. 4 depicts a top-down view 400 of the environment around the vehicle 110, where the environment contains one or more objects, and in particular a plurality of objects. In this example, the environment comprises a plurality of pedestrians and vehicles, as well as the vehicle 110 of FIG. 1, in addition to road and sidewalk surfaces and buildings. For illustrative purposes, it will be assumed that each object depicted in FIG. 4 is detectable by the one or more sensors 112 on the vehicle 110. Accordingly, once the one or more sensors 112 obtain sensor data associated with the environment, perception data may be generated by the vehicle 110, where the perception data is associated with the objects depicted in FIG. 4. As an example, perception data similar to that shown in FIG. 2 may be generated.

Assuming perception data generated by the vehicle 110 represents the objects shown in FIG. 4, and the perception data is transmitted to, and received by, the system 100, the operator 118 may be presented with a view on the one or more displays 106 that corresponds to the view 400. FIG. 4 may therefore depict or correspond to a representation of the perception data under "normal" network conditions. However, should network conditions degrade, the view as seen by the operator 118 may change, be less accurate at representing the true environment, or be incomplete, as a result of receiving a subset of the perception data. For example, fewer objects may be displayed and/or the data underpinning where or how the objects are displayed may be less accurate or incomplete compared to when the network conditions are normal.

As mentioned, in examples, when the perception data is associated with a plurality of objects in the environment, a subset of the perception data may be determined based on the property of the network connection, where the subset of the perception data comprises perception data associated with a subset of objects from the plurality of objects.

Figure 5:
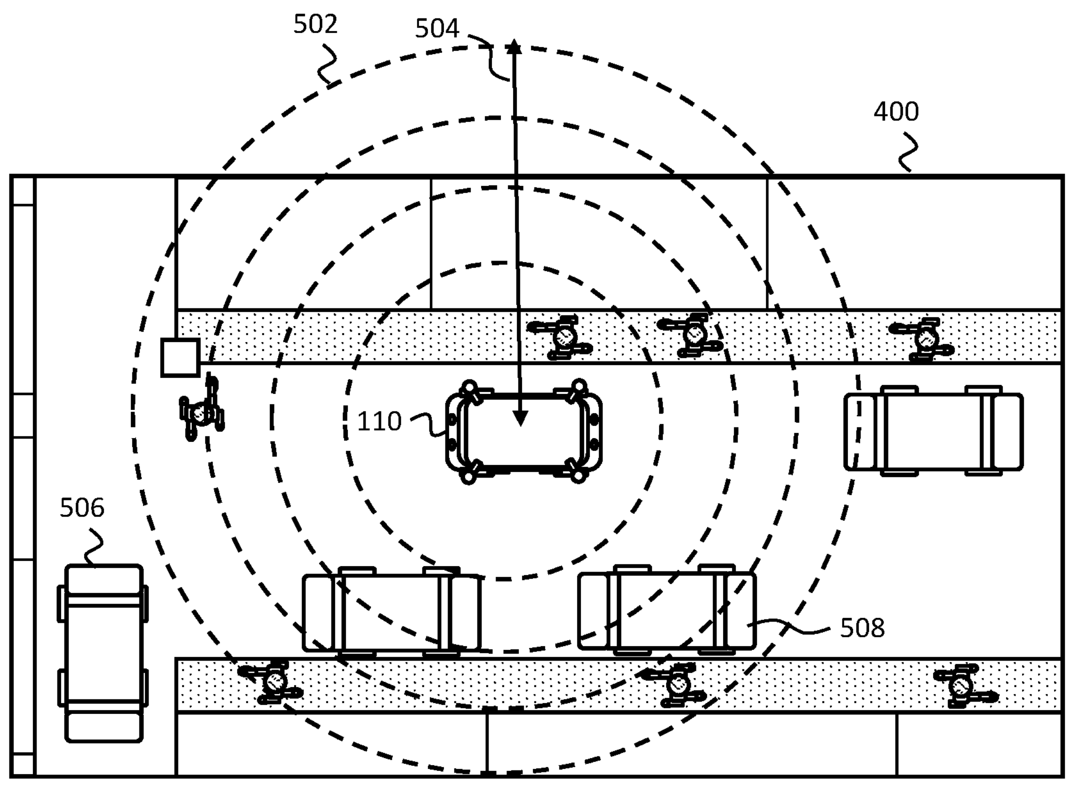
FIGS. 5-8 depict examples in which a subset of perception data may be determined.

FIG. 5 depicts a first example in which a subset of objects may be determined from the plurality of objects represented in the perception data (and therefore in the sensor data). In particular, FIG. 5 relates to an example whereby the location of each object determines whether the object is included in the subset of objects (and therefore is represented in the subset of the perception data), or whether the object is not included in the subset of objects (and therefore not represented in the subset of the perception data). In this case, the subset of the perception data includes perception data associated with objects that are located within a predetermined distance of the vehicle. As mentioned, in some examples the location may be a current, actual determined location of the object. In other examples, the location may be a predicted future location of the object. For example, a prediction component of the vehicle may determine that there is a probability that the object may be located at a particular location in the near future.

To determine whether objects are located within a predetermined distance of the vehicle, the perception data for each object may include a characteristic, such as a location and/or a distance between the vehicle and the object, that allows a location of the object to be determined.

The vehicle 110 therefore determines, for each object of the plurality of objects represented in the perception data, whether the object is located within a predetermined distance of the vehicle (in other words, whether the distance between the vehicle and the object is less than or equal to the predetermined distance). The distance may be 25 m, 20 m, 15 m, 10 m, etc. If the object is located within the predetermined distance of the vehicle, at least some of the perception data associated with that object is included in the subset of the perception data that is transmitted to the system. For example, one or more characteristics associated with the object may be transmitted to the system in the subset of the perception data. If the object is not located within the predetermined distance of the vehicle, perception data associated with that object is not included in the subset of the perception data that is transmitted to the system. In this way, some objects may be filtered out.

FIG. 5 depicts an area defined by a boundary (in this case a circumference 502) having a radius 504 extending away from the vehicle 110 (for example, the area may be centered about a particular part of the vehicle). The radius 504 may therefore correspond to a predetermined distance, such that the objects located within the particular area shown in FIG. 5 will be represented in the subset of the perception data transmitted to the system 100. In examples, the radius/distance is measured from the sensor 112 that detects the object, rather than the geometric center of the vehicle, as illustrated in FIG. 5. In some cases, the area is not circular, and may have any other shape.

FIG. 5 depicts several differently sized areas, each area being defined by radii of different lengths. In examples, the radius length, and therefore the predetermined distance (and area) may depend on the network conditions. For example, after a property of a network connection has been determined, the radius or predetermined distance may be determined based on the property. For example, a particular radius/distance/area may be determined if the property of the network connection indicates the network connection is of a certain quality (such as having a certain amount of available bandwidth), and a smaller radius/distance/area may be determined if the property of the network connection indicates the network connection is of a lower quality (such as having a lower amount of available bandwidth). Conversely, a larger radius/distance/area may be determined if the property of the network connection indicates the network connection is of a higher quality (such as having a higher amount of available bandwidth). In other cases, the predetermined distance may not depend on the measured property of the network connection, and instead it may be set at a default distance, such as 10 m. In examples, the system 100 may transmit data to the vehicle 110, where the data is indicative of the predetermined distance/radius. For example, an operator 118 may set the distance via a user input.

FIG. 5 shows illustratively how at least one object of the plurality of objects represented in the perception data may be "filtered" and therefore not represented in the subset of the perception data. For example, the subset of the perception data may not include perception data associated with object 506 (since it is not within the predetermined distance), but may include perception data associated with object 508. Furthermore, a different subset of objects may be represented in the subset of the perception data depending on the predetermined distance. For example, the subset of perception data may be associated with a greater number of objects when the predetermined distance is larger.

Once the subset of the perception data has been determined, where the subset of the perception data is associated with a subset of the plurality of objects, the subset of the perception data is transmitted to, and received by the system 100. The system 100 may therefore display, on the one or more displays 106, a representation of the subset of the perception data. The operator may therefore only see representations of the subset of the plurality of objects, rather than representations of each of the plurality of objects associated with the full perception data generated by the vehicle 110. The operator 118 may see an incomplete or less accurate representation of the environment (although the operator 118 may not necessarily be aware they are viewing a representation based only on a subset of the perception data). In some cases, the vehicle 110 transmits to the system data indicating that the perception data is a subset of the perception data generated by the vehicle. In some cases, the system 100 may be able to infer or separately determine that the perception data is a subset of the perception data, without needing the vehicle 110 to indicate explicitly. A notification may be displayed to the operator 118 on the one or more displays 106 indicating that that the representation is based on a subset of the perception data. The operator 118 may therefore be more cautious about providing driving instructions to the vehicle 110 knowing that they have a possible inaccurate or incomplete view of the environment. As another example, and as discussed earlier, when the operator views a representation of the perception data on a display 106, areas outside of the circumference 502 may be greyed out, so the operator is aware that the displayed representation of the perception data relates only (or mostly) to objects inside the circumference. In another example, the area or circumference 502 is displayed.

In a variation of the example of FIG. 5, rather than the subset of objects being determined based on whether the objects are located within a predetermined distance of the vehicle, the subset of objects may be determined based on whether the objects are within a predetermined distance of a particular location. The particular location may not be a location on the vehicle 110, as in the example of FIG. 5. Instead, the location may be away from the vehicle, such as a location in front of the vehicle 110 or a future location of the vehicle 110 (such as a location along a trajectory or route that the vehicle 110 will follow). In one example, the location may be specified by the operator 118. For example, the vehicle 110 may receive, from the system 110, data indicative of the particular location. In examples, the operator may additionally or alternatively specify the predetermined distance. In other examples, the predetermined distance may be based at least in part on the property of the network connection. In examples, the location may be based at least in part on the property of the network connection. For example, the location may be closer or further away from the vehicle based on the network conditions.

Figure 6:
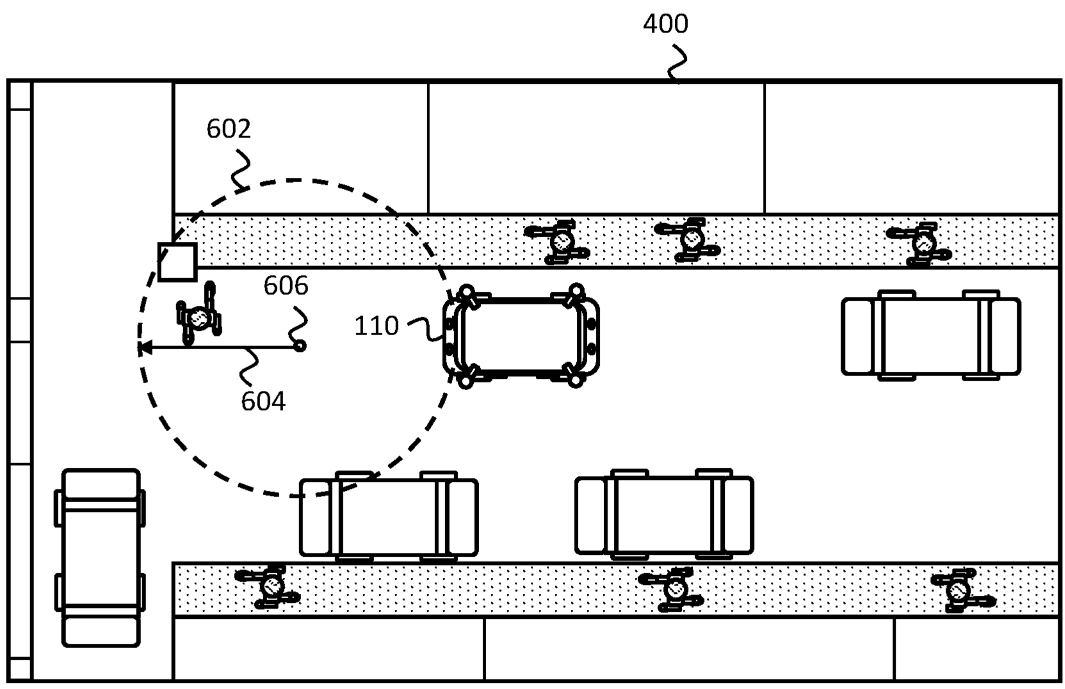

FIG. 6 depicts an example in which an area is defined by a boundary (in this case a circumference 802) having a radius 804 extending away from a location 806. The radius 804 may therefore correspond to a predetermined distance, such that the objects located within the particular area shown in FIG. 6 will be represented in the subset of the perception data transmitted to the system 100, in the same way discussed above in FIG. 5.

In a further variation of the example of FIG. 5, rather than the subset of objects being determined based on whether the objects are located within a predetermined distance of the vehicle, the subset of objects may be determined based on whether the objects are within a particular area. In one example, the area may be specified by the operator 118. For example, the vehicle 110 may receive, from the system 110, data indicative of the particular area. In other examples, the vehicle 110 may determine the area. In examples, the size of the area may be based at least in part on the property of the network connection.

Figure 7:
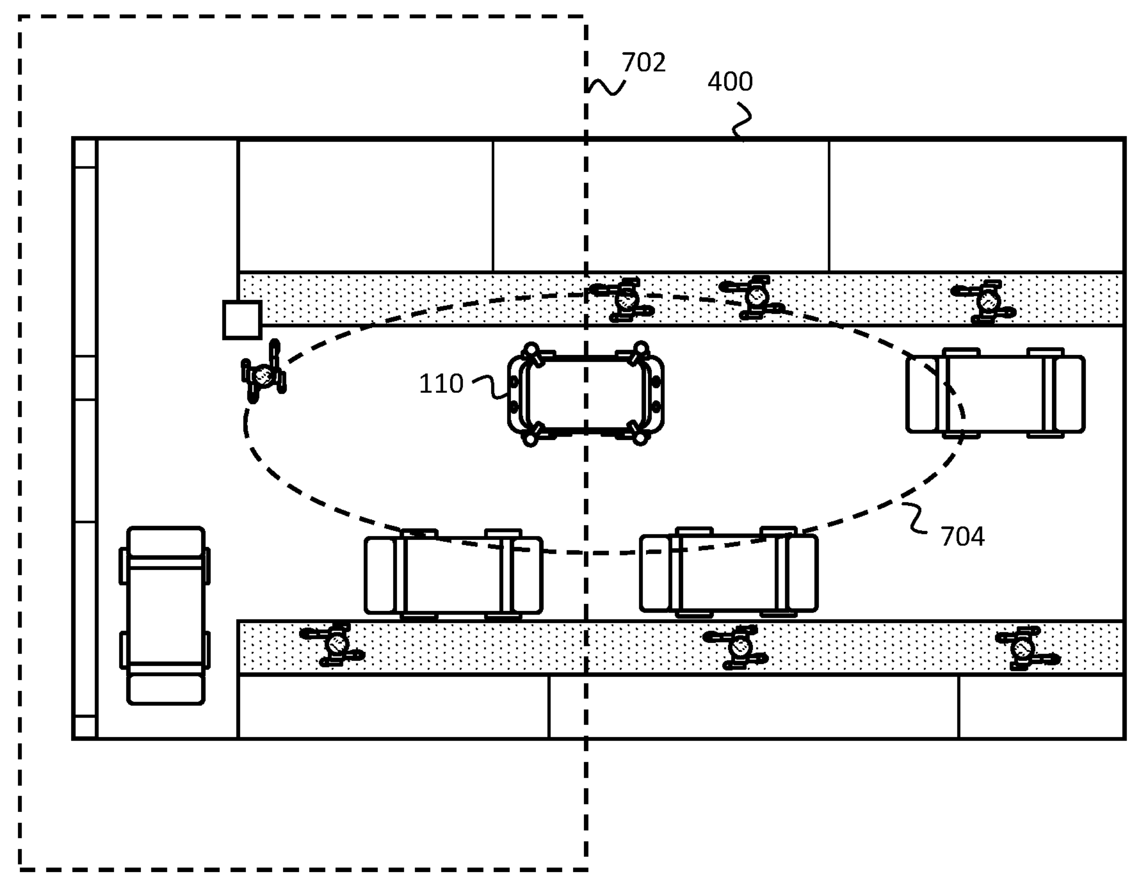

FIG. 7 depicts an example in which an area is defined by a boundary 702, such that the objects located within the particular area shown in FIG. 7 will be represented in the subset of the perception data transmitted to the system 100, in the same way discussed above in FIG. 5.

In another example, the area may be determined by the vehicle and may be based on the nearest objects around the vehicle. The area may therefore be dynamically defined based on the locations of objects in the vicinity of the vehicle. FIG. 7 shows another an area defined by a boundary 704 that is set or has outer limits based on the nearest objects surrounding the vehicle. Accordingly, the objects (in this case three vehicles and three pedestrians) located within the particular area (i.e., at the outer limit of the boundary 704) will be represented in the subset of the perception data transmitted to the system 100, in the same way discussed above in FIG. 5.

Figure 8:
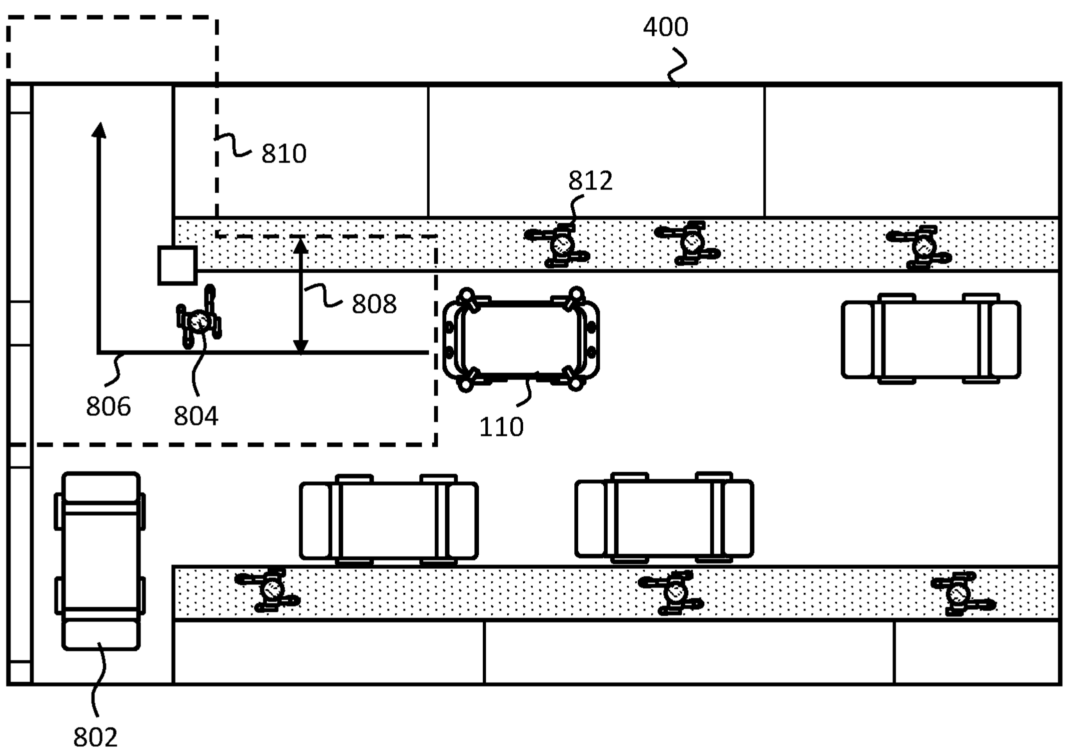

FIG. 8 depicts another example in which a subset of objects may be determined from the plurality of objects represented in the perception data (and therefore in the sensor data). In particular, FIG. 8 relates to an example whereby the locations of each object determine whether the object is included in the subset of objects (and therefore is represented in the subset of the perception data), or whether the object is not included in the subset of objects (and therefore not represented in the subset of the perception data). In the example of FIG. 8, the subset of the perception data includes perception data associated with objects that are located along a trajectory or route that the vehicle will follow.

To determine whether objects are located along a trajectory or route that the vehicle will follow, the perception data for each object may include a characteristic, such as a location, that allows a location of the object to be determined relative to a trajectory or route for the vehicle. For example, the vehicle 110 may generate or receive from the remote system 100 data indicative of a trajectory or route, which may be defined by one or more future locations for the vehicle 110 to navigate to. In examples, the trajectory or route may not be defined by one or more future locations for the vehicle 110, but such locations could be determined from the trajectory or route. For example, the trajectory/route may comprise a series of driving instructions, such as: "move forward 10 m", and therefore a location could be determined based on the trajectory/route.

The vehicle 110 may therefore determine, for each object of the plurality of objects represented in the perception data, whether the object is located along the trajectory/route. In examples, an object may be considered to be located along the trajectory/route if the trajectory/route passes within a predetermined distance of the object's current or future location (the future location being determined based on probability data). Accordingly, the vehicle 110 may determine, for each object of the plurality of objects represented in the perception data, whether the object is located (either currently, or predicted to be) within a predetermined distance of the trajectory/route (in other words, whether the distance between the trajectory/route and the object is less than or equal to the predetermined distance). The distance may be 25 m, 20 m, 15 m, 10 m, etc. If the object is located within the predetermined distance of the trajectory/route, at least some of the perception data associated with that object is included in the subset of the perception data that is transmitted to the system. For example, one or more characteristics associated with the object may be transmitted to the system in the subset of the perception data. If the object is not located within the predetermined distance of the trajectory/route, perception data associated with that object is not included in the subset of the perception data that is transmitted to the system. In this way, some objects may be filtered out.

FIG. 8 depicts an area defined by a boundary 810 that is based on a trajectory/route 806 (for example, the boundary 810 may be defined by points that are a predetermined distance 808 from the trajectory/route 806, where the predetermined distance 808 is measured in a direction perpendicular to the travel direction along the trajectory/route 806). Accordingly, objects located within the particular area shown in FIG. 8 will be represented in the subset of the perception data transmitted to the system 100. In some cases, the area has another shape to that depicted here. For example, the predetermined distance may not extend in a perpendicular direction away from the trajectory/route.

In examples, the trajectory/route may correspond to at least a portion of an overall trajectory/route that the vehicle will follow. In some cases, if the overall trajectory/route determined by the vehicle is particularly short, such as less than a threshold length, the trajectory/route may be an extrapolation of the overall trajectory/route.

In examples, the predetermined distance (and in some cases, the area) may depend on the network conditions. For example, after a property of a network connection has been determined, the predetermined distance may be determined based on the property. For example, a particular distance/area may be determined if the property of the network connection indicates the network connection is of a certain quality (such as having a certain amount of available bandwidth), and a smaller distance/area may be determined if the property of the network connection indicates the network connection is of a lower quality (such as having a lower amount of available bandwidth). Conversely, a larger distance/area may be determined if the property of the network connection indicates the network connection is of a higher quality (such as having a higher amount of available bandwidth). In other cases, the predetermined distance may not depend on the measured property of the network connection, and instead it may always be set at a default distance, such as 10 m. In examples, the system 100 may transmit data to the vehicle 110, where the data is indicative of the predetermined distance. For example, an operator 118 may set the distance via a user input.

FIG. 8 shows illustratively how at least one object of the plurality of objects represented in the perception data may be "filtered" and therefore not represented in the subset of the perception data. For example, the subset of the perception data may not include perception data associated with object 802 (since it is not along the trajectory/route), but may include perception data associated with object 804. Furthermore, a different subset of objects may be represented in the subset of the perception data depending on the predetermined distance. For example, the subset of perception data may be associated with a greater number of objects when the predetermined distance is larger.

Once the subset of the perception data has been determined, where the subset of the perception data is associated with a subset of the plurality of objects, the subset of the perception data may be transmitted to, and received by the system 100. The system 100 may therefore display, on the one or more displays 106, a representation of the subset of the perception data, as discussed above in FIG. 5.

In a variation of the example of FIG. 8, rather than the subset of objects being determined based on whether they are located along a trajectory/route, the subset of objects may be determined by determining whether the object is used by the planning component of the vehicle 110 to determine to perform an action. For example, while the objects may not necessarily be located along a trajectory or route that the vehicle 110 will follow, the presence of the object may influence how the vehicle 110 will act or behave (such as influence the trajectory or route the vehicle 110 will follow) or influence how the vehicle 110 has behaved, such as in the past or under similar scenarios. For example, vehicle 802 and pedestrian 804 may be used by the vehicle 110 in determining how or whether to perform an action, such as follow a particular route. For example, had object 802 not been present, the vehicle's trajectory 806 may have taken a different path. The object 802 could therefore be used by the vehicle 110 to determine to perform an action. Accordingly, the vehicle 110 may determine which objects detected by the vehicle 110 were used in determining to perform an action (such as used to determine the trajectory/route). The subset of objects in the subset of the perception data may therefore comprise objects that were used in determining to perform an action. Objects that were not used in determining to perform an action may not be included in the subset of objects in the subset of the perception data.

In another variation, the subset of objects may be determined based on whether they are likely to contact the vehicle. For example, perception data for each object may be used, or may indicate, a contact metric for that object, where the contact metric is based on a probability of the object contacting the vehicle. For example, pedestrian 804 may be more likely to contact the vehicle 110 compared to pedestrian 812. The subset of objects in the subset of the perception data may therefore comprise objects having a particular contact metric, such as a contact metric within a particular range of contact metrics and/or above a threshold contact metric. Objects that outside of that range or below the threshold may not be included in the subset of objects in the subset of the perception data. For example, those objects may be seen as less significant/critical.

Figure 9A:
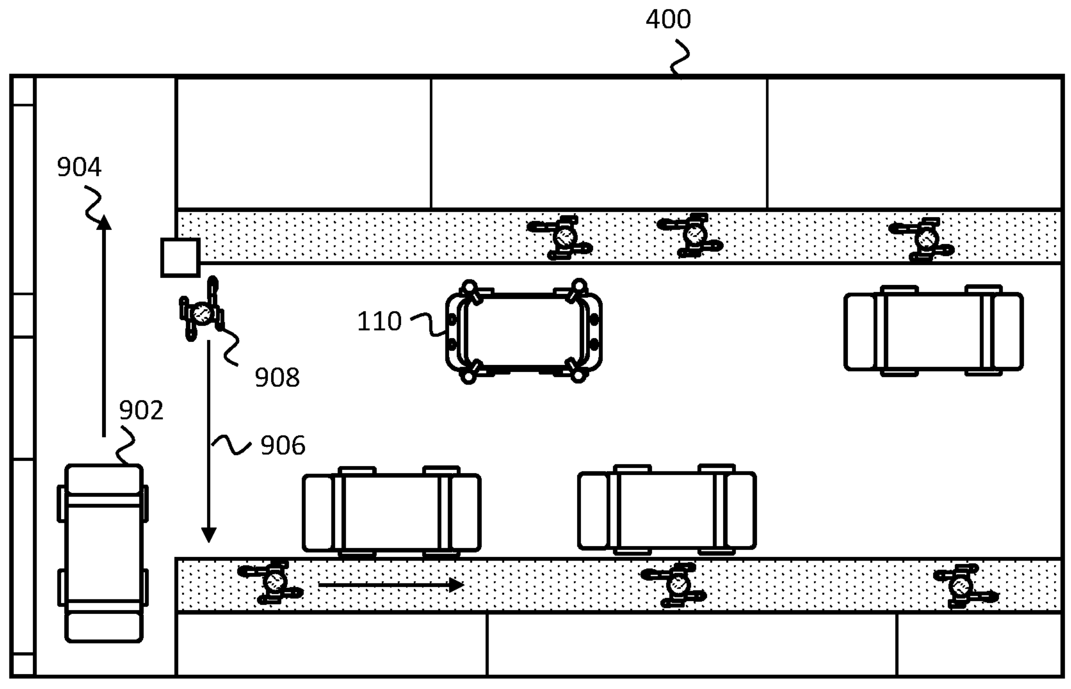
FIG. 9A depicts a top-down view of an environment around the vehicle at a first time, according to an example.

FIG. 9A depicts a top-down view 400 of the environment around the vehicle 110 at a first time. As mentioned, in examples, the perception data may comprise a characteristic indicative of a potential future path or location of one or more objects. FIG. 9A depicts a potential future path 904 of object 902 and a potential future path 906 of object 908. At this first time, it is assumed the network conditions are favourable, allowing the full amount or the desired amount of perception data to be transmitted to the system 100. Alternatively, the network conditions may be sufficient such that a subset of the perception data includes data indicative of a potential future path or location of one or more objects. As mentioned, a prediction component of the vehicle 110 may determine the potential future path or location of one or more objects. In this example, the perception data or the subset of the perception data comprises perception data at least associated with object 902 and includes a potential future path or location of the object 902. Upon receipt of the perception data or the subset of the perception data, the system 100 may display a representation of the object 902 based on the perception data or the subset of the perception data.

Figure 9B:
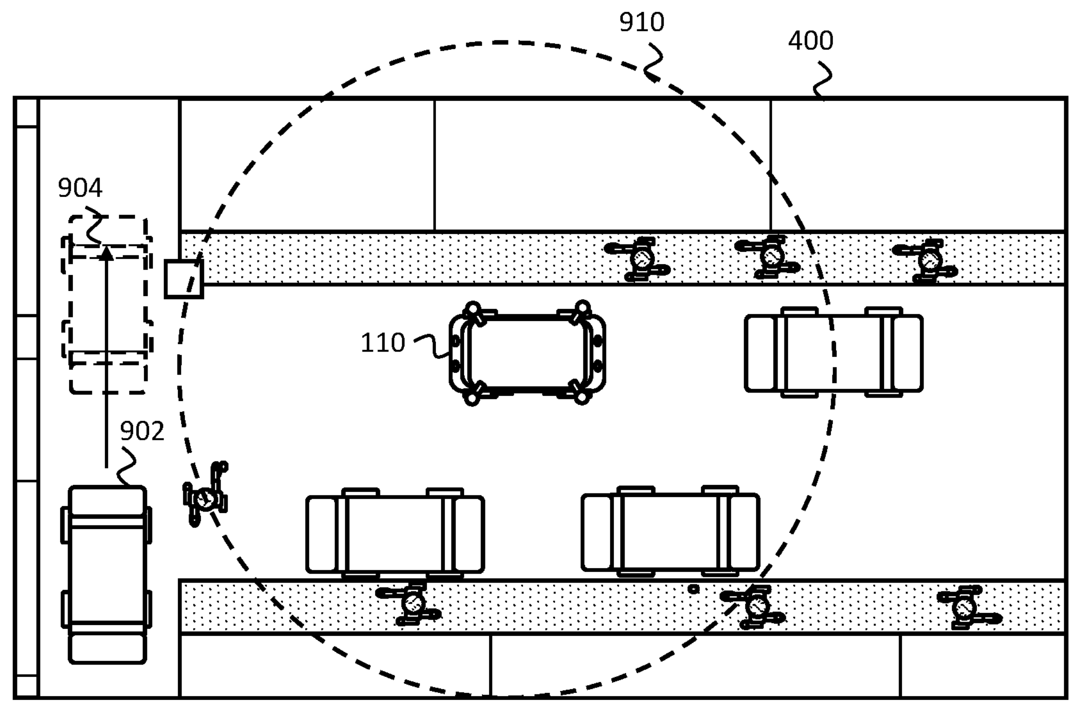
FIG. 9B depicts a top-down view of an environment around the vehicle at a second time, according to an example.

FIG. 9B depicts a top-down view 400 of the environment around the vehicle 110 at a second, later, time. At this second time, it is assumed the network conditions are less favourable than at the first time, such that perception data sent to the system 100 comprises a subset of the perception data or a reduced subset of the perception data. In this example, the subset of the perception data may not include perception data associated with object 902. For example, the subset of the perception data may comprise perception data for a subset of objects not including object 902, such as based on the locations of each object or based on one or more characteristics of the object, as described above. FIG. 9B shows object 902 being located outside of an area defined by a boundary 910. Given that earlier transmitted perception data included data indicative of a potential future path or location of the object 902, the representation 108 displayed on the one or more displays 106 for the operator 118 can include a representation of the object 902, despite the subset of the perception data at this later time not including data associated with the object 902. For example, the object 902 can be displayed at a position on the display based on an updated/estimated location of the object 902, where the location is determined from the data indicative of the potential future path or location of the particular object received at the earlier time. In examples, the system 100 determines that the later received subset of the perception data does not include perception data associated with the object 902, and estimates the location of the object 902 in response to the determination. FIG. 9B depicts an estimated location of vehicle 902 (shown with dashed outline) at this second time.

Figure 10:
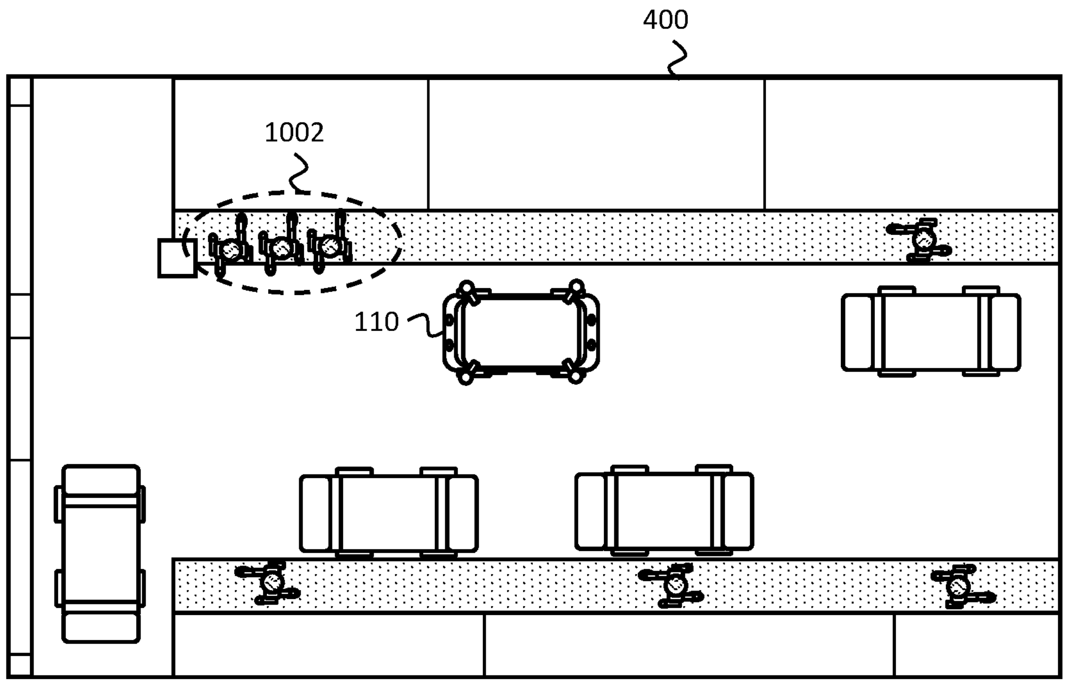
FIG. 10 depicts a top-down view of an environment around the vehicle, where a plurality of objects are classified as a group object, according to an example.

FIG. 10 depicts another example in which a subset of perception data may be determined from the total perception data generated by the vehicle 110. In particular, FIG. 10 relates to an example in which a plurality of objects (such as two or more objects) may be considered a "group", and as such, perception data associated with each object may need not be sent to the system. Instead, perception data may be generated for the group (referred to herein as a grouped object), where the perception data may be condensed or have a smaller data size than for the total combined perception data for all of the objects in the group. For example, each of the objects may share the same, or similar, characteristics, so these can be associated with the grouped object. The characteristic or characteristics associated with the grouped object in the subset of perception data may correspond to one or more characteristics of one object within the group, or may correspond to an average of the characteristics of each object within the group. For example, if the two objects in the group have the same or approximately the same location, the location characteristic for the grouped object may correspond to the location of one of the two objects' locations or may correspond to an average location.

As depicted in the example of FIG. 10, a group 1002 of objects may be detected in the environment. For example, a group 1002 of pedestrians may be located at an intersection. The vehicle may class a plurality of objects as a group if they have one or more characteristics in common (such as all share the same classification) and have a similar location in the environment (for example, they may all be located with a predetermined distance of a particular location in the environment). The group of objects may be determined based on the perception data. After determining that a plurality of objects can be represented as a grouped object, the vehicle 110 may generate perception data for the grouped object. The subset of the perception data sent to the system 100 may comprise the perception data for the grouped object.

FIG. 11 depicts an example of perception data 1102 that may be determined or generated by the vehicle 110 based on sensor data from the one or more sensors 112. As shown in this example, one object is classed as a grouped object. One or more characteristics in the perception data for the grouped object may indicate that the object is a grouped object. For example, the object number and/or classification may have a format that indicates the object is a grouped object. In some cases, a characteristic in the perception data for the grouped object may indicate a number of objects in the grouped object. In this example, a characteristic indicates that the number of objects in the grouped object, N, is three. Although this example shows the grouped object and number of objects in the grouped object using previously described characteristics, it will be appreciated that additional characteristics may be included. For example, one or more additional columns in table of FIG. 11 may be included that indicate the object is a grouped object and/or indicate the number of objects in the grouped object. In examples, it may be inferred by the presence of a characteristic indicating the number of objects that the object is a grouped object.

In the example of FIG. 11, the perception data includes perception data associated with the grouped object and perception data for each individual object in the group. For example, object numbers 1-3 form the grouped object indicated in the last row. As discussed, the characteristics of the grouped object may be based on the characteristics of the objects within the group. In other examples, the perception data may not include perception data associated with grouped objects, and perception data associated with grouped objects may only be stored as part of a subset of perception data that is transmitted to the system 100.

In examples, when the network conditions are less favourable (such as when the vehicle 110 determines that a property of the network connection is below a threshold), the subset of the perception data comprises perception data associated with the grouped object, and does not include the perception data associated with each object within the group. For example, the subset of the perception data may correspond to the perception data indicated in box 1104, rather than the perception data indicated in box 1106. It will be appreciated that the subset of the perception data may only include perception data associated with grouped objects, or may include perception data associated with fewer or a greater number of objects than depicted in this example. Similarly, it will be appreciated that the subset of the perception data may comprise one or more characteristics associated with the grouped object (and other objects), rather than all the characteristics depicted in this example.

Figure 12:
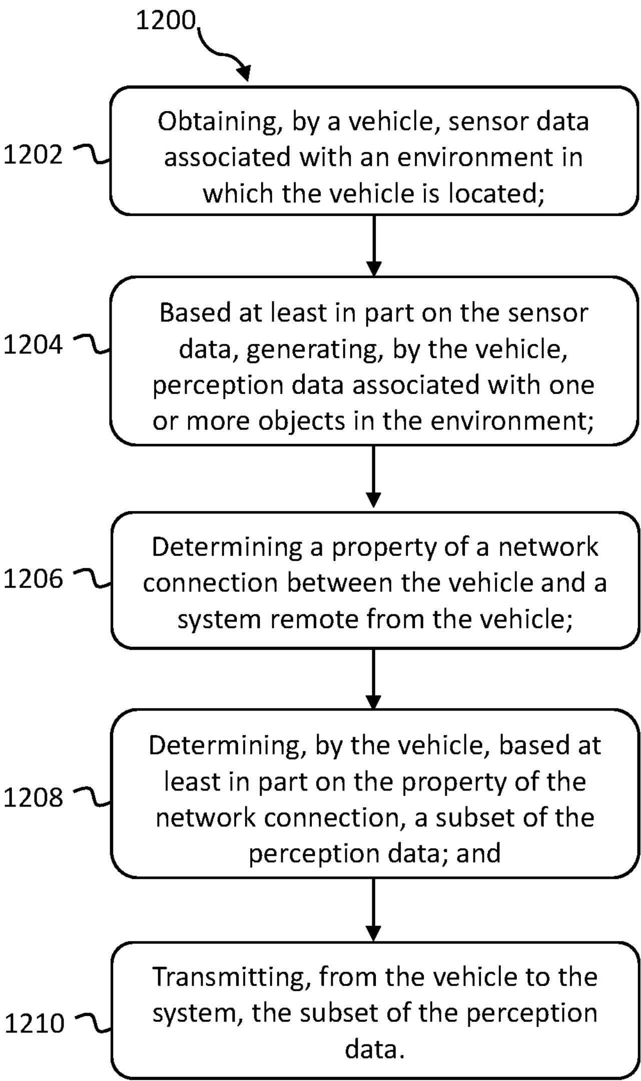
FIG. 12 depicts a flow chart of a method according to an example.

FIG. 12 illustrates a flow chart of an example method 1200. The example method 1200 may be implemented by one or more components of the vehicle 110, or a system comprising the vehicle 110 and remote system 100. In examples, the method 1200 may be encoded and stored as instructions on one or more non-transitory computer-readable media that, when executed by the one or more processors of the vehicle, cause the vehicle 110 to implement the method 1200. In examples, the method is a computer implemented method.

As can be seen in FIG. 12, the method/process 1200 may comprise, at step 1202, obtaining, by a vehicle 110, sensor data associated with an environment in which the vehicle 110 is located. At step 1204, the method further comprises based at least in part on the sensor data, generating, by the vehicle 110, perception data associated with one or more objects in the environment. At step 1206, the method further comprises determining a property of a network connection between the vehicle 110 and a system 100 remote from the vehicle 110. At step 1208, the method further comprises determining, by the vehicle 110, based at least in part on the property of the network connection, a subset of the perception data. At step 1210, the method further comprises transmitting, from the vehicle 110 to the system 100, the subset of the perception data. The method may further comprise any of the additional or alternative steps described above or herein.

As discussed, the second aspect of the disclosure relates to prioritizing sensor data obtained by one or more sensors (such as a video cameras) over sensor data obtained by one or more other sensors (such as one or more other video cameras). This may be useful when the network connection between the vehicle and remote system is degraded, such as when limited bandwidth may be available. The most significant sensor data can therefore be transmitted to the remote system for viewing by an operator.

Figure 13:
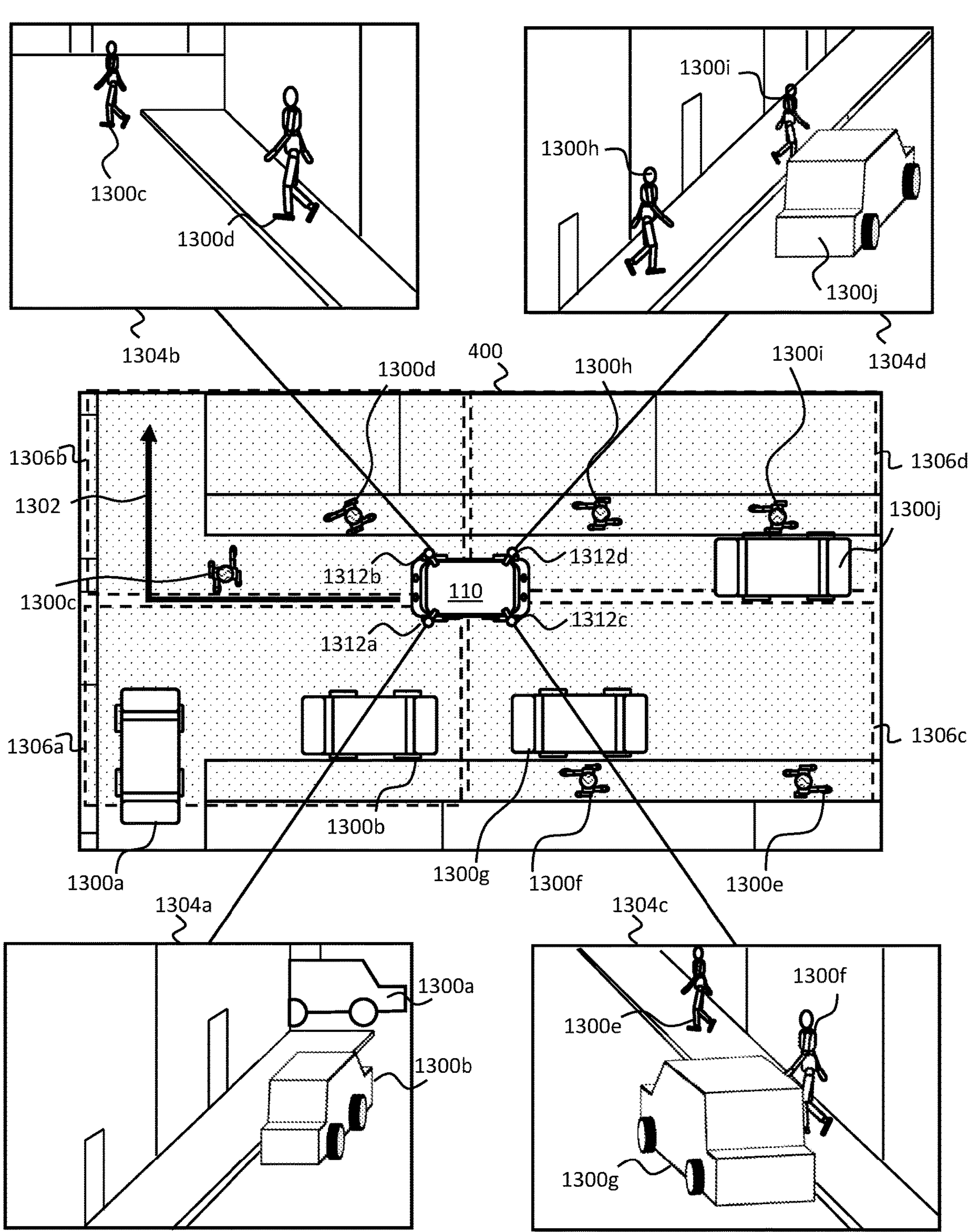
FIG. 13 depicts a top-down view of an environment around the vehicle, where a plurality of sensors are viewing a plurality objects, according to an example.

FIG. 13 depicts a top-down view 400 of a vehicle 110 within an environment, where the environment comprises a plurality of objects 1300*a-j*. The vehicle 110 comprises a plurality of sensors, such as a plurality of video cameras 1312*a-d*. In this particular example, the vehicle 110 comprises a first sensor (in the form of a first video camera 1312*a*), a second sensor (in the form of a second video camera 1312*b*), a third sensor (in the form of a third video camera 1312*c*) and a fourth sensor (in the form of a fourth video camera 1312*d*). It will be appreciated that the vehicle 110 may comprise any number of video cameras in other examples, such as one or more video cameras. In examples, the vehicle 110 may further comprise one or more other sensors (not shown in FIG. 13), such as perception sensors used to obtain sensor data for generating perception data, as discussed above.

FIG. 13 also depicts the different views seen by each video camera. For example, a first view 1304*a* represents the view as seen by the first video camera 1312*a*, a second view 1304*b* represents the view as seen by the second video camera 1312*b*, a third view 1304*c* represents the view as seen by the third video camera 1312*c*, and a fourth view 1304*d* represents the view as seen by the fourth video camera 1312*d*. Under normal network conditions, sensor data from all of the video cameras may be transmitted to the remote system 100, and one or more operators may view any or all of the views 1304*a-d*. As will be discussed, when the network conditions are less optimal, only one or more views may be presented to the operator(s) and/or the resolution and/or frame rate of the views may be reduced to reduce the burden on the network(s).

Each video camera may have a particular field of view (represented by the shaded areas 1306*a-d* bounded by dashed lines in FIG. 13). For example, the first video camera 1312*a* may have a first field of view 1306*a*, the second video camera 1312*b* may have a second field of view 1306*b*, the third video camera 1312*c* may have a third field of view 1306*c* and the fourth video camera 1312*d* may have a fourth field of view 1306*d*. As shown, each object 1300*a-j* is within a field of view of one or more video cameras 1312*a-d*. For example, objects 1300*a* and 1300*b* are within the field of view 1306*a* of the first video camera 1312*a*, objects 1300*c* and 1300*d* are within the field of view 1306*b* of the second video camera 1312*b*, objects 1300*e*, 1300*f* and 1300*g* are within the field of view 1306*c* of the third video camera 1312*c*, and objects 1300*h*, 1300*i* and 1300*j* are within the field of view 1306*d* of the fourth video camera 1312*d*. It will be appreciated that in certain examples, other objects represented in the environment and/or perception data may not be within a field of view any of the video cameras. Such objects may therefore not be taken into account when determining which video camera is obtaining the most significant video data.

For illustrative purposes, it will be assumed that the objects 1300*a-j* illustrated in FIG. 13 are detectable by the one or more perception sensors on the vehicle 110. Accordingly, once the one or more perception sensors obtain sensor data associated with the environment, perception data may be generated by the vehicle 110, where the perception data is associated with the objects 1300*a-j* depicted in FIG. 13. As an example, perception data the same as or similar to that shown in FIG. 2 may be generated.

In examples, the perception data may include a characteristic, such as a contact metric, associated with each object. A contact metric for an object may be determined/calculated based on the sensor data obtained by the perception sensor (s) and/or be determined based on the perception data generated by the vehicle 110.

In examples, a contact metric for each object may be determined/calculated based on a potential future path/trajectory or location of the object and an action of the vehicle 110. For example, an action for the vehicle 110 may be represented by a future path or location of the vehicle 110. FIG. 13 depicts a future path 1302 of the vehicle 110, which the vehicle 110 may be following or may follow in the near future. Although not illustrated in FIG. 13, a future path or location of each object 1300*a-j* may be determined. For example, a prediction component of the vehicle 110 may determine a future path or location of each object 1300*a-j* based on a current location and velocity of the object. The prediction component of the vehicle 110 may determine more than one future path or location of each object 1300*a-j*. Each future path or location may be associated with a probability. For example, an object may be more likely to follow one path in the future, rather than another path.

Based on the future path or location of an object, and the action of the vehicle, the vehicle 110 can determine a probability of the object and vehicle 110 contacting in the future. For example, if the future path 1302 of the vehicle 110 intersects a future path of an object, there may be a higher probability of contact than if the paths do not intersect. If the future path of the vehicle 110 does not intersect a future path of an object, it may be determined that the object and vehicle are unlikely or not likely to contact each other.

In examples, the vehicle 110 may determine a contact metric for each object 1300*a-j*, regardless of whether the object is within a field of view of a video camera. For example, a contact metric may be determined for each object represented in the perception data. In other examples, the vehicle 110 may determine a contact metric for each object 1300*a-j* only if the object is within a field of view of a video camera.

Once a contact metric has been determined for each object 1300*a-j*, aggregated contact metrics for each video camera 1312*a-d* can be determined. To do this, the vehicle 100 can first determine the objects within a field of view of each video camera. For example, the vehicle 110 may determine that each video camera observes or gathers data from a particular area or region within the environment (in other words, that the video cameras each have particular fields of views), and based on locations of the objects 1300*a-j*, can determine which objects are within the fields of views of each sensor.

For example, the vehicle 110 may determine that the first video camera 1312*a* observes a first area of the environment based on the first field of view 1306*a*, and therefore determine that because objects 1300*a* and 1300*b* are located within this area, those objects are within the field of view of the first video camera 1312*a* (and associated with the first video camera). Similarly, the vehicle 110 may determine that the second video camera 1312*b* observes a second area of the environment based on the second field of view 1306*b*, and therefore determine that because objects 1300*c* and 1300*d* are located within this area, those objects are within the field of view of the second video camera 1312*b* (and associated with the second video camera). The vehicle 110 may further determine that the third video camera 1312*c* observes a third area of the environment based on the third field of view 1306*c*, and therefore determine that because objects 1300*e*, 1300*f* and 1300*g* are located within this area, those objects are within the field of view of the third video camera 1312*c* (and associated with the third video camera). The vehicle 110 may further determine that the fourth video camera 1312*d* observes a fourth area of the environment based on the fourth field of view 1306*d*, and therefore determine that because objects 1300*h*, 1300*i* and 1300*j* are located within this area, those objects are within the field of view of the fourth video camera 1312*d* (and associated with the fourth video camera).

After the vehicle has determined the objects within the field of view of each video camera, the vehicle may determine an aggregated contact metric for each video camera. An aggregated contact metric of a sensor (such as a video camera) may be based on the overall probability of contact between the vehicle and the objects within the field of view of the sensor. An aggregated contact metric for a video camera is based on the contact metrics of the objects within the field of view of the video camera. For example, an aggregated contact metric associated with a video camera may be based on an average, weighted average or sum of the contact metrics associated with the objects within the field of view of the video camera. In another example, the aggregated contact metric may be a maximum of the contact metrics associated with the objects.

It will be appreciated that a variety of different techniques may be used to determine an aggregated contact metric for a sensor based on contact metrics associated with the objects within the field of view of the sensor. A contact metric associated with an object may be referred to as an object contact metric, $\phi_a$.

In examples, an object contact metric (and therefore the aggregated contact metric) may be based on a probability of the object and vehicle colliding/contacting in the future, and a severity of the contact. The severity may be based on the type of object, such as whether the object is a vehicle, pedestrian etc. In some cases, an object contact metric is not based on a severity of the contact.

In general terms, an aggregated contact metric for a sensor may be given by:

$$\phi_{sensor} = \sum_{a \in \{objects\}} \phi_a = \sum_{a \in \{objects\}} \text{function}(w_{type}(x_a), P_{contact}(x_a, x_h), S_{contact}(x_a, x_h))$$

Where $\phi_{sensor}$ is the aggregated contact metric for a sensor, $\phi_a$ is an object contact metric, $w_{type}(x_a)$ is a weight of each object type, $P_{contact}(x_a, x_h)$ is a probability of the object and vehicle colliding/contacting and $S_{contact}(x_a, x_h)$ is a severity of the collision/contact between the object and vehicle. The aggregated contact metric for a sensor may therefore be a function of these terms.

As a more specific example, an aggregated contact metric for a sensor may be given by:

$$\phi_{sensor} = \sum_{a \in \{objects\}} w_{type}(x_a) * \left[ \left( w_{contact\_probability} * P_{contact}(x_a, x_h) \right) + \left( w_{contact\_severity} * S_{contact}(x_a, x_h) \right) \right]$$

Where $w_{contact\_probability}$ is the weight of the contact probability in the aggregated contact metric, and $w_{contact\_severity}$ is the weight of the contact severity in the aggregated contact metric. The weights of the object type, contact probability and contact severity can be arbitrarily chosen. It will be appreciated that this a particular example of aggregated contact metric, and other examples are envisaged.

Figure 14:
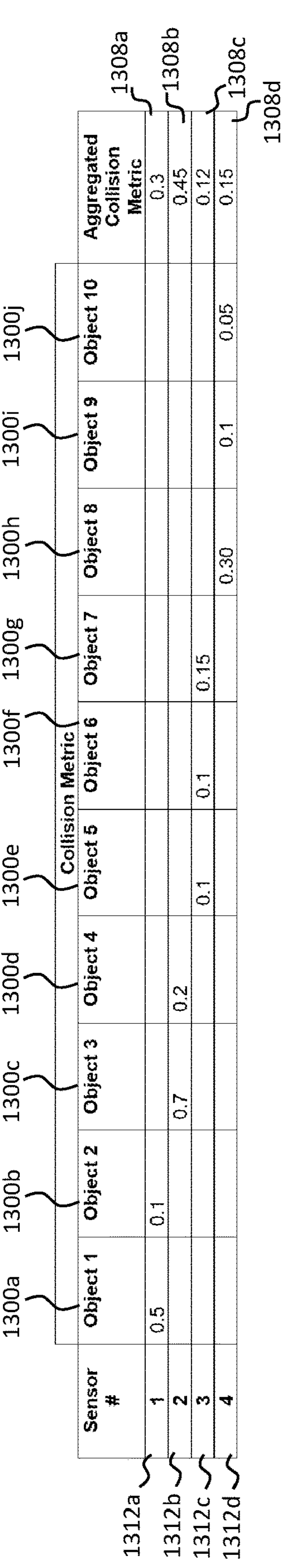
FIG. 14 is a table identifying different contact metrics associated with different objects.

FIG. 14 depicts a table comprising data representing the object contact metrics of each object 1300*a-j* (as a value between 0 to 1). In addition, each object 1300*a-j* is shown associated with at least one of the four video cameras 1312*a-d*. The object with the highest contact metric in this example is object 4 (1300*c*), which is within the field of view of the second video camera 1312*b*. Referring again to FIG. 13, object 1300*c* is located in front of the vehicle 110 and close to the future path 1302 to be taken by the vehicle 110. The probability of the vehicle 110 contacting object 1300*c* is therefore relatively high when compared to object 1300*e*, for example, which is located to the rear of, and relatively far away from, the vehicle 110.

The table in FIG. 14 also comprises data representing the aggregated contact metrics of each video camera 1312*a-d*. For example, an aggregated contact metric associated with the first video camera 1312*a* (referred to as a first aggregated contact metric 1308*a*) is based on the contact metrics associated with the objects within the field of view of the first video camera 1312*a*. In this example, the first aggregated contact metric 1308*a* is an average (arithmetic mean) of the contact metrics associated with the objects within the field of view of the first video camera 1312*a*. As mentioned, in other examples, the aggregated contact metrics may be a sum of the object contact metrics, such as in the example equation above. Similarly, an aggregated contact metric associated with the second video camera 1312*b* (referred to as a second aggregated contact metric 1308*b*) is based on the contact metrics associated with the objects within the field of view of the second video camera 1312*b*. Similarly, an aggregated contact metric associated with the third video camera 1312*c* (referred to as a third aggregated contact metric 1308*c*) is based on the contact metrics associated with the objects within the field of view of the third video camera 1312*c*. Similarly, an aggregated contact metric associated with the fourth video camera 1312*d* (referred to as a fourth aggregated contact metric 1308*d*) is based on the contact metrics associated with the objects within the field of view of the fourth video camera 1312*d*.

In this example, the video camera with the highest aggregated contact metric is the second video camera 1312*b*. The sensor data (i.e., video data) obtained by the second video camera 1312*b* may therefore be considered more significant than the sensor data obtained by the other video cameras. Accordingly, when the one or more network connections to the remote system 100 are less reliable, it may be useful to prioritize the sensor data from the second video camera 1312*b* over the sensor data obtained by the other video cameras.

Accordingly, as discussed, the vehicle 110 may determine one or more properties of a network connection between the vehicle 110 and the system 100. For example, the vehicle 110 may determine an amount of available bandwidth using one or more existing techniques. A property may be indicative of network conditions for the network connection. In some examples, one or more network connections may be available between the vehicle 110 and the system 100. The vehicle 110 may therefore determine one or more properties of each available network connection between the vehicle and the system 100.

Under "normal" or "good" network conditions, such as when the bandwidth is above a threshold, the vehicle 110 may transmit all of the sensor data captured by all of the video cameras 1312*a-d* to the system 100 (or at least a default or desired amount of the sensor data). However, under "poor" or degraded network conditions (relative to the normal or good network conditions), such as when the bandwidth is below the threshold, the vehicle 110 may determine to transmit less of the sensor/video data (i.e., a subset of the sensor/video data). Accordingly, based on the determined property of the network connection, the vehicle 110 may determine a subset of the sensor data for transmitting to the remote system 100. In some examples, the vehicle 110 may additionally or alternatively determine to prioritize the order in which the sensor data is transmitted.

In some examples, the subset of the sensor data transmitted to the remote system 100 comprises at least some sensor data obtained by each video camera. For example, the subset of the sensor data may comprise at least some of the first sensor data (associated with the first video camera 1312*a*), at least some of the second sensor data (associated with the second video camera 1312*b*), at least some of the third sensor data (associated with the third video camera 1312*c*) and at least some of the fourth sensor data (associated with the fourth video camera 1312*a*). In such cases, to reduce the total amount of sensor data being transmitted, a subset of sensor data associated with at least one video camera may be transmitted.

The proportion or amount of the sensor data associated with each video camera that is sent may be based on the aggregated contact metrics. For example, returning to the example of FIG. 14, a higher proportion or greater amount the second sensor data (associated with the second video camera 1312*b*) may be transmitted when compared to the amount or proportion of the third sensor data (associated with the third video camera 1312*c*). The proportion of the sensor data may also be based on the one or more determined properties of the one or more network connections. For example, if a higher overall bandwidth is available, a higher proportion of each sensor data may be transmitted.

In examples, the amount or proportion of the sensor data associated with each video camera may be controlled by setting a transmission bit rate associated with each video camera 1312*a-d* and transmitting the respective sensor data based on the transmission bit rates. For example, returning to the example of FIG. 14, the vehicle 110 may determine a first transmission bit rate for the first sensor data, a second transmission bit rate for the second sensor data, a third transmission bit rate for the third sensor data and a fourth transmission bit rate for the fourth sensor data. The transmission bit rates may be based on the aggregated contact metrics. For example, the second transmission bit rate may be higher than the first transmission bit rate, the first transmission bit rate may be higher than the fourth transmission bit rate and the fourth transmission bit rate may be higher than the third transmission bit rate. Thus, sensor data associated with a higher aggregated contact metric may be transmitted at a higher bit rate.

In some examples, the vehicle 110 may additionally prioritize the order in which the sensor data from each video camera is transmitted. For example, the order in which the sensor data associated with each video camera is transmitted may be based on the aggregated contact metrics associated with each video camera. Returning to the example of FIG. 14, the second sensor data (such as all or a portion of the sensor data) may be transmitted first due to the second video camera 1312*b* being associated with the highest aggregated contact metric, followed by the first sensor data (such as all or a portion of the sensor data) which has the next highest aggregated contact metric, followed by the fourth sensor data (such as all or a portion of the sensor data) which has the next highest aggregated contact metric, followed by the third sensor data (such as all or a portion of the sensor data) which is associated with the lowest aggregated contact metric.

In some examples, even under "poor" or degraded network conditions, the vehicle 110 may continue to transmit all of the sensor data captured by all of the video cameras 1312*a-d* to the system 100 or at least a default or desired amount of the sensor data, but may prioritize the order in which the sensor data from each video camera is transmitted.

In some cases, such as depending on the one or more properties of the one or more network connections, sensor data associated with one or more video cameras may not be sent to the remote system 100. For example, because the third sensor data (associated with the third video camera 1312*c*) is associated with the lowest aggregated contact metric, it may be determined that the one or more objects within the field of view of the third video camera 1312*c* are unlikely to contact the vehicle. The vehicle 110 may therefore preclude this data from being sent to the remote system 100. In examples, sensor data may be precluded from data that is sent to the remote system 100 based on the aggregated contact metric associated with the sensor data. For example, if the aggregated contact metric is below a threshold aggregated contact metric, such as below 0.2, the vehicle may determine not to send the sensor data to the remote system 100.

In some examples, two or more data networks may be available for sending data to the remote system 100. Accordingly, in examples, the vehicle 110 may determine for each available network connection, one or more properties of the network connection. For example, a first network connection (associated with a first data network) may be considered less reliable than a second network connection (associated with a second data network). The vehicle may therefore determine to transmit the most significant sensor data via the second data network, and less significant sensor data via the first data network. Returning to the example of FIG. 14, at least the second sensor data (such as all or a portion of the second sensor data) may be transmitted via the second data network due to the second video camera 1312*b* being associated with the highest aggregated contact metric. The third sensor data (such as all or a portion of the third sensor data) which is associated with the lowest aggregated contact metric, may be transmitted via the first data network. The first and fourth sensor data may be transmitted via either the first or second data network.

In the example of FIG. 13, the vehicle determines a transmission scheme for the sensor data gathered by the video cameras 1312*a-d* based on one or more properties of one or more network connections, and the contact metrics of the objects. As briefly mentioned, in some examples, there may be two or more vehicles located in a particular area or region, and the vehicles may share one or more data networks. The vehicles may therefore be sharing the available bandwidth, and it may be useful to distribute the limited bandwidth between the vehicles and their sensor data.

Figure 15:
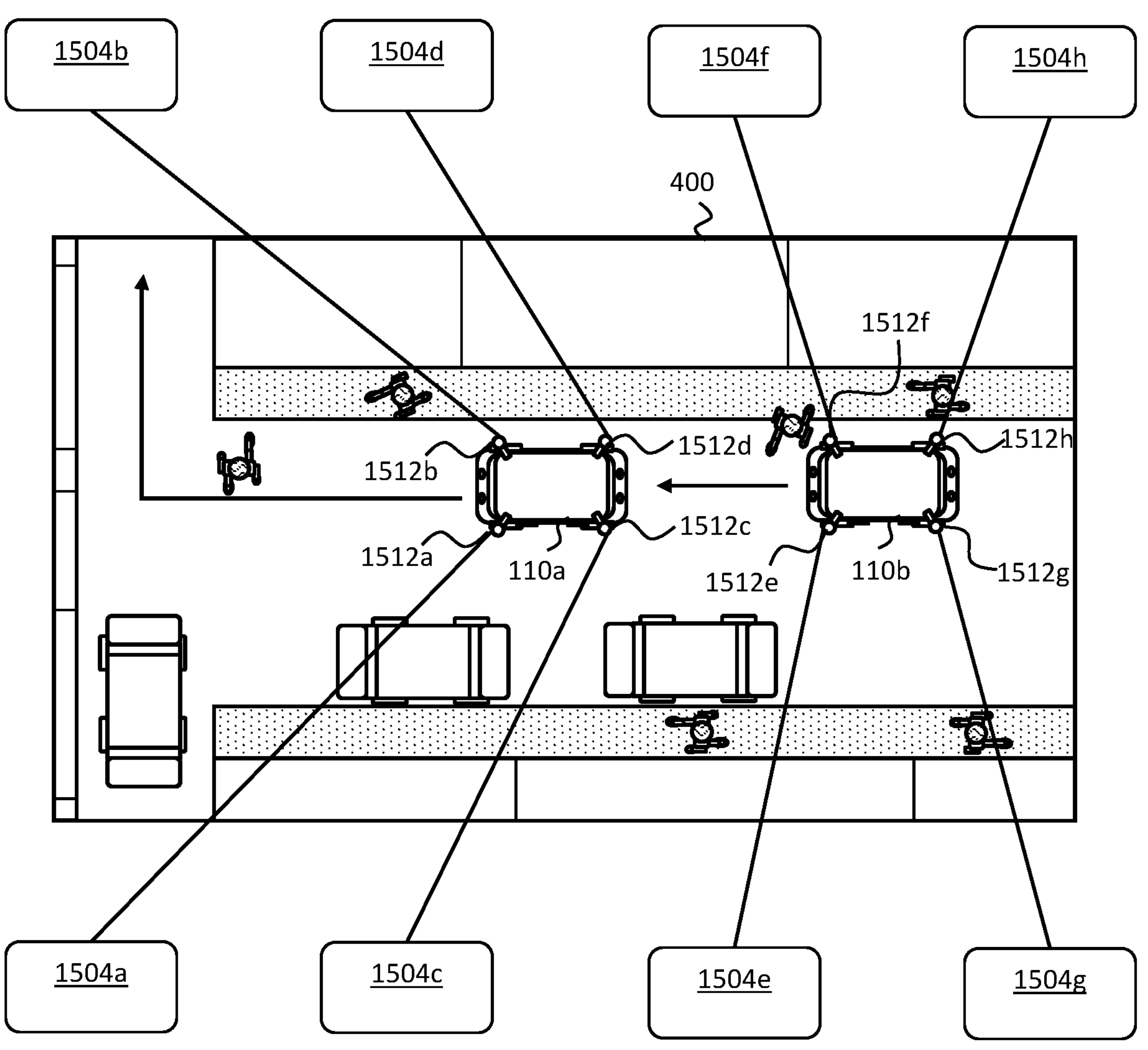
FIG. 15 depicts a top-down view of an environment around two vehicles, where a plurality of sensors are viewing a plurality objects, according to an example.

To illustrate, FIG. 15 depicts a top-down view 400 of a first vehicle 110*a* and a second vehicle 110*b* within an environment, where the environment comprises a plurality of objects. Each vehicle 110*a*, 110*b* comprises a plurality of sensors, such as a plurality of video cameras. In this particular example, each vehicle 110 comprises four sensors (in the form of video cameras). The fleet of vehicles (which includes the first and second vehicles 110*a*, 110*b*) therefore comprises a plurality of sensors 1512*a-h* (and in particular eight sensors, in the form of video cameras). It will be appreciated that each vehicle 110*a*, 110*b* may comprise one or more video cameras in other examples. In examples, each vehicle 110*a*, 110*b* may further comprise one or more other sensors (not shown in FIG. 15), such as perception sensors used to obtain sensor data for generating perception data, as discussed above.

FIG. 15 also depicts the different views 1504*a-h* seen by each video camera. For example, a first view 1504*a* represents the view as seen by the first video camera 1512*a*, a second view 1504*b* represents the view as seen by the second video camera 1512*b*, a third view 1504*c* represents the view as seen by the third video camera 1312*c*, a fourth view 1504*d* represents the view as seen by the fourth video camera 1512*d*, a fifth view 1504*e* represents the view as seen by the fifth video camera 1512*e*, a sixth view 1504*f* represents the view as seen by the sixth video camera 1512*f*, a seventh view 1504*g* represents the view as seen by the seventh video camera 1312*g*, and an eighth view 1504*h* represents the view as seen by the eighth video camera 1512*h*.

As mentioned above, each video camera may have a particular field of view (not shown in FIG. 15), and one or more objects within the environment may be within the field of view of each video camera 1512*a-h*.

In the same, or similar way as discussed for the example of FIG. 13, a contact metric for each object may be determined/calculated. Contact metrics for objects near the first vehicle 110*a* represent a probability of the objects contacting the first vehicle 110*a*, and contact metrics for objects near the second vehicle 110*b* represent a probability of the objects contacting the second vehicle 110*b*.

Once the vehicles 110*a*, 110*b* have determined contact metrics for each object, each vehicle can determine aggregated contact metrics for each of its own video cameras, in the same way as discussed for the example of FIG. 13.

In one example, the vehicles 110*a*, 110*b* may compare aggregated contact metrics and the data may be prioritized based on the aggregated contact metrics. For example, it may be determined that the second video camera 1512*b* is associated with the highest aggregated contact metric of all video cameras 1512*a-h*, and thus the sensor data associated with the second video camera 1512*b* should be prioritized (such as sent first and/or sent with the highest bit rate, resolution and/or frame rate, etc.). As discussed above, the bit rate, resolution and/or frame rate may be based on one or more properties of one or more network connections to the remote system 100, such as the total available bandwidth. It may then be determined that the sixth video camera 1512*f* has the next highest aggregated contact metric, so the sensor data associated with the sixth video camera 1512*f* should be sent next (and/or sent with the next highest bit rate, etc.). Determining how the sensor data should be prioritized may therefore involve the vehicles transmitting data between each other. For example, each vehicle may transmit to each other vehicle an indication of the aggregated contact metrics associated with its own video cameras. Other examples of determining how to prioritize the sensor data and allocate network resources are envisaged.

In one particular case, after the vehicles 110*a*, 110*b* have determined aggregated contact metrics for each of their own video cameras, each vehicle 110*a*, 110*b* may determine a vehicle contact metric based on the aggregated contact metrics associated with the vehicle. For example, the vehicle contact metric for the first vehicle 110*a* may be based on a sum or average of the aggregated contact metrics associated with the video cameras 1512*a-d*. Similarly, the vehicle contact metric for the second vehicle 110*b* may be based on a sum or average of the aggregated contact metrics associated with the video cameras 1512*e-h*. Returning to the example of FIG. 14, the vehicle contact metric associated with vehicle 110 may be based on an average (arithmetic mean) of the four aggregated contact metrics 1308*a-d*. For example, the vehicle contact metric may be 0.26.

Once vehicle contact metrics have been determined for each vehicle, a normalization factor may be determined for each vehicle based on its own vehicle contact metric and the sum of the vehicle contact metrics for all vehicles within the shared area/region. This may therefore involve both vehicles transmitting data to each other. For example, the first vehicle may send to the second vehicle an indication of its vehicle contact metric, and the second vehicle may send to the first vehicle an indication of its vehicle contact metric. As an example, if we assume the first vehicle 110*a* has a vehicle contact metric of 0.26, and the second vehicle 110*b* has a vehicle contact metric of 0.35, the first vehicle 110*a* may determine a first normalization factor, $N_a=0.26/(0.26+0.35)=0.43$ and the second vehicle 110*b* may determine a second normalization factor $N_b=0.35/(0.26+0.35)=0.57$. Thus, in this example, the second vehicle 110*b* may be associated with a higher importance.

In some examples, the one or more available network connections may be divided/shared based on the normalization factors. For example, each vehicle may be assigned a portion of the total available bandwidth based on each vehicle's normalization factor. In general, the transmission bit rate, resolution and/or frame rate for the sensor data from each video camera may be based on the normalization factor for the vehicle and one or more properties of one or more network connections to the remote system 100, such as the total available bandwidth.

It will be appreciated that although the examples of FIGS. 13-15 describe video cameras, the same principles and processes can be applied to any type of sensor, such as perception sensors.

Figure 16:
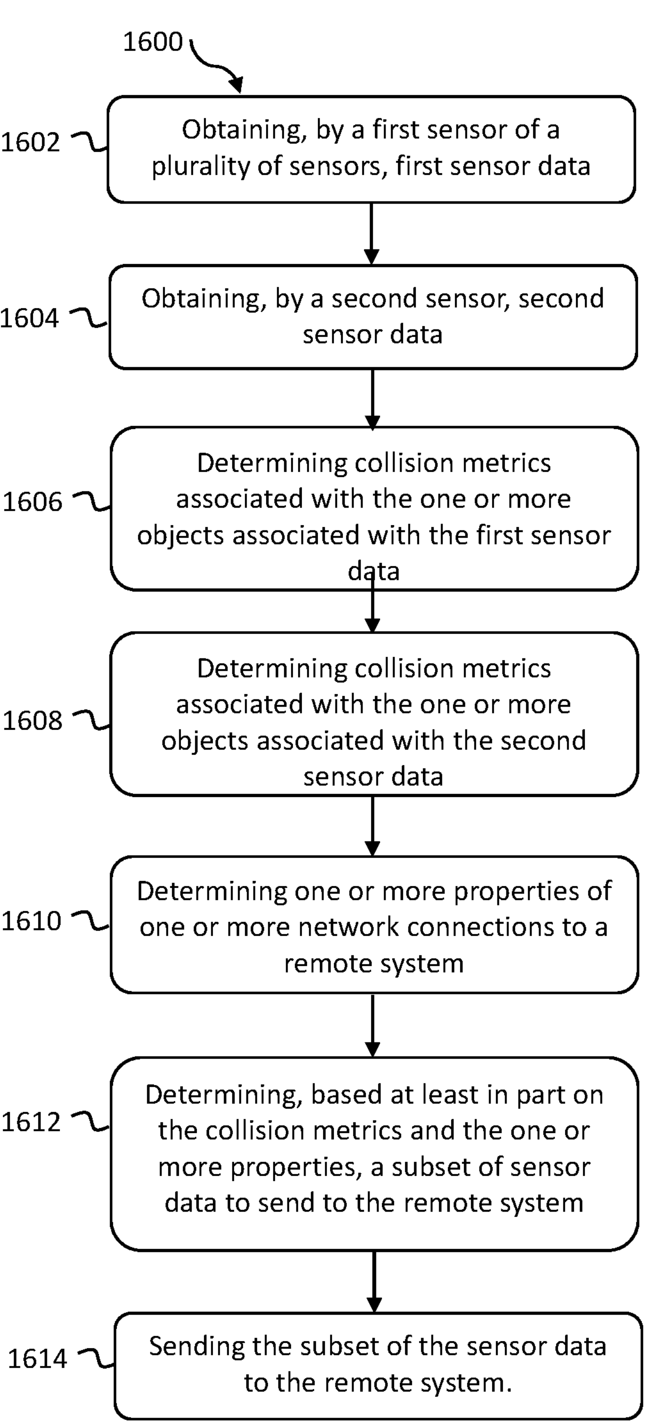
FIG. 16 depicts a flow chart of another method according to an example.

FIG. 16 illustrates a flow chart of an example method 1600. The example method 1600 may be implemented by one or more components of the vehicle(s) 110, 110*c*, 110*b*, or a system comprising two or more vehicles. In examples, the method 1600 may be encoded and stored as instructions on one or more non-transitory computer-readable media that, when executed by the one or more processors, cause the vehicle 110 or one or more vehicles 110*a*, 110*b* to implement the method 1600. In examples, the method is a computer implemented method.

As can be seen in FIG. 16, the method/process 1600 may comprise, at step 1602, obtaining, by a first sensor of a plurality of sensors, first sensor data associated with one or more objects in an environment in which the one or more vehicles are located. The method/process 1600 may further comprise, at step 1604, obtaining, by a second sensor of the plurality of sensors, second sensor data associated with one or more objects in the environment. The method/process 1600 may further comprise, at step 1606, determining contact metrics associated with the one or more objects associated with the first sensor data. The method/process 1600 may further comprise, at step 1608, determining contact metrics associated with the one or more objects associated with the second sensor data. The method/process 1600 may further comprise, at step 1610, determining one or more properties of one or more network connections to a remote system. The method/process 1600 may further comprise, at step 1612, determining, based at least in part on the contact metrics and the one or more properties, a subset of sensor data to send to the remote system, the subset of sensor data comprising at least some of the first sensor data and/or at least some of the second sensor data. The method/process 1600 may further comprise, at step 1614, sending the subset of the sensor data to the remote system.

FIG. 17 illustrates a block diagram of an example system 1700 that implements the techniques discussed above and herein. FIG. 17 may represent vehicle 110 and system 100 of FIG. 1. In some instances, the example system 1700 may include a vehicle 1702, which may represent the vehicle 110 in FIG. 1. In some instances, the vehicle 1702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1702 may be a fully or partially autonomous vehicle having any other level or classification. Moreover, in some instances, the techniques described herein may be usable by non-autonomous vehicles as well.

The vehicle 1702 may include a vehicle computing device (s) 1704, sensor(s) 1706, emitter(s) 1708, network interface (s) 1710, and/or drive system(s) 1712. Sensor(s) 1706 may represent sensor(s) 112 and/or 1712, 1512, discussed above.

In some instances, the sensor(s) 1706 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 1706 may include multiple instances of each of these or other types of sensors. For instance, the radar sensors may include individual radar sensors located at the corners, front, back, sides, and/or top of the vehicle 1702. As another example, the cameras may include multiple cameras disposed at various locations about the exterior and/or interior of the vehicle 1702. The sensor(s) 1706 may provide input to the vehicle computing device(s) 1704 and/or to computing device(s) 1732.

Data captured by sensor(s) may be known as sensor data.

The vehicle 1702 may also include emitter(s) 1708 for emitting light and/or sound. The emitter(s) 1708 may include interior audio and visual emitter(s) to communicate with passengers of the vehicle 1702. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 1708 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 1702 may also include network interface(s) 1710 that enable communication between the vehicle 1702 and one or more other local or remote computing device(s). The network interface(s) 1710 may facilitate communication with other local computing device(s) on the vehicle 1702 and/or the drive component(s) 1712. The network interface(s) 1710 may additionally or alternatively allow the vehicle to communicate with other nearby computing device (s) (e.g., other nearby vehicles, traffic signals, etc.). The network interface(s) 1710 may additionally or alternatively enable the vehicle 1702 to communicate with computing device(s) 1732 over a network 1738. In some examples, computing device(s) 1732 may comprise one or more nodes of a distributed computing system (e.g., a cloud computing architecture). The computing device(s) 1732 corresponds to remote system 100, discussed above.

The vehicle 1702 may include one or more drive components 1712. In some instances, the vehicle 1702 may have a single drive component 1712. In some instances, the drive component(s) 1712 may include one or more sensors to detect conditions of the drive component(s) 1712 and/or the surroundings of the vehicle 1702. By way of example and not limitation, the sensor(s) of the drive component(s) 1712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 1712. In some cases, the sensor(s) on the drive component(s) 1712 may overlap or supplement corresponding systems of the vehicle 1702 (e.g., sensor(s) 1706).

The drive component(s) 1712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 1712 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 1712. Furthermore, the drive component(s) 1712 may also include one or more communication connection(s) that enable communication by the respective drive component with one or more other local or remote computing device(s).

The vehicle computing device(s) 1704 may include processor(s) 1714 and memory 1716 communicatively coupled with the one or more processors 1714. Computing device(s) 1732 may also include processor(s) 1734, and/or memory 1736. The processor(s) 1714 and/or 1734 may be any suitable processor capable of executing instructions to process data and perform operations as described herein. By way of example and not limitation, the processor(s) 1714 and/or 1734 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 1716 and/or 1736 may be examples of non-transitory computer-readable media. The memory 1716 and/or 1736 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1716 and/or memory 1736 may store a perception component 1718, localization component 1720, planning component 1722, map(s) 1724, driving log data 1726, prediction component 1728, and/or system controller(s) 1730—zero or more portions of any of which may be hardware, such as GPU(s), CPU(s), and/or other processing units.

The perception component 1718 may detect object(s) in in an environment surrounding the vehicle 1702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 1718 is referred to as perception data. The perception component 1718 may be configured to associate a bounding region (or other indication) with an identified object. The perception component 1718 may be configured to associate a confidence score associated with a classification of the identified object with an identified object. In some examples, objects, when rendered via a display, can be colored based on their perceived class. The object classifications determined by the perception component 1718 may distinguish between different object types such as, for example, a passenger vehicle, a pedestrian, a bicyclist, motorist, a delivery truck, a semi-truck, traffic signage, and/or the like. The perception component 1718 may detect the objects based on sensor data received from the sensors 1706.

In at least one example, the localization component 1720 may include hardware and/or software to receive data from the sensor(s) 1706 to determine a position, velocity, and/or orientation of the vehicle 1702 (e.g., one or more of an x-, y-, z-position, roll, pitch, or yaw). For example, the localization component 1720 may include and/or request/receive map(s) 1724 of an environment and can continuously determine a location, velocity, and/or orientation of the autonomous vehicle 1702 within the map(s) 1724. In some instances, the localization component 1720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 1720 may provide data to various components of the vehicle 1702 to determine an initial position of an autonomous vehicle for generating a trajectory and/or for generating map data, as discussed herein. In some examples, localization component 1720 may provide, to the perception component 1718, a location and/or orientation of the vehicle 1702 relative to the environment and/or sensor data associated therewith.

The planning component 1722 may receive a location and/or orientation of the vehicle 1702 from the localization component 1720 and/or perception data from the perception component 1718 and may determine instructions for controlling operation of the vehicle 1702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 1730 and/or drive component(s) 1712 may parse/cause to be carried out, second instructions for the emitter(s) 1708 may be formatted according to a second format associated therewith).

The driving log data 1726 may comprise sensor data, perception data, and/or scenario labels collected/determined by the vehicle 1702 (e.g., by the perception component 1718), as well as any other message generated and or sent by the vehicle 1702 during operation including, but not limited to, control messages, error messages, etc. In some examples, the vehicle 1702 may transmit the driving log data 1726 to the computing device(s) 1732.

The prediction component 1728 may generate one or more probability maps representing prediction probabilities of possible locations of one or more objects in an environment. For example, the prediction component 1728 may generate one or more probability maps for vehicles, pedestrians, animals, and the like within a threshold distance from the vehicle 1702. In some examples, the prediction component 1728 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planning component 1722 may be communicatively coupled to the prediction component 1728 to generate predicted trajectories of objects in an environment. For example, the prediction component 1728 may generate one or more predicted trajectories for objects within a threshold distance from the vehicle 1702. In some examples, the prediction component 1728 may measure a trace of an object and generate a trajectory for the object based on observed and predicted behavior. Although prediction component 1728 is shown on a vehicle 1702 in this example, the prediction component 1728 may also be provided elsewhere, such as in a remote computing device. In some examples, a prediction component may be provided at both a vehicle and a remote computing device. These components may be configured to operate according to the same or a similar algorithm. Data generated by the prediction component 1728 may be provided to the computing device(s) 1732 as perception part of the perception data. The perception data may be used by the planning component 1722 to navigate in the environment.

The memory 1716 and/or 1736 may additionally or alternatively store a mapping system, a planning system, a ride management system, etc. Although perception component 1718 and/or planning component 1722 are illustrated as being stored in memory 1716, perception component 1718 and/or planning component 1722 may include processor-executable instructions, machine-learned model(s) (e.g., a neural network), and/or hardware.

As described herein, the localization component 1720, the perception component 1718, the planning component 1722, and/or other components of the system 1700 may comprise one or more ML models. For example, the localization component 1720, the perception component 1718, and/or the planning component 1722 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 1720 may additionally or alternatively store one or more system controller(s) 1730, which may be configured to control steering, propulsion, braking, safety, emitters, communication, and other systems of the vehicle 1702. These system controller(s) 1730 may communicate with and/or control corresponding systems of the drive component(s) 1712 and/or other components of the vehicle 1702.

It should be noted that while FIG. 17 is illustrated as a distributed system, in alternative examples, components of the vehicle 1702 may be associated with the computing device(s) 1732 and/or components of the computing device (s) 1732 may be associated with the vehicle 1702. That is, the vehicle 1702 may perform one or more of the functions associated with the computing device(s) 1732, and vice versa.

EXAMPLE CLAUSES

1. An autonomous vehicle, comprising:

one or more sensors configured to obtain sensor data associated with an environment in which the vehicle is located;

a network interface for communicating with a system remote from the vehicle via a network; and at least one processor configured to:

based at least in part on fusing the sensor data, generate perception data associated with one or more objects in the environment, the perception data being used by a planning component of the vehicle to navigate in the environment and including representations of the one or more objects;

determine a property of a network connection between the vehicle and the system;

determine, based at least in part on the property of the network connection, a subset of the perception data; and cause the network interface to transmit, from the vehicle to the system, the subset of the perception data.

2. The vehicle of clause 1, wherein:

the perception data is associated with a plurality of objects in the environment and comprises a plurality of characteristics associated with each object; and the subset of the perception data comprises perception data associated with one of:

(i) a subset of objects from the plurality of objects and at least some of the characteristics of the plurality of characteristics associated with each object of the subset of objects; or (ii) at least some of the objects of the plurality of objects and a subset of characteristics from the plurality of characteristics associated with each object.

3. The vehicle of clause 2, wherein:

the plurality of characteristics associated with each object comprises at least one of a determined size or a classification associated with the object, the determined size being determined based on the sensor data; and the subset of characteristics does not include at least one of:

the determined size associated with each object; or the classification associated with each object.

4. The vehicle of any of clauses 1 to 3, wherein the perception data is associated with a plurality of objects in the environment and wherein the subset of the perception data comprises perception data associated with a subset of objects from the plurality of objects; and the at least one processor is further configured to: determine the subset of objects from the plurality of objects based on at least one of:

(a) a characteristic associated with each object of the subset of objects;

(b) a location of each object of the subset of objects relative to the vehicle;

(c) each object of the subset of objects being used by the planning component of the vehicle to determine to perform an action; or (d) contact metrics associated with the subset of objects.

5. The vehicle of clause 4, wherein one of:

each object of the subset of objects is located within a predetermined distance of the vehicle, and the at least one processor is further configured to: determine the predetermined distance based at least in part on the property of the network connection;

each object of the subset of objects is located along a trajectory or route that the vehicle will follow;

each object of the subset of objects is located within a particular area or within a predetermined distance of a particular location, and the at least one processor is further configured to: receive, from the system, data indicative of the particular area or the particular location; or the characteristic is a priority of the object, and wherein the at least one processor is further configured to: determine the subset of objects from the plurality of objects based on the subset of objects having a particular priority.

6. The vehicle of any of clauses 1 to 5, wherein the perception data is associated with a plurality of objects in the environment and comprises one or more characteristics associated with each object of the plurality of objects and wherein the subset of the perception data comprises perception data for a grouped object, and the at least one processor is further configured to:

generate the perception data for the grouped object, the grouped object representing a group of two or more objects, the two or more objects being associated with a particular characteristic;

wherein the perception data for the grouped object comprises one or more characteristics associated with the grouped object.

7. The vehicle of clause 6, wherein the perception data for the grouped object comprises data indicative of a number of objects in the group of two or more objects.

8. The vehicle of any of clauses 1 to 7, wherein the at least one processor is configured to determine the property of the network connection at a first time;

wherein the at least one processor is further configured to:

determine a property of a network connection between the vehicle and the system remote from the vehicle at a second time; and determine, that the property of the network connection at the second time is below a threshold, wherein when the property of the network connection is below the threshold, remote vehicle guidance performed by the system should not occur.

9. The vehicle of any of clauses 1 to 8, wherein the at least one processor is further configured to determine, based at least in part on the property of the network connection, a frequency at which to transmit data from the vehicle to the system;

wherein causing the network interface to transmit, from the vehicle to the system, the subset of the perception data comprises:

causing the network interface to transmit, from the vehicle to the system, the subset of the perception data based at least in part on the frequency.

10. The vehicle of clause 9, wherein the subset of the perception data corresponds to perception data of a particular type, and the frequency is further determined based on the particular type.

11. The vehicle of any of clauses 1 to 10, wherein:

the perception data comprises data indicative of a potential future path or location of the one or more objects; and the subset of the perception data does not include the data indicative of the potential future path or location.

12. The vehicle of clause 11, wherein the at least one processor is configured to:

prior to causing the network interface to transmit the subset of the perception data, cause the network interface to transmit, from the vehicle to the system, second perception data, the second perception data comprising perception data associated with a particular object and including data indicative of a potential future path or location of the particular object.

13. A method comprising:

obtaining, by a vehicle, sensor data associated with an environment in which the vehicle is located;

based at least in part on the sensor data, generating, by the vehicle, perception data associated with one or more objects in the environment;

determining a property of a network connection between the vehicle and a system remote from the vehicle;

determining, by the vehicle, based at least in part on the property of the network connection, a subset of the perception data; and transmitting, from the vehicle to the system, the subset of the perception data.

14. The method of clause 13, further comprising determining, based at least in part on the property of the network connection, a frequency at which to transmit data from the vehicle to the system;

wherein the subset of the perception data is a subset over a time period excluding some of the perception data over the time period; and wherein transmitting, from the vehicle to the system, the subset of the perception data comprises:

transmitting, from the vehicle to the system, the subset of the perception data based at least in part on the frequency.

15. The method of clause 14, wherein the subset of the perception data corresponds to perception data of a particular type, and the frequency is further determined based on the particular type.

16. The method of any of clauses 13 to 15, wherein:

the perception data is associated with a plurality of objects in the environment and comprises a plurality of characteristics associated with each object; and the subset of the perception data comprises perception data associated with one of:

(i) a subset of objects from the plurality of objects and at least some of the characteristics of the plurality of characteristics associated with each object of the subset of objects; or (ii) at least some of the objects of the plurality of objects and a subset of characteristics from the plurality of characteristics associated with each object.

17. The method of clause 16, wherein:

the plurality of characteristics associated with each object comprises at least one of a determined size or a classification associated with the object, the determined size being determined based on the sensor data; and the subset of characteristics does not include at least one of:

the determined size associated with each object; or the classification associated with each object.

18. The method of any of clauses 13 to 17, wherein:

the perception data comprises data indicative of a potential future path or location of the one or more objects; and the subset of the perception data does not include the data indicative of the potential future path or location.

19. The method of any of clauses 13 to 18, further comprising:

prior to transmitting the subset of the perception data, transmitting, from the vehicle to the system, second perception data, the second perception data comprising perception data associated with a particular object and including data indicative of a potential future path or location of the particular object;

receiving, by the system at a first time, the second perception data;

after transmitting the subset of the perception data:

receiving, by the system at a second time, after the first time, the subset of the perception data;

determining that the subset of the perception data received at the second time does not include perception data associated with the particular object; and in response to determining that the subset of the perception data received at the second time does not include perception data associated with the particular object, displaying, on a display of the system, a representation of the particular object based on a location determined from the data indicative of the potential future path or location of the particular object received at the first time.

20. The method of any of clauses 13 to 19, wherein the perception data is associated with a plurality of objects in the environment and wherein the subset of the perception data comprises perception data associated with a subset of objects from the plurality of objects; and the method further comprises determining the subset of objects from the plurality of objects based on at least one of:

(a) a characteristic associated with each object of the subset of objects;

(b) a location of each object of the subset of objects relative to the vehicle;

(c) each object of the subset of objects being used by a planning component of the vehicle to determine to perform an action, wherein the perception data is used by the planning component of the vehicle to navigate in the environment; or (d) contact metrics associated with the subset of objects.

21. The method of clause 20, wherein each object of the subset of objects is located one of:

within a predetermined distance of the vehicle;

along a trajectory or route that the vehicle will follow; or within a particular area or within a predetermined distance of a particular location.

22. The method of clause 20, wherein the characteristic is a priority of the object, and wherein the method further comprises determining the subset of objects from the plurality of objects based on the subset of objects having a particular priority.

23. The method of any of clauses 13 to 22, wherein the perception data is associated with a plurality of objects in the environment and comprises one or more characteristics associated with each object of the plurality of objects and wherein the subset of the perception data comprises perception data for a grouped object, and the method further comprises:

generating the perception data for the grouped object, the grouped object representing a group of two or more objects, the two or more objects being associated with a particular characteristic;

wherein the perception data for the grouped object comprises one or more characteristics associated with the grouped object.

24. The method of clause 23, wherein the perception data for the grouped object comprises data indicative of a number of objects in the group of two or more objects.

25. The method of any of clauses 13 to 24, wherein determining the property of the network connection comprises determining the property of the network connection at a first time;

the method further comprising:

determining a property of a network connection between the vehicle and the system remote from the vehicle at a second time;

determining, that the property of the network connection at the second time, is below a threshold, wherein when the property of the network connection is below the threshold, remote vehicle guidance performed by the system should not occur.

26. One or more non-transitory computer-readable media storing instructions that, when executed by one or more processors of a vehicle, cause the vehicle to perform operations comprising:

obtaining sensor data associated with an environment in which the vehicle is located;

based at least in part on the sensor data, generating perception data associated with one or more objects in the environment;

determining a property of a network connection between the vehicle and a system remote from the vehicle;

determining, based at least in part on the property of the network connection, a subset of the perception data; and transmitting, from the vehicle to the system, the subset of the perception data.

27. A method, comprising:

obtaining, by a vehicle, sensor data associated with an environment in which the vehicle is located;

generating, based on fusing the sensor data, perception data associated with one or more objects in the environment, the perception data being used by a planning component of the vehicle to navigate in the environment and including representations of the one or more objects;

determining a property of a network connection between the vehicle and a system remote from the vehicle;

determining, based at least in part on the property of the network connection, a subset of the perception data; and transmitting, from the vehicle to the system, the subset of the perception data.

28. The method of clause 27, wherein the method is a method performed by the vehicle.

29. The method of clause 27 or 28, wherein:

the perception data is associated with a plurality of objects in the environment and comprises a plurality of characteristics associated with each object; and the subset of the perception data comprises perception data associated with one of:

(i) a subset of objects from the plurality of objects and at least some of the characteristics of the plurality of characteristics associated with each object of the subset of objects; or (ii) at least some of the objects of the plurality of objects and a subset of characteristics from the plurality of characteristics associated with each object.

30. The method of clause 29, wherein:

the plurality of characteristics associated with each object comprises at least one of a determined size or a classification associated with the object, the determined size being determined based on the sensor data; and the subset of characteristics does not include at least one of:

the determined size associated with each object; or the classification associated with each object.

31. The method of any of clauses 27 to 30, wherein the perception data is associated with a plurality of objects in the environment and wherein the subset of the perception data comprises perception data associated with a subset of objects from the plurality of objects; and the method further comprises: determining the subset of objects from the plurality of objects based on at least one of:

(a) a characteristic associated with each object of the subset of objects;

(b) a location of each object of the subset of objects relative to the vehicle;

(c) each object of the subset of objects being used by the planning component of the vehicle to determine to perform an action; or (d) contact metrics associated with the subset of objects.

32. The method of clause 31, wherein one of:

each object of the subset of objects is located within a predetermined distance of the vehicle, and the method further comprises determining the predetermined distance based at least in part on the property of the network connection;

each object of the subset of objects is located along a trajectory or route that the vehicle will follow;

each object of the subset of objects is located within a particular area or within a predetermined distance of a particular location, and the method further comprises: receiving, from the system, data indicative of the particular area or the particular location; or the characteristic is a priority of the object, and wherein the method further comprises: determining the subset of objects from the plurality of objects based on the subset of objects having a particular priority.

33. The method of any of clauses 27 to 32, wherein the perception data is associated with a plurality of objects in the environment and comprises one or more characteristics associated with each object of the plurality of objects and wherein the subset of the perception data comprises perception data for a grouped object, and the method further comprises: generating the perception data for the grouped object, the grouped object representing a group of two or more objects, the two or more objects being associated with a particular characteristic;

wherein the perception data for the grouped object comprises one or more characteristics associated with the grouped object.

34. The method of clause 33, wherein the perception data for the grouped object comprises data indicative of a number of objects in the group of two or more objects.

35. The method of any of clauses 27 to 34, wherein the method comprises determining the property of the network connection at a first time;

wherein the method further comprises:

determining a property of a network connection between the vehicle and the system remote from the vehicle at a second time; and determining, that the property of the network connection at the second time is below a threshold, wherein when the property of the network connection is below the threshold, remote vehicle guidance performed by the system should not occur.

36. The method of any of clauses 27 to 35, wherein the method further comprises determining, based at least in part on the property of the network connection, a frequency at which to transmit data from the vehicle to the system;

wherein transmitting, from the vehicle to the system, the subset of the perception data comprises:

transmitting, from the vehicle to the system, the subset of the perception data based at least in part on the frequency.

37. The method of clause 36, wherein the subset of the perception data corresponds to perception data of a particular type, and the frequency is further determined based on the particular type.

38. The method of any of clauses 27 to 37, wherein:

the perception data comprises data indicative of a potential future path or location of the one or more objects; and the subset of the perception data does not include the data indicative of the potential future path or location.

39. The method of clause 38, wherein the method comprises:

prior to transmitting the subset of the perception data, transmitting, from the vehicle to the system, second perception data, the second perception data comprising perception data associated with a particular object and including data indicative of a potential future path or location of the particular object.

40. A vehicle comprising:

one or more sensors configured to obtain sensor data associated with an environment in which the vehicle is located;

a network interface for communicating with a system remote from the vehicle via a network; and at least one processor configured to:

based at least in part on the sensor data, generate perception data associated with one or more objects in the environment;

determine a property of a network connection between the vehicle and the system;

determine, based at least in part on the property of the network connection, a subset of the perception data; and cause the network interface to transmit, from the vehicle to the system, the subset of the perception data.

41. The vehicle of clause 40, wherein the at least one processor is further configured to, determine, based at least in part on the property of the network connection, a frequency at which to transmit data from the vehicle to the system;

wherein the subset of the perception data is a subset over a time period excluding some of the perception data over the time period; and wherein causing the network interface to transmit, from the vehicle to the system, the subset of the perception data comprises:

causing the network interface to transmit, from the vehicle to the system, the subset of the perception data based at least in part on the frequency.

42. The vehicle of clause 41, wherein the subset of the perception data corresponds to perception data of a particular type, and the frequency is further determined based on the particular type.

43. The vehicle of any of clauses 40 to 42, wherein:

the perception data is associated with a plurality of objects in the environment and comprises a plurality of characteristics associated with each object; and the subset of the perception data comprises perception data associated with one of:

(i) a subset of objects from the plurality of objects and at least some of the characteristics of the plurality of characteristics associated with each object of the subset of objects; or (ii) at least some of the objects of the plurality of objects and a subset of characteristics from the plurality of characteristics associated with each object.

44. The vehicle of clause 43, wherein:

the plurality of characteristics associated with each object comprises at least one of a determined size or a classification associated with the object, the determined size being determined based on the sensor data; and the subset of characteristics does not include at least one of:

the determined size associated with each object; or the classification associated with each object.

45. The vehicle of any of clauses 40 to 44, wherein:

the perception data comprises data indicative of a potential future path or location of the one or more objects; and the subset of the perception data does not include the data indicative of the potential future path or location.

46. The vehicle of any of clauses 40 to 45, wherein the at least one processor is configured to:

prior to causing the network interface to transmit the subset of the perception data, cause the network interface to transmit, from the vehicle to the system, second perception data, the second perception data comprising perception data associated with a particular object and including data indicative of a potential future path or location of the particular object.

47. The vehicle of any of clauses 40 to 46, wherein the perception data is associated with a plurality of objects in the environment and wherein the subset of the perception data comprises perception data associated with a subset of objects from the plurality of objects; and the at least one processor is further configured to determine the subset of objects from the plurality of objects based on at least one of:

(a) a characteristic associated with each object of the subset of objects;

(b) a location of each object of the subset of objects relative to the vehicle; or (c) each object of the subset of objects being used by a planning component of the vehicle to determine to perform an action, wherein the perception data is used by the planning component of the vehicle to navigate in the environment; or (d) contact metrics associated with the subset of objects.

48. The vehicle of clause 47, wherein each object of the subset of objects is located one of:

within a predetermined distance of the vehicle;

along a trajectory or route that the vehicle will follow; or within a particular area or within a predetermined distance of a particular location.

49. The vehicle of clause 48, wherein the characteristic is a priority of the object, and wherein the at least one processor is further configured to determine the subset of objects from the plurality of objects based on the subset of objects having a particular priority.

50. The vehicle of any of clauses 40 to 49, wherein the perception data is associated with a plurality of objects in the environment and comprises one or more characteristics associated with each object of the plurality of objects and wherein the subset of the perception data comprises perception data for a grouped object, and the at least one processor is further configured to: generate the perception data for the grouped object, the grouped object representing a group of two or more objects, the two or more objects being associated with a particular characteristic;

wherein the perception data for the grouped object comprises one or more characteristics associated with the grouped object.

51. The vehicle of clause 50, wherein the perception data for the grouped object comprises data indicative of a number of objects in the group of two or more objects.

52. The vehicle of any of clauses 40 to 51, wherein the at least one processor is configured to determine the property of the network connection at a first time;

wherein the at least one processor is further configured to:

determine a property of a network connection between the vehicle and the system remote from the vehicle at a second time; and determine, that the property of the network connection at the second time is below a threshold, wherein when the property of the network connection is below the threshold, remote vehicle guidance performed by the system should not occur.

53. One or more non-transitory computer-readable media storing instructions that, when executed by one or more processors of a vehicle, cause the vehicle to perform the method of any of clauses 13 to 25 or perform the method of any of clauses 27 to 39.

54. An autonomous vehicle, comprising:

a plurality of sensors configured to obtain sensor data associated with an environment in which the vehicle is located;

one or more network interfaces configured to communicate with a system remote from the vehicle;

one or more processors coupled to the plurality of sensors and the one or more network interfaces, the one or more processors configured to:

receive, from the plurality of sensors, sensor data associated with plurality of objects in the environment;

determine potential future paths or locations of the plurality of objects;

determine, based at least in part on (i) the potential future paths or locations of the plurality of objects, and (ii) an action of the vehicle, contact metrics for the plurality of objects, a contact metric being associated with a probability of contact between the vehicle and the object;

determine, based at least in part on the contact metrics for the plurality of objects and fields of views of the plurality of sensors, a first sensor of the plurality of sensors that views one or more objects that are unlikely to contact the vehicle;

determine one or more properties of one or more network connections to the remote system; and determine, based at least in part on the one or more properties, to preclude from data sent to the remote system, the sensor data associated with the first sensor.

55. The vehicle of clause 54, wherein to determine a first sensor of the plurality of sensors that views one or more objects that are unlikely to contact the vehicle, the one or more processors are configured to:

determine, based at least in part on the contact metrics for the plurality of objects and fields of views of the plurality of sensors, aggregated contact metrics associated with the plurality of sensors; and determine the first sensor of the plurality of sensors based at least in part on the aggregated contact metrics associated with the plurality of sensors.

56. The vehicle of clause 55, wherein to determine aggregated contact metrics associated with the plurality of sensors, the one or more processors are configured to, for each sensor of the plurality of sensors:

determine one or more objects that are within a field of view of the sensor; and determine an aggregated contact metric associated with the sensor based on the contact metrics associated with the one or more objects within the field of view of the sensor.

57. The vehicle of clause 56, wherein the aggregated contact metric associated with the sensor is based on an average or sum of the contact metrics associated with the one or more objects within the field of view of the sensor.

58. The vehicle of any of clauses 54 to 57, wherein the one or more processors are further configured to cause the one or more network interfaces to send the data to the remote system, the data comprising at least some sensor data associated with a second sensor of the plurality of sensors, the second sensor viewing one or more objects that are more likely to contact the vehicle than the one or more objects viewed by the first sensor are to contact the vehicle.

59. The vehicle of clause 58, wherein the data sent to the remote system further comprises at least some sensor data associated with a third sensor of the plurality of sensors, the third sensor viewing one or more objects that are more likely to contact the vehicle than the one or more objects viewed by the second sensor are to contact the vehicle, wherein the one or more processors are further configured to at least one of:

determine a transmission bit rate for the sensor data associated with the second sensor and determine a transmission bit rate for the sensor data associated with the third sensor, the transmission bit rate for the sensor data associated with the third sensor being higher than the transmission bit rate for the sensor data associated with the second sensor; or cause the one or more network interfaces to send the sensor data associated with the third sensor before the sensor data associated with the second sensor.

60. A method, comprising:

obtaining, by a first sensor of a plurality of sensors, first sensor data associated with one or more objects in an environment in which one or more vehicles are located;

obtaining, by a second sensor of the plurality of sensors, second sensor data associated with one or more objects in the environment;

determining contact metrics associated with the one or more objects associated with the first sensor data;

determining contact metrics associated with the one or more objects associated with the second sensor data;

determining one or more properties of one or more network connections to a remote system;

determining, based at least in part on the contact metrics and the one or more properties, a subset of sensor data to send to the remote system, the subset of sensor data comprising at least some of the first sensor data and/or at least some of the second sensor data; and sending the subset of the sensor data to the remote system.

61. The method of clause 60, wherein the subset of the sensor data does not include the first sensor data associated with the first sensor and comprises at least some of the second sensor data associated with the second sensor.

62. The method of clause 61, wherein determining, based at least in part on the contact metrics and the one or more properties, a subset of sensor data to send to remote system, comprises:

determining, based at least in part on the contact metrics and fields of views of the first and second sensors:

that the first sensor views one or more objects that are unlikely to contact a vehicle of the one or more vehicles; and that the second sensor views one or more objects that are more likely to contact a vehicle of the one or more vehicles; and determining, based at least in part on the one or more properties, to:

preclude from the subset of the sensor data sent to the remote system, the first sensor data; and include in the subset of the sensor data, at least some of the second sensor data.

63. The method of clause 60, wherein the subset of the sensor data comprises at least some of the first sensor data and at least some of the second sensor data.

64. The method of clause 63, wherein determining, based at least in part on the contact metrics and the one or more properties, a subset of sensor data to send to the remote system comprises:

determining, based at least in part on the contact metrics and fields of views of the first and second sensors:

that the first sensor views one or more objects that are unlikely to contact a vehicle of the one or more vehicles; and that the second sensor views one or more objects that are more likely to contact a vehicle of the one or more vehicles; and determining, based at least in part on the one or more properties, to:

include in the subset of the sensor data, at least some of the second sensor data; and include in the subset of the sensor data, a subset of the first sensor data.

65. The method of clause 64, wherein sending the subset of the sensor data to the remote system, comprises at least one of:

determining a first transmission bit rate for the first sensor data, determining a second transmission bit rate for the second sensor data, the second transmission bit rate being higher than the first transmission bit rate, and sending the subset of the sensor data based on the first and second transmission bit rates; or sending the second sensor data before sending the first sensor data.

66. The method of clause 65, wherein at least one of:

the first and second transmission bit rates are determined based on the one or more properties of the one or more network connections; or the first transmission bit rate is determined based on the contact metrics associated with the one or more objects that are within a field of view of the first sensor and the second transmission bit rate is determined based on the contact metrics associated with the one or more objects that are within a field of view of the second sensor.

67. The method of any of clauses 60 to 66, further comprising:

determining a first aggregated contact metric associated with the first sensor; and determining a second aggregated contact metric associated with the second sensor;

wherein determining a subset of the sensor data to send to the remote system comprises determining the subset of the sensor data based on the first and second aggregated contact metrics.

68. The method of clause 67, wherein:

determining the first aggregated contact metric comprises:

determining one or more objects that are within a field of view of the first sensor; and determining the first aggregated contact metric based on the contact metrics associated with the one or more objects within the field of view of the first sensor; and determining the second aggregated contact metric comprises:

determining one or more objects that are within a field of view of the second sensor; and determining the second aggregated contact metric based on the contact metrics associated with the one or more objects within the field of view of the second sensor.

69. The method of any of clauses 60 to 68, wherein a plurality of data networks are available for sending data to the remote system, and wherein sending the subset of the sensor data to the remote system comprises:

sending at least some of the first sensor data to the remote system via a first data network; and sending at least some of the second sensor data to the remote system via a second data network;

wherein the first and second data networks are selected based at least in part on the contact metrics.

70. The method of any of clauses 60 to 69, wherein the one or more vehicles comprise a first vehicle and a second vehicle, and wherein the first vehicle comprises at least the first sensor of the plurality of sensors and the second vehicle comprises at least the second sensor of the plurality of sensors.

71. The method of clause 70, wherein determining a subset of the sensor data to send to the remote system, comprises:

transmitting data between the first and second vehicles to determine the subset of the sensor data to send to the remote system.

72. The method of any of clauses 60 to 71, wherein the first and second sensors are video cameras, and wherein the first sensor data is first video data, and the second sensor data is second video data.

73. One or more non-transitory computer-readable media storing instructions that, when executed by one or more processors of a system comprising one or more vehicles, cause the one or more vehicles to perform operations comprising:

obtaining, by a first sensor of a plurality of sensors, first sensor data associated with one or more objects in an environment in which the one or more vehicles are located;

obtaining, by a second sensor of the plurality of sensors, second sensor data associated with one or more objects in the environment;

determining contact metrics associated with the one or more objects associated with the first sensor data;

determining contact metrics associated with the one or more objects associated with the second sensor data;

determining one or more properties of one or more network connections to a remote system;

determining, based at least in part on the contact metrics and the one or more properties, a subset of sensor data to send to the remote system, the subset of sensor data comprising at least some of the first sensor data and/or at least some of the second sensor data; and sending the subset of the sensor data to the remote system.

74. A method, comprising:

obtaining, by a plurality of sensors, sensor data associated with a plurality of objects in an environment in which a vehicle is located;

determining potential future paths or locations of the plurality of objects;

determining, based at least in part on (i) the potential future paths or locations of the plurality of objects, and (ii) an action of the vehicle, contact metrics for the plurality of objects, a contact metric being associated with a probability of contact between the vehicle and the object;

determining, based at least in part on the contact metrics for the plurality of objects and fields of views of the plurality of sensors, a first sensor of the plurality of sensors that views one or more objects that are unlikely to contact the vehicle;

determining one or more properties of one or more network connections to a remote system; and determining, based at least in part on the one or more properties, to preclude from data sent to the remote system, the sensor data associated with the first sensor.

75. The method of clause 74, wherein determining a first sensor of the plurality of sensors that views one or more objects that are unlikely to contact the vehicle, comprises:

determining, based at least in part on the contact metrics for the plurality of objects and fields of views of the plurality of sensors, aggregated contact metrics associated with the plurality of sensors; and determining the first sensor of the plurality of sensors based at least in part on the aggregated contact metrics associated with the plurality of sensors.

76. The method of clause 75, wherein determining aggregated contact metrics associated with the plurality of sensors, comprises, for each sensor of the plurality of sensors:
determining one or more objects that are within a field of view of the sensor; and
determining an aggregated contact metric associated with the sensor based on the contact metrics associated with the one or more objects within the field of view of the sensor.
77. The method of clause 76, wherein the aggregated contact metric associated with the sensor is based on an average or sum of the contact metrics associated with the one or more objects within the field of view of the sensor.
78. The method of any of clauses 74 to 77, further comprising sending the data to the remote system, the data comprising at least some sensor data associated with a second sensor of the plurality of sensors, the second sensor viewing one or more objects that are more likely to contact the vehicle than the one or more objects viewed by the first sensor are to contact the vehicle.
79. The method of clause 78, wherein the data sent to the remote system further comprises at least some sensor data associated with a third sensor of the plurality of sensors, the third sensor viewing one or more objects that are more likely to contact the vehicle than the one or more objects viewed by the second sensor are to contact the vehicle, wherein the method further comprises at least one of:
determining a transmission bit rate for the sensor data associated with the second sensor and determining a transmission bit rate for the sensor data associated with the third sensor, the transmission bit rate for the sensor data associated with the third sensor being higher than the transmission bit rate for the sensor data associated with the second sensor; or
sending the sensor data associated with the third sensor before the sensor data associated with the second sensor.
80. A system comprising:
one or more vehicles;
a plurality of sensors associated with the one or more vehicles and configured to obtain sensor data associated with an environment in which the one or more vehicles are located;
one or more network interfaces associated with the one or more vehicles and configured to communicate with a system remote from the one or more vehicles;
one or more processors associated with the one or more vehicles and coupled to the plurality of sensors and the one or more network interfaces, the one or more processors configured to:
receive, from a first sensor of a plurality of sensors, first sensor data associated with one or more objects in the environment;
receive, from a second sensor of the plurality of sensors, second sensor data associated with one or more objects in the environment;
determine contact metrics associated with the one or more objects associated with the first sensor data;
determine contact metrics associated with the one or more objects associated with the second sensor data;
determine one or more properties of one or more network connections to the remote system;
determine, based at least in part on the contact metrics and the one or more properties, a subset of sensor data to send to the remote system, the subset of sensor data comprising at least some of the first sensor data and/or at least some of the second sensor data; and
cause the one or more network interfaces to send the subset of the sensor data to the remote system.
81. The system of clause 80, wherein the subset of the sensor data does not include the first sensor data associated with the first sensor and comprises at least some of the second sensor data associated with the second sensor.
82. The system of clause 81, wherein to determine, based at least in part on the contact metrics and the one or more properties, a subset of sensor data to send to remote system, the one or more processors are configured to:
determine, based at least in part on the contact metrics and fields of views of the first and second sensors:
that the first sensor views one or more objects that are unlikely to contact a vehicle of the one or more vehicles; and
that the second sensor views one or more objects that are more likely to contact a vehicle of the one or more vehicles; and
determine, based at least in part on the one or more properties, to:
preclude from the subset of the sensor data sent to the remote system, the first sensor data; and
include in the subset of the sensor data, at least some of the second sensor data.
83. The system of clause 80, wherein the subset of the sensor data comprises at least some of the first sensor data and at least some of the second sensor data.
84. The system of clause 83, wherein to determine, based at least in part on the contact metrics and the one or more properties, a subset of sensor data to send to the remote system, the one or more processors are configured to:
determine, based at least in part on the contact metrics and fields of views of the first and second sensors:
that the first sensor views one or more objects that are unlikely to contact a vehicle of the one or more vehicles; and
that the second sensor views one or more objects that are more likely to contact a vehicle of the one or more vehicles; and
determine, based at least in part on the one or more properties, to:
include in the subset of the sensor data, at least some of the second sensor data; and
include in the subset of the sensor data, a subset of the first sensor data.
85. The system of clause 84, wherein to cause the one or more network interfaces to send the subset of the sensor data to the remote system, the one or more processors are configured to at least one of:
determine a first transmission bit rate for the first sensor data, determine a second transmission bit rate for the second sensor data, the second transmission bit rate being higher than the first transmission bit rate, and cause the one or more network interfaces to send the subset of the sensor data based on the first and second transmission bit rates; or
cause the one or more network interfaces to send the second sensor data before sending the first sensor data.

86. The system of clause 85, wherein at least one of:

the first and second transmission bit rates are determined based on the one or more properties of the one or more network connections; or the first transmission bit rate is determined based on the contact metrics associated with the one or more objects that are within a field of view of the first sensor and the second transmission bit rate is determined based on the contact metrics associated with the one or more objects that are within a field of view of the second sensor.

87. The system of any of clauses 80 to 85, wherein the one or more processors are further configured to:

determine a first aggregated contact metric associated with the first sensor; and determine a second aggregated contact metric associated with the second sensor;

wherein to determine a subset of the sensor data to send to the remote system, comprises the one or more processors being configured to determine the subset of the sensor data based on the first and second aggregated contact metrics.

88. The system of clause 87, wherein to determine the first aggregated contact metric, the one or more processors are configured to:

determine one or more objects that are within a field of view of the first sensor; and determine the first aggregated contact metric based on the contact metrics associated with the one or more objects within the field of view of the first sensor; and to determine the second aggregated contact metric, the one or more processors are configured to:

determine one or more objects that are within a field of view of the second sensor; and determine the second aggregated contact metric based on the contact metrics associated with the one or more objects within the field of view of the second sensor.

89. The system of any of clauses 80 to 88, wherein a plurality of data networks are available for sending data to the remote system, and wherein to cause the one or more network interfaces to send the subset of the sensor data to the remote system, the one or more processors are configured to:

cause the one or more network interfaces to send at least some of the first sensor data to the remote system via a first data network; and cause the one or more network interfaces to send at least some of the second sensor data to the remote system via a second data network;

wherein the first and second data networks are selected based at least in part on the contact metrics.

90. The system of any of clauses 80 to 89, wherein the one or more vehicles comprise a first vehicle and a second vehicle, and wherein the first vehicle comprises at least the first sensor of the plurality of sensors and the second vehicle comprises at least the second sensor of the plurality of sensors.

91. The system of clause 90, wherein to determine a subset of the sensor data to send to the remote system, the one or more processors are configured to:

cause the one or more network interfaces to transmit data between the first and second vehicles to determine the subset of the sensor data to send to the remote system.

92. The system of any of clauses 80 to 91, wherein the first and second sensors are video cameras, and wherein the first sensor data is first video data, and the second sensor data is second video data.

93. One or more non-transitory computer-readable media storing instructions that, when executed by one or more processors of a system comprising one or more vehicles, cause the one or more vehicles to perform the method of any of clauses 60 to 72 or clauses 74 to 79.

While the example clauses described above are described with respect to one particular implementation, it should be understood that, in the context of this document, the content of the example clauses can also be implemented via a method, device, system, computer-readable medium, and/or another implementation. Additionally, any of example clauses 1-93 may be implemented alone or in combination with any other one or more of the example clauses.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. An autonomous vehicle, comprising:

a plurality of sensors configured to obtain sensor data associated with an environment in which the vehicle is located;

one or more network interfaces configured to communicate with a system remote from the vehicle;

one or more processors coupled to the plurality of sensors and the one or more network interfaces, the one or more processors configured to:

receive, from the plurality of sensors, sensor data associated with a plurality of objects in the environment;

determine potential future paths or locations of the plurality of objects;

determine, based at least in part on (i) the potential future paths or locations of the plurality of objects, and (ii) an action of the vehicle, contact metrics for the plurality of objects, a contact metric being associated with a probability of contact between the vehicle and the object;

determine a first weighted aggregate based on the contact metrics of a subset of the plurality of objects, the subset of the plurality of objects within a field of view of a first sensor of the plurality of sensors;

determine one or more properties of one or more network connections to the remote system; and determine, based at least in part on the one or more properties and on the first weighted aggregate, to preclude from data sent to the remote system, the sensor data associated with the first sensor; and send data to the remote system, the data sent to the remote system precluding the sensor data associated with the first sensor.

2. The vehicle of claim 1, wherein the first weighted aggregate associated with the sensor is based on an average or sum of the contact metrics associated with the one or more objects within the field of view of the sensor.

3. The vehicle of claim 1, wherein the one or more processors are further configured to cause the one or more network interfaces to send the data to the remote system, the data comprising at least some sensor data associated with a second sensor of the plurality of sensors, the second sensor viewing one or more objects that are more likely to contact the vehicle than the one or more objects viewed by the first sensor are to contact the vehicle.

4. The vehicle of claim 3, wherein the data sent to the remote system further comprises at least some sensor data associated with a third sensor of the plurality of sensors, the third sensor viewing one or more objects that are more likely to contact the vehicle than the one or more objects viewed by the second sensor are to contact the vehicle, wherein the one or more processors are further configured to perform at least one of:

determine a transmission bit rate for the sensor data associated with the second sensor and determine a transmission bit rate for the sensor data associated with the third sensor, the transmission bit rate for the sensor data associated with the third sensor being higher than the transmission bit rate for the sensor data associated with the second sensor; or cause the one or more network interfaces to send the sensor data associated with the third sensor before the sensor data associated with the second sensor.

5. A method, comprising:

obtaining, by a first sensor of a plurality of sensors, first sensor data associated with one or more objects in an environment in which one or more vehicles are located;

obtaining, by a second sensor of the plurality of sensors, second sensor data associated with one or more objects in the environment;

aggregating, as a first weighted aggregate metric, contact metrics associated with a first subset of the one or more objects, the first subset associated with the first sensor data;

aggregating, as a second weighted aggregate metric, contact metrics associated with a second subset of the one or more objects, the second subset associated with the second sensor data;

determining one or more properties of one or more network connections to a remote system;

determining, based at least in part on the first weighted aggregate metric, the second weighted aggregate metric, and the one or more properties, a subset of sensor data to send to the remote system, the subset of sensor data comprising at least some of the first sensor data and/or at least some of the second sensor data; and sending the subset of the sensor data to the remote system.

6. The method of claim 5, wherein the subset of the sensor data does not include the first sensor data associated with the first sensor and comprises at least some of the second sensor data associated with the second sensor.

7. The method of claim 6, wherein determining, based at least in part on the contact metrics and the one or more properties, a subset of sensor data to send to remote system, comprises:

determining, based at least in part on the contact metrics and fields of views of the first and second sensors:

that the first sensor views one or more objects that are unlikely to contact a vehicle of the one or more vehicles; and that the second sensor views one or more objects that are more likely to contact a vehicle of the one or more vehicles; and determining, based at least in part on the one or more properties, to:

preclude from the subset of the sensor data sent to the remote system, the first sensor data; and include in the subset of the sensor data, at least some of the second sensor data.

8. The method of claim 5, wherein the subset of the sensor data comprises at least some of the first sensor data and at least some of the second sensor data.

9. The method of claim 8, wherein determining, based at least in part on the contact metrics and the one or more properties, a subset of sensor data to send to the remote system comprises:

determining, based at least in part on the contact metrics and fields of views of the first and second sensors:

that the first sensor views one or more objects that are unlikely to contact a vehicle of the one or more vehicles; and that the second sensor views one or more objects that are more likely to contact a vehicle of the one or more vehicles than the one or more objects viewed by the first sensor; and determining, based at least in part on the one or more properties, to:

include in the subset of the sensor data, at least some of the second sensor data; and include in the subset of the sensor data, a subset of the first sensor data.

10. The method of claim 9, wherein sending the subset of the sensor data to the remote system, comprises at least one of:

determining a first transmission bit rate for the first sensor data, determining a second transmission bit rate for the second sensor data, the second transmission bit rate being higher than the first transmission bit rate, and sending the subset of the sensor data based on the first and second transmission bit rates; or sending the second sensor data before sending the first sensor data.

11. The method of claim 10, wherein sending the subset of the sensor data comprises determining the first transmission bit rate and the second transmission bit rate, and wherein at least one of:

first and second transmission bit rates are determined based on the one or more properties of the one or more network connections; or the first transmission bit rate is determined based on the contact metrics associated with the one or more objects that are within a field of view of the first sensor and the second transmission bit rate is determined based on the contact metrics associated with the one or more objects that are within a field of view of the second sensor.

12. The method of claim 5, wherein:

determining the first weighted aggregated metric comprises:

determining, as the first subset, one or more objects that are within a field of view of the first sensor; and determining the first weighted aggregate metric aggregated contact metric based on the contact metrics associated with the one or more objects within the field of view of the first sensor; and determining the second weighted aggregate metric aggregated contact metric comprises:

determining, as the second subset, one or more objects that are within a field of view of the second sensor; and determining the second weighted aggregate metric aggregated contact metric based on the contact metrics associated with the one or more objects within the field of view of the second sensor.

13. The method of claim 5, wherein a plurality of data networks are available for sending data to the remote system, and wherein sending the subset of the sensor data to the remote system comprises:

sending at least some of the first sensor data to the remote system via a first data network; and sending at least some of the second sensor data to the remote system via a second data network;

wherein the first and second data networks are selected based at least in part on the contact metrics.

14. The method of claim 5, wherein the one or more vehicles comprise a first vehicle and a second vehicle, and wherein the first vehicle comprises at least the first sensor of the plurality of sensors and the second vehicle comprises at least the second sensor of the plurality of sensors.

15. The method of claim 14, wherein determining a subset of the sensor data to send to the remote system, comprises:

transmitting data between the first and second vehicles to determine the subset of the sensor data to send to the remote system.

16. The method of claim 5, wherein the first and second sensors are video cameras, and wherein the first sensor data is first video data, and the second sensor data is second video data.

17. One or more non-transitory computer-readable media storing instructions that, when executed by one or more processors of a system comprising one or more vehicles, cause the one or more vehicles to perform operations comprising:

obtaining, by a first sensor of a plurality of sensors, first sensor data associated with one or more objects in an environment in which the one or more vehicles are located;

obtaining, by a second sensor of the plurality of sensors, second sensor data associated with one or more objects in the environment;

aggregating, as a first weighted aggregate metric, contact metrics associated with a first subset of the one or more objects, the first subset associated with the first sensor data;

aggregating, as a second weighted aggregate metric, contact metrics associated with a second subset of the one or more objects, the second subset associated with the second sensor data;

determining one or more properties of one or more network connections to a remote system;

determining, based at least in part on the first weighted aggregate metric, the second weighted aggregate metric, and the one or more properties, a subset of sensor data to send to the remote system, the subset of sensor data comprising at least some of the first sensor data and/or at least some of the second sensor data; and sending the subset of the sensor data to the remote system.

* * * * *